United States Patent [19]

Kopet et al.

[11] Patent Number: 5,448,310

[45] Date of Patent: Sep. 5, 1995

[54] MOTION ESTIMATION COPROCESSOR

[75] Inventors: Thomas G. Kopet; Gerry C. Lui Kuo; Stephen D. Lew, all of Colorado Springs, Colo.

[73] Assignees: Array Microsystems, Inc., Colo.; Samsung Electronics Co., Ltd., Seoul, Rep. of Korea

[21] Appl. No.: 55,711

[22] Filed: Apr. 27, 1993

[51] Int. Cl.$^6$ ............................................. H04N 7/36
[52] U.S. Cl. .................................... 348/699; 348/718; 348/719; 382/197; 382/209
[58] Field of Search .................... 382/21, 30; 348/699, 348/402, 407, 413, 718, 719; H04N 7/137

[56] References Cited

U.S. PATENT DOCUMENTS 5,175,618 12/1992 Ueda et al. ........................... 348/699
5,200,820 4/1993 Gharaui ............................... 348/699

OTHER PUBLICATIONS

Kummerow, et al., "A Multiprocessor Based Low Bitrate Video Codec Architecture and a Well-Adapted Two Phase Software Coding Strategy," *SPIE Visual Communications and Image Processing IV,* vol. 1199, pp. 237–247, (Sep. 1989).
Yang, et al., "Very High Efficiency VLSI Chip-Pair for Full Search Block Matching with Fractional Precision," *IEEE,* pp. 2437–2440, (Oct. 1989).
"Motion Estimation Processor," STI3320 SGS-Thomson Microelectronics, Jul., 1990.
"L64720 Video Motion Estimation Processor (MEP) Preliminary", *LSI Logic Corporation,* Jul., 1990.
"Video Compression Chip Set," *LSI Logic Corporation,* Sep. 27, 1990.
DeVos, "VLSI-Architectures for the Hierarchical Block-Matching Algorithm for HDTV Application," *SPIE Visual Communications and Image Processing,* vol. 1360, pp. 398–409, (May 1990).
"IIT Vision Processor, Single-Chip Microcode-Driven VSP for DCT-based Algorithms, Preliminary Data Sheet," *Integrated Information Technology, Inc.,* Sep. 1991.
"Using the IIT Vision Processor in JPEG Applications," *Integrated Information Technology, Inc.,* Sep., 1991.
"Video Compression Processor Handles Multiple Protocols," *Electronic Products,* p. 85, Oct., 1991.
Leonard, M., "Silicon Solution Merges Video, Stills, and Voice," *Electronic Design,* pp. 45–54, Apr. 2, 1992.
"AT&T Chip Set Overview—Competition," *Array Microsystems—Proprietary,* Apr. 7, 1992.
Grunin, L., "Image Compression for PC Graphics," *PC Magazine,* pp. 337–350, Apr. 28, 1992.
"Integrated Vision Module, Advance Information Data Sheet," *Integrated Information Technology, Inc.,* No Date.

*Primary Examiner*—Howard W. Britton
*Attorney, Agent, or Firm*—Townsend and Townsend Khourie and Crew

[57] ABSTRACT

A motion estimation coprocessor for use in a video data system. The motion estimation coprocessor may be used with a video memory that subdivides a P row×Q column image of pixels into several pages. The page structure enables efficient loading of video data into the coprocessor. The motion estimation coprocessor may perform several block matches simultaneously. The motion estimation coprocessor may perform exhaustive block matching or use a hierarchical search.

10 Claims, 41 Drawing Sheets

■ = CURRENT SEARCH ORIGIN  □ = OUTLINES CURRENT SEARCH AREA

```
         | 0 | 1 | 2 | 3 |  ⟵ 272
      _____
      |00|01|02|03|04|05|06|07|
   0  |10|11|12|13|14|15|16|17|
      _____
      |20|21|22|23|24|25|26|27|
   1  |30|31|32|33|34|35|36|37|
      _____
      |40|41|42|43|44|45|46|47|
   2  |50|51|52|53|54|55|56|57|
      _____
      |60|61|62|63|64|65|66|67|
   3  |70|71|72|73|74|75|76|77|
```
289 ↙ (points to left side of grid)

VIDEO DATA BUS # 0              VIDEO DATA BUS # 2

| 0 | 1 | 2 | 3 |              | 0 | 1 | 2 | 3 |
 0 |10|12|14|16|  ⟵ 291         0 |11|13|15|17|  ⟵ 293
 1 |30|32|34|36|                 1 |31|33|35|37|
 2 |50|52|54|56|                 2 |51|53|55|57|
 3 |70|72|74|76|                 3 |71|73|75|77|

VIDEO DATA BUS # 1              VIDEO DATA BUS # 3
```

8 X 8 BLOCK COMPARES 16 x 16 BLOCK COMPARES

▨ = ORIGIN

MOTION ESTIMATION COPROCESSOR

BACKGROUND OF THE INVENTION

The present invention relates to special purpose image compression coprocessors and in particular to motion estimation coprocessors.

To represent a picture image digitally, the image area is described as an array of pixels. A digital number describes the color, luminance and chrominance of each pixel. Pixel color information actually consists of three digital values: one digital value for red, one digital value for green and one digital value for blue. Thus, the sheer volume of data needed to describe one single pixel means that digital representations of complete picture images result in exceptionally large data files.

In full motion video, not only are large blocks of data required to describe each individual picture image, but a new image or frame must be presented to the viewer at approximately thirty new images per second to create the illusion of motion. Moving these large streams of video data across digital networks or phone lines is simply infeasible given the available bandwidth.

Data compression is a technique for reducing the number of bits required to send a given message. Data compression utilizes either a single shorthand notation to signal a repetitive string of bits or omits data bits from the transmitted message. The latter form of compression is called "lossy" compression and capitalizes upon the ability of the human mind to provide the omitted data. In still video, the JPEG standard is used for data compression and defines the method by which the still image is to be compressed. In motion video, much of the picture data remains constant from frame to frame. Therefore, the video data may be compressed by first describing a reference frame and describing subsequent frames in terms of the change from the reference frame.

A reference frame can be used in three ways: forward prediction, backward prediction and interpolation. Forward and backward prediction use a single reference frame and describe subsequent or previous frames respectively in terms of the difference from the reference frame. Interpolation uses both forward and backward reference frames. The forward reference frame is located in the data stream at an earlier point in time than the current frame. The backward reference frame is located in the data stream at a later point in time than the reference frame. The current frame is calculated based on averaged differences between the first reference frame and the second reference frame.

Several specific protocols for implementing motion compression exist. Several of these protocols are hardware specific and developed by chip manufacturers in the absence of accepted compression standards. Recently, however, two accepted standards for motion video compression have emerged. The CCITT (International Consultative Committee on Telephone and Telegraph) H.261 video conferencing standard uses an algorithm called Px64. The P refers to a multiplier in the range 2 to 30 and the 64 refers to a single 64 Kbps ISDN channel for transmitting the data. However, squeezing even this compressed data over the ISDN telephone line requires drastic compression. Fortunately, the typical video conference does not have much motion from frame to frame, and Px64 utilizes only forward prediction over a single frame time.

To enable higher quality, full motion video, a second standard called MPEG (Motion Pictures Expert Group) has evolved. The MPEG specifications do not define the exact procedure for compressing the video. Rather, the standard defines the format and data rate of the compressed output. The set of compression tools employed by MPEG includes a JPEG-like method for compressing intraframes, various combinations of forward, backward, and interpolated motion compression, and subband coding for audio.

More particularly, operations according to the MPEG standard may be summarized with reference to the following hypothetical in which the video system wishes to describe four sequential image frames. The video processing system first receives the first frame. This first received frame cannot be described in terms of a reference frame and only intraframe (i.e. non-predictive) coding is performed.

The second frame is then received. One possible implementation of the MPEG compression standard describes this frame in terms of the first frame, or intraframe ("I" frame) and a first forward predicted ("P") frame. However, this first P frame is not yet defined and compression of the received second frame is delayed until receipt of the first P frame by the processing system. The third frame also will be described in terms of the first I and P frames.

The fourth frame of this hypothetical example is used to form the first P frame. The P frame is formed by predicting the fourth received frame using the first I frame as a reference. Upon computation of the first P frame, the motion estimation processor can process the second and third received frames as bidirectionally predicted "B" frames by comparing blocks of these frames to blocks of the first I and P frames. To do this processing, the motion estimation processor first obtains a forward prediction of a block in the received frame being processed using the first I frame as a reference. The motion estimation processor then obtains a backward prediction of that same block using the first P frame as a reference. The two predictions are then averaged to form the final prediction for the block.

In current motion estimation devices, an exhaustive full resolution pel by pel search is performed for each block of the I or P frame. This method requires a large bandwidth bus for transfer of the video data. Furthermore, the processing time required to churn through the data slows overall system speed.

SUMMARY OF THE INVENTION

The motion estimation coprocessor of the present invention provides improvements in performance over prior art devices. For example, the motion estimation coprocessor of the present invention may perform either full, exhaustive block matching searches or multiple step hierarchical searches to either full or half pixel search resolution. In the hierarchical search, the best matching block is first found using a lower resolution macroblock containing fewer data points than the full resolution image. Once the best matching block has been found, a full resolution search on the best matching block can be performed. This sequence of steps reduces the total number of computations that must be performed by the motion estimation processing system.

According to another embodiment of the present invention, the motion estimation search is defined by an algorithm resident in the motion estimation device of the present invention. The user may then control whether a full or hierarchical search is performed. In addition, if a hierarchical search is performed, the user may define the breadth of the hierarchical search. In this fashion, the greater accuracy of a full search may be employed where processing speed constraints and system bandwidth are not limiting factors. A user desiring greater speed or wishing to maximize use of system bandwidth may choose to implement a hierarchical search.

According to yet another embodiment of the present invention, the motion estimation device architecture enables simultaneous fetching of new video data, block matching of previously retrieved data and output of search results. This architecture improves system speed and performance over prior art devices through parallel performance of these tasks.

According to yet another embodiment of the present invention, the memory employed by the motion estimation processor is partionable to enable input of multiple search windows. In addition, the video input buffer of the present invention is also partionable and supports simultaneous fetches of full and quarter resolution pels. These features minimize the required system bandwidth by avoiding the need to refetch identical pels.

According to still another embodiment of the present invention, the modular block architecture of the invention enables additional block matching engines to be used. The additional block matching engines further improve device performance.

BRIEF DESCRIPTION OF THE DRAWINGS

FIG. 6 is a diagram showing logical mapping of a memory image according to an embodiment of the present invention;

FIG. 7 is a diagram showing physical mapping of memories onto a video data bus according to an embodiment of the present invention;

FIG. 8 is a diagram of an 8×8 pel logical image according to an embodiment of the present invention;

DESCRIPTION OF THE PREFERRED EMBODIMENT

Video System Overview

Figure 1:
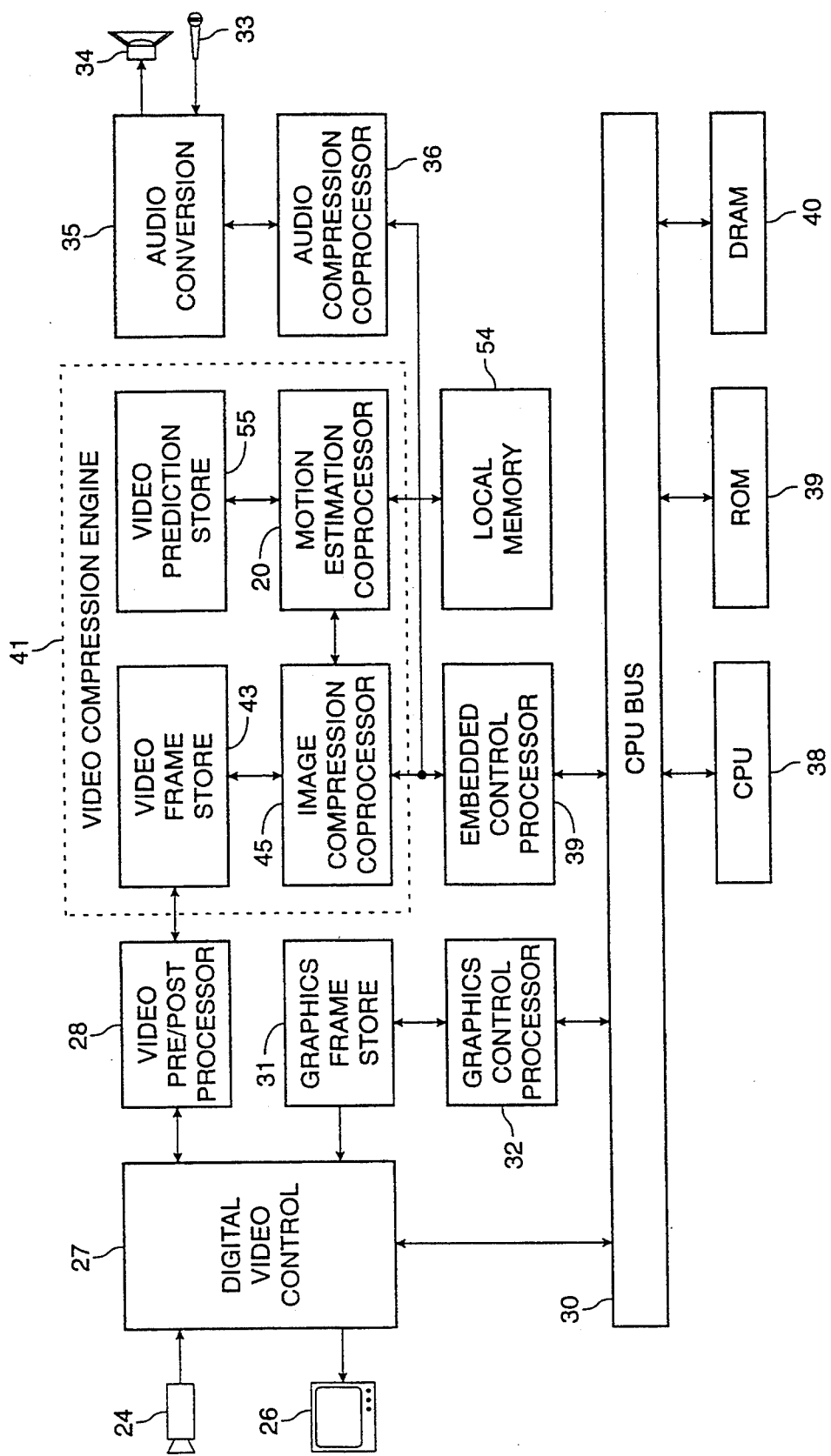
FIG. 1 is a block diagram of a video system including motion image compression using the present invention.

FIG. 1 illustrates one example of a system incorporating the motion estimation coprocessor 20 (MEC 20) of the present invention. A camera 24 receives video data inputs and a display unit 26 displays video data. A digital video control unit 27 connected to both camera 24 and display 26 coordinates the communication of video data between camera 24, display 26 and a video pre-/post processor 28, and a host processor via a bus 30. Digital video control unit 27 also coordinates the display of video graphics data retrieved from a graphics frame store memory 31 operating under the control of a graphics control processor 32.

The video system of FIG. 1 may also include audio. Audio capabilities can be added with a microphone 33 and a speaker 34 connected to an audio conversion circuit 35. An audio compression coprocessor 36 for compression of audio data connects between an embedded control processor 37 and the audio conversion unit 35.

The system of FIG. 1 operates under the control of a host processor 38, which couples to the remaining system components via bus 30. In a preferred embodiment, host processor 38 comprises a RISC processor, such as for example, an Intel i960 family processor manufactured by Intel of Santa Clara, Calif. Also coupled to bus 30 are a ROM 39 for storing host processor 38 program code and a DRAM 40.

Received video data to be compressed, or uncompressed data to be displayed, are processed by a group of devices working in tandem and known as a video compression engine 41. Included as part of the video compression engine 41 is a video frame store 43 and an image compression coprocessor 45. Video frame store 43 serves as a buffer memory for data input to and output from the video compression circuitry.

The image compression coprocessor 45 performs all video compression functions in a typical system except motion estimation, Huffman encoding and decoding, and bit stream management. An image compression coprocessor is described on copending application Ser. No. 08/054,950, titled "Video Interface Unit," filed the same day herewith and incorporated herein by reference. Image compression coprocessor 45 connects to bus 30 through the optional embedded control processor 37. Control processor 37 offloads from host processor 38 certain decompression and compression functions not accomplished by coprocessor 45, such as Huffman coding. Alternatively, tasks performed by control processor 37 may be performed by host processor 38.

For motion video, MEC 20 processes compressed motion video data. MEC 20 operates in conjunction with its own local memory 54 and a video prediction store memory 55. The operation and structure of the MEC of the present invention is described in greater detail below.

Overview of Motion Estimation Processing

Block matching is the primary operation performed by MEC 20. The motion estimation circuit of MEC 20 compares current frame macroblocks with previous or future frame macroblocks (reference frames) within a finite search area centered on the position of the current macroblock. Block matching identifies the reference macroblock that should be used as a basis for describing the current video frame.

To identify the proper reference frame, MEC 20 receives tokens containing, for example, 16 pel by 16 pel blocks of luminance data from image compression compressor 45. The 16 pel by 16 pel blocks received from image compression coprocessor 45 describe the current frame. MEC 20 then compares this block against the contents of one or two on-chip search windows using a search algorithm resident in the MEC program memory.

Block matching computes the mean absolute difference (MAD) between the current frame and the search window. To compute the MAD, corresponding pels from the two blocks being compared are subtracted, and the sum of the absolute values of these pel differences calculated. The smaller the MAD, the better the "match" between the two blocks. The MEC 20 processing system seeks to find the 16×16 block in the search memory with smallest MAD by executing a user-defined motion estimation algorithm.

The MEC 20 processing system keeps track of the smallest MAD computed during the search algorithm, thereby deciding which 16 by 16 block in the search window is the best match to the input token. The MEC 20 processing system then computes a motion vector describing the differences between the current frame and the best matched block. MEC 20 sends both the motion vector and the block back to image compression coprocessor 45 in the form of an output token.

Block matching as described above may be done in a single step on a full resolution search window or in multiple steps using reduced image search windows. The MEC's internal search memory is logically configurable as from 1 to 4 windows. The four window configuration accommodates the needs of MPEG bidirectional prediction. A multiple step block matching process using multiple resolution search windows is known as a hierarchical search.

The hierarchical search first finds the best matching block using a reduced resolution image. The best matching position found in the first step of the hierarchical search is then typically used to conduct a full search on a full resolution image. The two step hierarchical process reduces computation steps because the individual pel comparisons are fewer in number for the reduced resolution image and the appropriate macro block from which to compute the motion vector is more quickly ascertained.

Figure 2A:
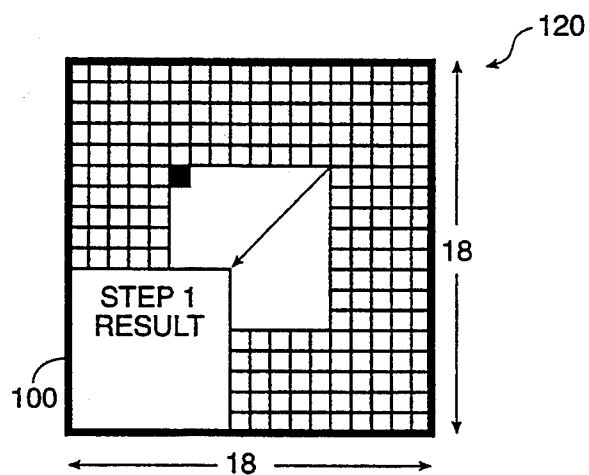
FIG. 2A is an example of a hierarchical search on a reduced image using the motion estimation techniques of the present invention.
Figure 2B:
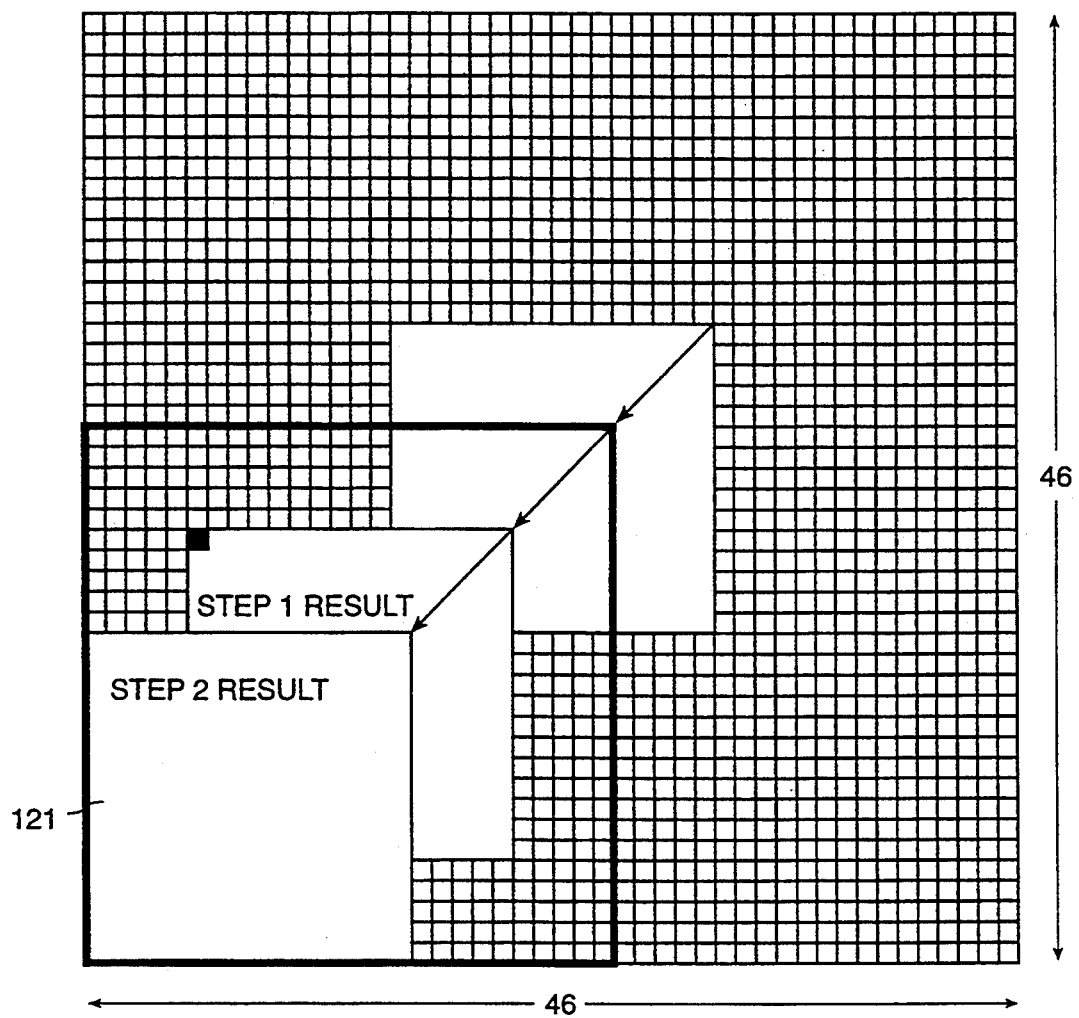
FIG. 2B is an example of a hierarchical search on a full resolution image using the motion estimation techniques of the present invention.

An example of motion estimation coprocessing using a hierarchical search according to the present invention is shown in FIGS. 2A and 2B. In the present example, MEC 20 performs a ±15 pel hierarchical search in two steps. The first step, illustrated in FIG. 2A uses 8×8 block matches to perform a ±5 pel search on a reduced image. In this example, a quarter resolution, or 4:1, reduced image having the 32 pels square configuration is used. Search window 100 moves around the zero motion vector position 120 and the MAD is computed. In the second step, as shown in FIG. 2B, ±5 pel search in a full resolution search window 121 is performed around the best matching position found in FIG. 2A using 16×16 block matches.

Each step of the hierarchical search, if done exhaustively, requires 121 block matches. In contrast, an exhaustive ±15 pel full resolution search on a 46 pels square image requires 961 block matches. In addition, half of the hierarchical block matches are on 8×8 blocks which require only one fourth the computations of 16×16 matches.

MEC Hardware Overview

Figure 3:
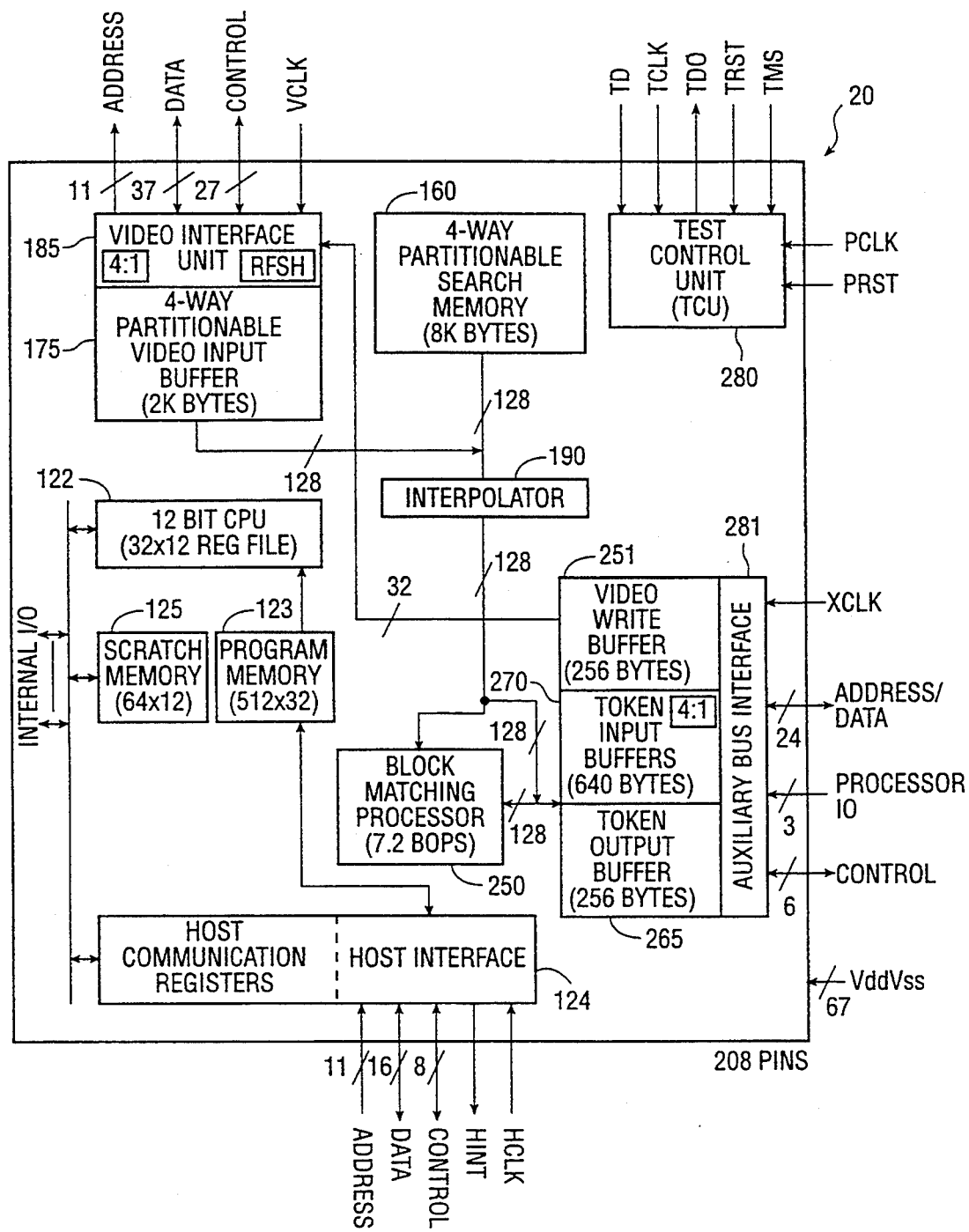
FIG. 3 is a block diagram of a MEC according to an embodiment of the present invention.

FIG. 3 contains a block diagram of one embodiment of the MEC 20 integrated circuit of the present invention. In a preferred embodiment of the present invention, MEC 20 comprises a 7.2 BOPS parallel processor chip specifically optimized for the real-time execution of motion estimation block matching algorithms.

All activities on MEC 20 are coordinated by a central processor unit (CPU) 122. The CPU 122 executes a program stored in an on-chip instruction RAM 123 loaded from the host processor interface 124. In one embodiment of the present invention, RAM 123 comprises a 512 word RAM. The CPU 122 instruction set and architecture permit a variety of common block matching algorithms to be programmed (e.g. exhaustive, conjugate direction, 2D logarithmic, etc.). A scratch pad memory 125 may optionally be associated with CPU 122. Scratchpad memory 125 has no predefined function and may be used as needed by the CPU program.

A search memory 160 stores pels received from a video input buffer 175. Video input buffer 175 is loaded from a video interface unit 185 from, for example, a DRAM or VRAM (not shown) residing on the video bus. Applicant's copending application Ser. No. 08/054,684, titled "Video Interface Unit," filed the same day herewith and incorporated herein by reference describes this unit in greater detail. The pels output from search memory 160 are sent through a block interpolation processor 190. Block interpolation processor 190 optionally performs horizontal and/or vertical half pel interpolation as described in the MPEG standard. Pels output from block interpolation processor 190 are sent to either a block matching processor 250 or to a token output buffer 265 for transfer back to the image compression coprocessor 45 (FIG. 1).

Block matching processor 250 computes the MAD for blocks received from block interpolation processor 190 and blocks received from token input buffer 270. Tokens are blocks of uncompressed images received from image compression processor 45. The output of block matching processor 250 is a reference frame and motion vector output to token output buffer 265 for communication to image compression coprocessor 45.

MEC 20 of the present invention may also include an on board test control unit 280. Test control unit 280 enables offchip input of test control signals in compliance with 1EEE 1149.1 test standard to verify proper operation of MEC 20.

In operation, the embodiment of FIG. 3 receives the data token from image compression coprocessor 45 via auxiliary interface 281 and stores it in token input buffer 270. The data token is stored in both decimation filtered and or undecimated forms to enable hierarchical searches.

While token input buffer 270 loads the newly received data token, block matching processor 250 matches the contents of a previously received token with the contents of search memory 160 under the direction of CPU 122. CPU 122 executes the search algorithm stored in RAM 123 to compute the address of the search window segment stored in search memory 160. In the embodiment of FIG. 3, hardware in block matching processor 250 performs the majority of block matching computational work. This allocation of tasks between CPU 122 and block matching processor 250 reduces CPU workload, increases computational speed, and enables additional block matching processors to work in tandem with block matching processor 250 for additional block matching power. In addition, this allocation of workload, reduces CPU computational requirements and permits CPU 122 to function primarily as a chip controller.

CPU 122 keeps track of the best matching block for the subject data token. This best matching block is stored as a data token in token output buffer 265 and output to image compression coprocessor via auxiliary interface unit 281.

At the same time block matching processor 250 conducts the aforementioned block matching operation, video interface unit 185 loads video input buffer 175 with a new portion of the search window. Typically, the data blocks described by the token are adjacent blocks and the search proceeds in raster scan fashion. The search memory, video memory and video input buffer 175 are therefore constructed such that only a "strip" of pixels changed from the previously loaded search window need be loaded. Thus, the entire search window need not be reloaded and operational efficiency is improved.

Note that MEC 20 of FIG. 3 performs three operations in parallel. MEC 20 receives or sends a data token from or to image compression coprocessor 45, performs a block matching operation, and retrieves additional search window data via video interface unit 185. Simultaneous execution of these operations maximizes the efficiency of MEC 20 operations. The particular structures of MEC 20 components that enable partitioning of the search window and parallel operations shall be described in detail in the sections below.

DETAILED DESCRIPTION OF MEC DEVICE COMPONENTS

The structure and operation of the MEC components described in connection with FIG. 3 are now discussed in greater detail below. For the reader's convenience, tables identifying the commands, command registers and I/O pins discussed in the following sections are provided at the end of the specification.

1. Video Memory Interface

The video memory interface comprises video interface unit 185, video input buffer 175 and a video bus. Video interface unit 185 reads and writes luminance image pels from the off-chip DRAM and/or VRAM-memory to video input buffer 175. The DRAM and VRAMmemories may be thought of as residing on the video bus. Once the video input buffer 175 is loaded, CPU 122 copies the contents of buffer 175 to search memory 160 by writing to the appropriate command register (LDSM).

a. MEC Video Bus

In one embodiment of the present invention as shown in Table 1, the MEC video bus comprise 11 address, 32 data, 22 control, and 1 clock signal pins for a total of 66 pins. The video bus is preferably functionally and electrically compatible with the image compression coprocessor video bus. A collection of 10 control registers determines the timing characteristics of the signal pins. These registers contain counts of VCLK periods which are used by the video interface timing generators to determine when to assert or deassert output signals or sample input signals. In effect, these registers contain the DRAM timing parameters corresponding to the memories connected to the MEC 20 video bus.

Figure 4:
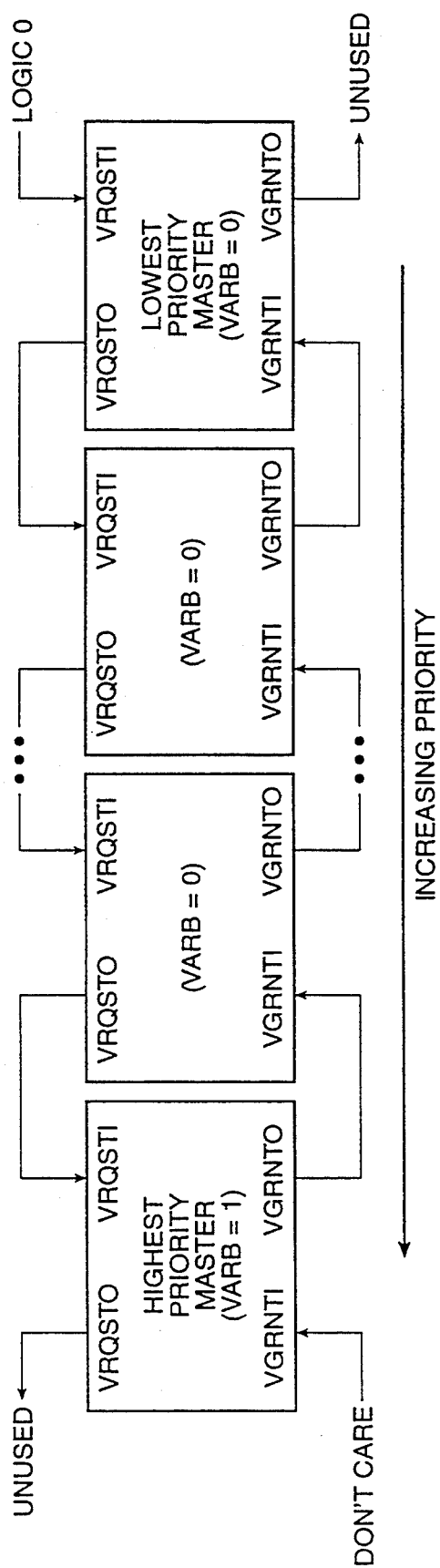
FIG. 4 is a diagram showing a bus daisy chain priority scheme according to an embodiment of the present invention.

Internally, up to three activities within an MEC may compete for the use of the video bus; memory refresh, memory write transfers as initiated by WRMEM instructions from image compression coprocessor 45; and memory read transfers as initiated by the CPU to fill video input buffer 175 using the load command key. Mastership of the MEC's video bus is controlled by a serial daisy-chained arbitration scheme. Each potential bus master has "bus request input", "bus request output" "bus grant input" and "bus grant output" pins On MEC 20, these pins are labeled, respectively, VRQSTI, VRQSTO, VGRNTI, and VGRNTO. As shown in FIG. 4, bus masters are tied together in priority order using these pins; priority increases from right to left. The daisy chain of VRQSTI and VRQSTO pins propagates requests for bus usage starting from the lowest priority master 285 up to the highest priority master 286. Along the way, a bus request from a lower priority master is blocked by its higher priority neighbor if that neighbor needs the bus at the same time or prior to seeing the lower priority request on its VRQSTI pin.

The highest priority master, if its VRQSTI pin is asserted and it does not need the bus itself, grants the bus to another master by asserting its VGRNTO pin. This "bus grant" then propagates along the chain of VGRNTI and VGRNTO pins to the highest priority master which had requested the bus. Bus grants to lower priority masters are blocked by higher priority masters who had also requested the bus. Thus, a bus master which had requested the bus and which observes an assertion of its VGRNTI pin will take control of the bus and deassert its VGRNTO pin, thereby stopping further propagation of the bus grant signal. CPU 122 may define MEC 20 to be the high priority master on the video bus by setting the MEC 20 VARB register to "1". The VRQSTO pin of such an MEC 20 is not tied to any other master. Similarly, the state of the MEC 20 VGRNTI pin is internally ignored.

In typical operations (VARB=1), normal read/write transfers take priority over memory refresh and external bus requests as signaled by VRQSTI. However, once the bus is awarded to either a WRMEM instruction or a video input buffer 175, the master uses the bus until finished. Read/write transfers are performed a row at a time, but the bus is relinquished for two VCLK periods between rows in order to allow memory refresh and external bus masters a chance to temporarily acquire it. External bus requests and memory refresh compete during these clock cycles using a rotating priority scheme. Initially, external requests are assigned the highest priority. Whenever the highest priority master requests the bus, it is awarded the bus, its priority is reduced to lowest, and the lowest priority master is increased to highest. If the lowest priority master requests the bus in the absence of the highest priority master, the lowest priority master is awarded the bus, and priorities remain unchanged.

MEC 20 may also request the video bus by asserting its VRQSTO pin on behalf of one of its own bus activities or in response to an assertion of its VRQSTI pin (VARB set to 0). MEC 20 will start to pass along an assertion of VRQSTI to VRQSTO only if it does not simultaneously occur with an internal request. An internal request occurring after MEC 20 has started to pass along an external to its VRQSTO pin waits until its VRQSTI pin is again deasserted.

A rotating priority scheme is used to resolve conflicts between internal requests, with normal read/write transfers starting out with the highest priority, and memory refreshes with the lowest. If a WRMEM instruction and a video interface buffer simultaneously request the bus, the WRMEM request takes priority. Priorities are modified using the same method as for VARB=1, described above. A bus master with VARB=0 requesting the bus on its own behalf continues to assert its VRQSTO pin until it has been granted the bus via an assertion of its VGRNTI pin and has finished using the bus.

For normal read/write transfers, an MEC 20 with VARB=0 relinquishes the bus between row transfers. However, if a WRMEM instruction or a video interface buffer 175 has not finished using the bus at the end of a row transfer, MEC 20 will internally compete with refresh (if enabled) for the next scheduled bus request. An MEC 20 deasserts its VGRNTO pin whenever its VRQSTI pin is deasserted, thereby decreasing the time lower priority masters must wait relative to higher priority masters before requesting the bus again.

Figure 5:
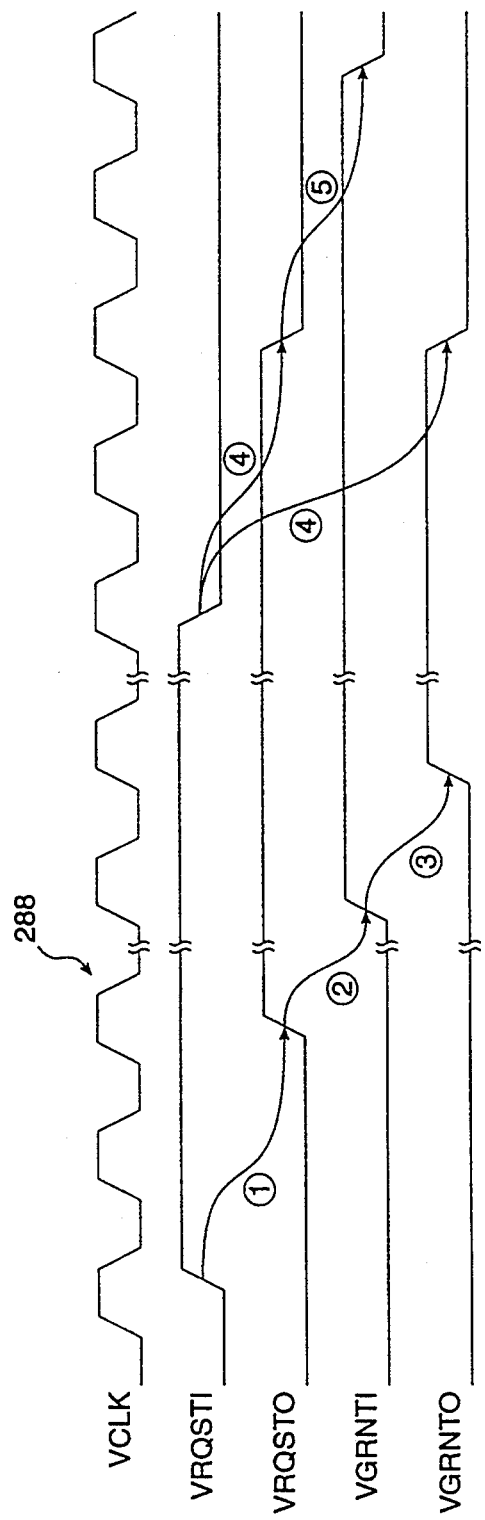
FIG. 5 is a timing diagram for MEC video bus daisy chain signals according to an embodiment of the present invention.

FIG. 5 shows timing for the video bus daisy chain signals for an MEC somewhere in the middle of the daisy chain (i.e. VARB=0) which does not have an internal bus request. All signals are synchronous to VCLK 288. As shown in FIG. 5, the VRQSTI pin of MEC 20 is asserted by the VRQSTO pin of a lower priority master (i.e. one farther to the right in the daisy chain) making a bus request. MEC 20 takes one VCLK cycle to clock VRQSTI into a register and then passes the request along by asserting VRQSTO one clock cycle later (edge transition 1 in FIG. 5). Other higher priority masters to the left of this MEC will continue to pass the bus request along to the master with VARB=1 which will then grant the bus via its VGRNTO pin. Edge transition 2 in the FIG. 5 shows this grant being passed to MEC 20 via its VGRNTI pin which takes only a single clock cycle to transfer it to its VGGNTO pin (edge transition 3).

Sometime later the bus master finishes using the bus and correspondingly deasserts its VRQSTO pin. This activity is reflected as a deassertion of VRQSTI for the MEC 20 described in FIG. 5. Again, the MEC 20 requires one cycle to clock-in VRQSTI and another cycle to pass it along to VRQSTO (edge transition 4). MEC 20 also deasserts VGRNTO simultaneously with VRQSTO, reducing the time its lower priority neighbor must wait to observe the bus release on its VGRNTI pin. This early deassertion of VGRNTO puts lower priority masters on a more equal footing with higher priority masters when it comes to making new bus requests. Two cycles after deasserting VRQSTO, on edge transition 5 of FIG. 5, the MEC's VRGNTI pin will also be deasserted by the VGRNTO pin of its higher priority neighbor, assuming the neighbor is an MEC or image compression coprocessor.

b. Use of Logical and Physical Image Coordinates to Transfer Data on the Video Bus According to a preferred embodiment of the invention, once MEC 20 has access to the bus, up to eight separate luminance images, each consisting of up to 4096 by 4096 pels, may be accessed by video memory interface unit 185 using either 16 or 32 bit page mode data transfers. The data width of the MEC's video memory bus may be configured as either 32 or 16 bits as determined by the VBUSMODE register in CPU's memory map. If VBUSMODE is "0" the bus is configured as being 32 bits wide If VBUSMODE is "1" the bus is configured as being 16 bits wide, with pels being accessed on data busses 0 and 1. Logical to physical address translation is described separately below for the 32 bit and 16 bit bus modes.

In the 32 bit access mode, the MEC's four 8 bit video memory data busses are used to simultaneously read or write four pels on every memory cycle, requiring the storage for one logical image to be physically spread across memories connected to the four data busses. These four pels form a two by two pel square in the logical image space. Thus the 32 bit access mode segments a logical image into non-overlapping two by two pel tiles, and each (row, column) memory address pair output by the MEC selects one of these tiles.

In 32 bit mode, a block of pels at logical coordinates (firstcol, firstrow) is physically accessed as an array of two by two tiles. As an example, FIG. 6 shows an eight by eight pel logical image. Pels are individually labeled with their row:column locations; tile coordinates axes 289, 290 are shown along the top and left sides of FIG. 6. The 32 bit access mode segments this 64 pel image into a four by four grid of tile.

FIG. 7 shows how the pels in FIG. 6 are physically mapped to memories on the four MEC video data buses, 290-293. Pels from even numbered columns in FIG. 6 are accessed on data busses 0 or 1 and pels from odd numbered columns are always accessed data busses 2 or 3. Pels from even numbered rows in FIG. 6 are accessed on data busses 0 or 2 while pels from odd numbered rows are accessed on data buses 1 or 3. MEC 20 simultaneously accesses the four pels making up a tile by outputting off-setted versions of the tile's row and column coordinates on the video address bus.

Thus, the MEC 20 accesses a num_tile_rows by num_tile_cols array of tiles beginning at row address first_tile row and column address first_tile_col. The tiles are accessed in a left-to-right, top-to-bottom raster scan fashion. Row addresses are incremented by one from one row of tiles to the next; column addresses are incremented by one within a row. The tiles within each row are accessed using a series of page mode accesses where the MEC outputs the tile row number on the video address bus followed by a succession of tile column addresses.

In the 16 bit access mode, video memory data busses 0 and 1 are used to simultaneously read or write two 8 bit pels every memory cycle, requiring the storage for one logical image to be physically spread across the two data busses. These two pels form a one pel by two row array in the logical image space. As a result the 16 bit access mode segments a logical image into non-overlapping one pel by two row tiles, and each (row, column) memory address pair output by the MEC selects one of these tiles.

FIG. 8 shows an eight by eight pel logical image 295. Pels are individually labeled with their row:column locations; tile coordinate axes are shown along the top and left sides of figure. The 16 bit access mode segments this 64 pel image into a four row by eight column tile grid.

Figure 9:
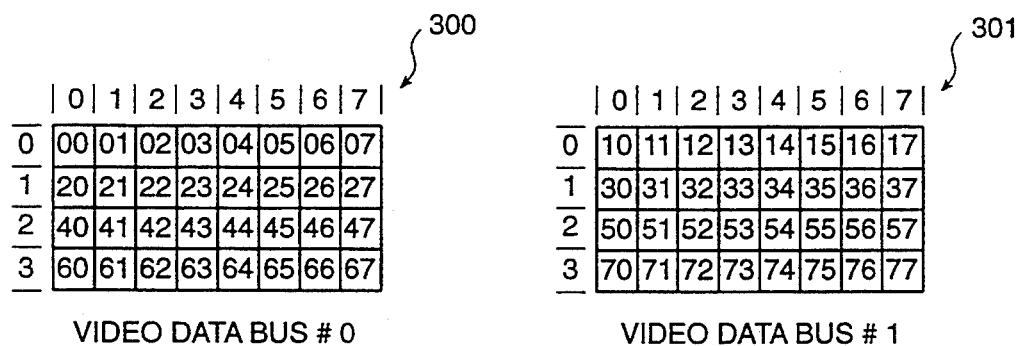
FIG. 9 is a diagram of the 8×8 pel image of FIG. 4-6 mapped to physical coordinates according to an embodiment of the present invention.

FIG. 9 shows how the pels in FIG. 8 are physically mapped to memories on video data busses 0 and 1, identified by reference numerals 300 and 301 in FIG. 9. The MEC 20 simultaneously accesses the two pels making up a tile by outputting off-setted versions of the tile's row and column coordinates on the video address bus.

As seen in FIG. 9, the 16 bit access mode splits and image row-wise between memories on the two video busses; that is, the memory on video data bus 0 stores all the pels from even numbered logical rows and the other stores all the pels from odd numbered rows. Thus, as in the 32 bit mode, the MEC accesses a num_tile_rows by num_tile_cols array of files beginning at row address first_tile row and column address first_title_col. The tiles are accessed in the same fashion as in the 32 bit mode, using page mode memory accesses.

c. Writing Video Data to Video Memories

Figure 10:
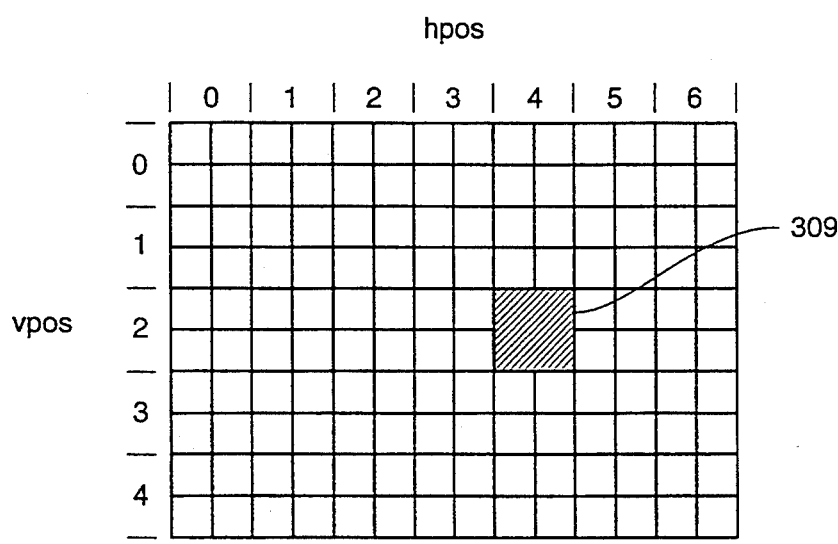
FIG. 10 is an example grid layout using operand descripter fields according to an embodiment of the present invention.

Pels are written to the off chip DRAM and/or VRAM memories by video interface unit 185 in response to instructions (WRMEM) received from image compression coprocessor 45 via its auxiliary bus interface. MEC 20 executes the WRMEM instruction by writing the luminance data contained in the instruction's four block operand data token to a video memory addressed using a logical coordinate grid indexed by the operand's hpos and vpos descriptor fields. In one embodiment, the resolution of each of horizontal and vertical axes of this logical coordinate grid is 16 pels, with each 16 by 16 pel grid element corresponding to four 8 by 8 pel blocks arranged in a 2 by 2 block configuration (i.e. corresponding to one luminance token). FIG. 10 shows an example grid layout highlighting the grid element 309 corresponding to hpos=4 and vpos=2.

The WRMEM instruction has three parameters used in conjunction with internal registers and various token descriptor fields to translate the logical coordinates into physical memory addresses. These parameters are memsel, horgsel, and vorgsel, and are transmitted as part of a processor packet word when image compression coprocessor 45 sends a WRMEM instruction to MEC 20 for execution.

Figure 11A:
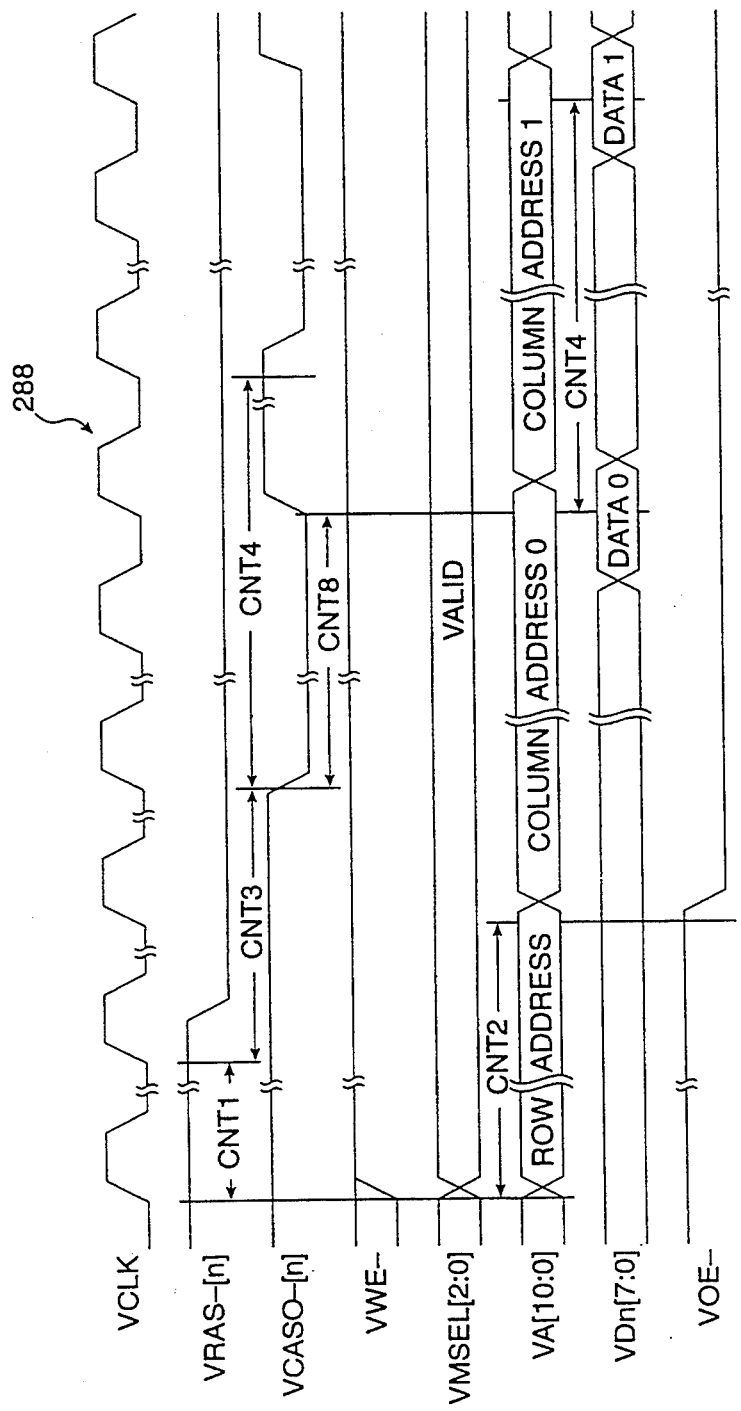
FIG. 11 is a timing diagram of an MEC video write operation according to an embodiment of the present invention.
Figure 11B:
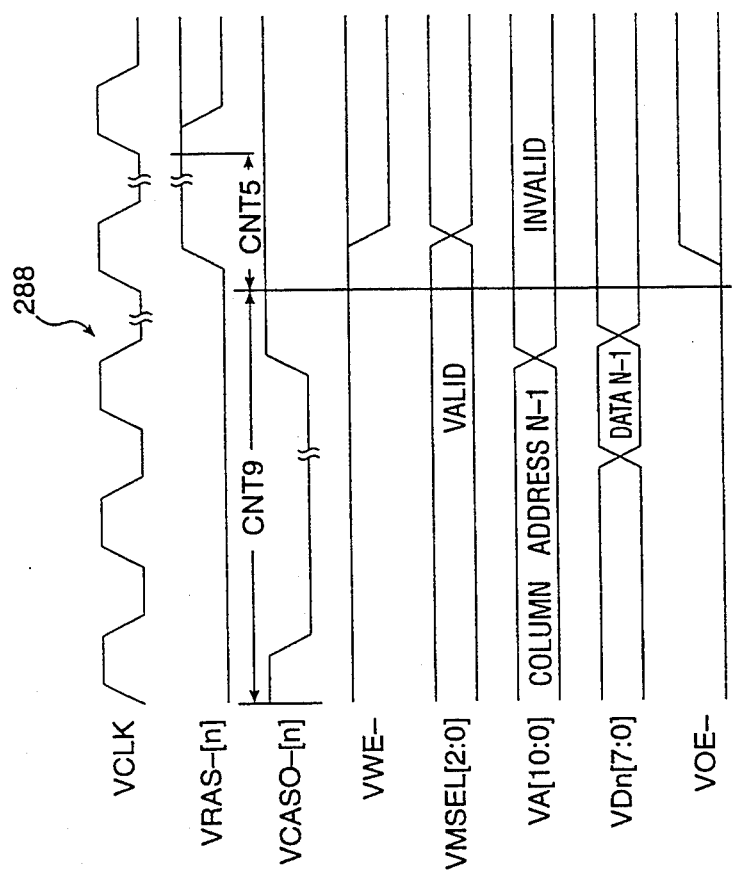

The memsel parameter, which occupies bits 10:8 of the WRMEM instruction, provides the means for selecting separate image memories and ranges in value from 0 to 7. The horgsel and vorgsel parameters, which respectively occupy instruction bits 7:4 and 3:0, are used to select a sub-image within memory memsel. The physical (X,Y) coordinates of the upper left corner of the sub-image are given by X=128 ,horgsel, and Y=128 *vorgsel. FIG. 11 shows MEC 20 timing diagrams for video bus write operations. To access the stored video data, MEC 20 outputs a single row address on the VA(10:0) pins at the beginning of each row access, and follows with a vector of column addresses on those same pins; one column address for each 32 or 16 bit word in the row. Row addresses are discriminated from column addresses via the VRAS-(3:0) and VCASO-(3:0) pins.

d. Reading Data from Video Memories

Pels are read by video interface unit 185 with or without 2:1 horizontal and vertical decimation. The decimation feature is used in hierarchical motion estimation where searching of the full resolution image is preceded by a search of a spatially coincident quarter resolution image as discussed in connection with FIGS. 2A and 2B. In a preferred embodiment of the invention, the decimation filter is a simple averager which operates on non-overlapping 2×2 blocks of pels. If the four 8 bit unsigned pel values making up a 2×2 block are given by a, b, c, and d, the output of the filter y is given by:

$$y = (a+b+c+d)//4$$

Where "//" means integer division rounded to the nearest integer, with half values rounded up.

Video interface unit 185 of MEC 20 is also capable of fetching new image data for the search memory while its current contents are being used for preforming block comparisons. In essence, this feature allows a search window to be efficiently "slid" across an image, avoiding unnecessary fetches of the large number of redundant pels in search areas surrounding adjacent macroblocks and avoiding the performance penalty of completely reloading a search window in response to each new input token received from image compression coprocessor 45.

Figure 12A:
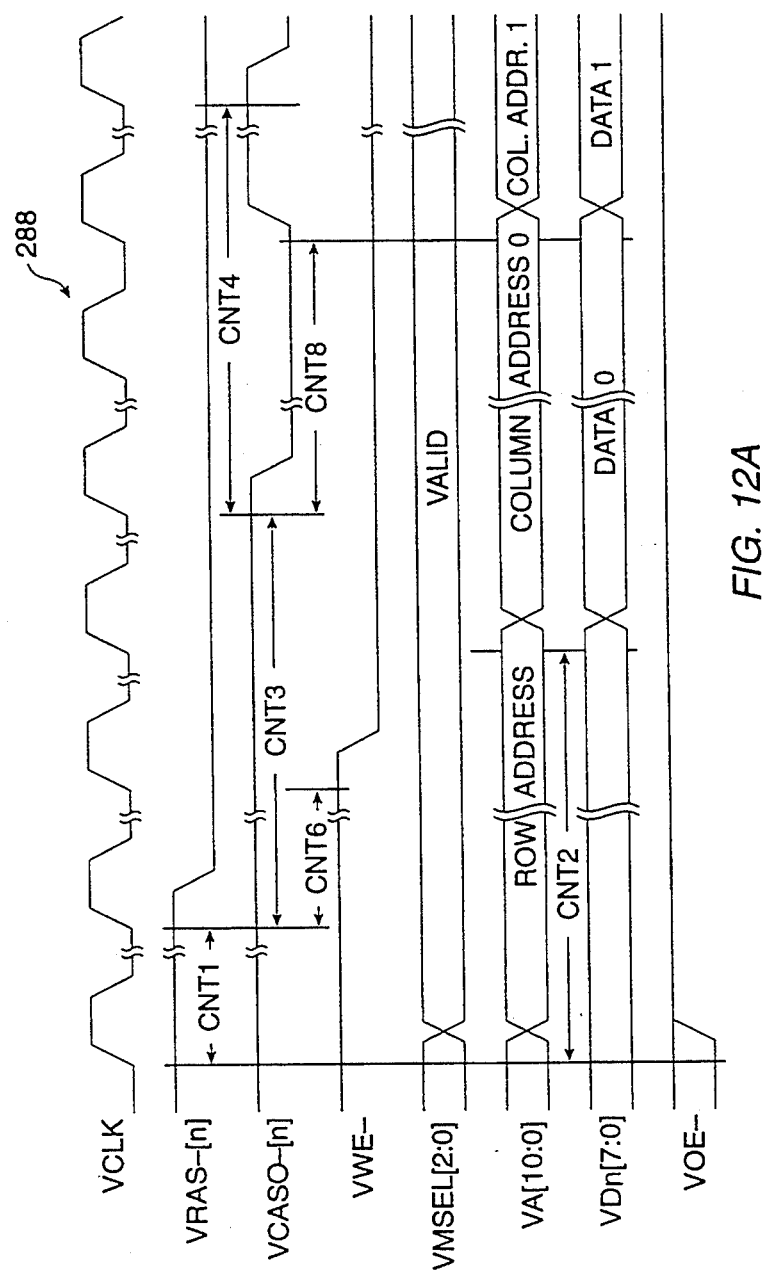
FIG. 12 is a timing diagram of an MEC video read operation according to an embodiment of the present invention.
Figure 12B:
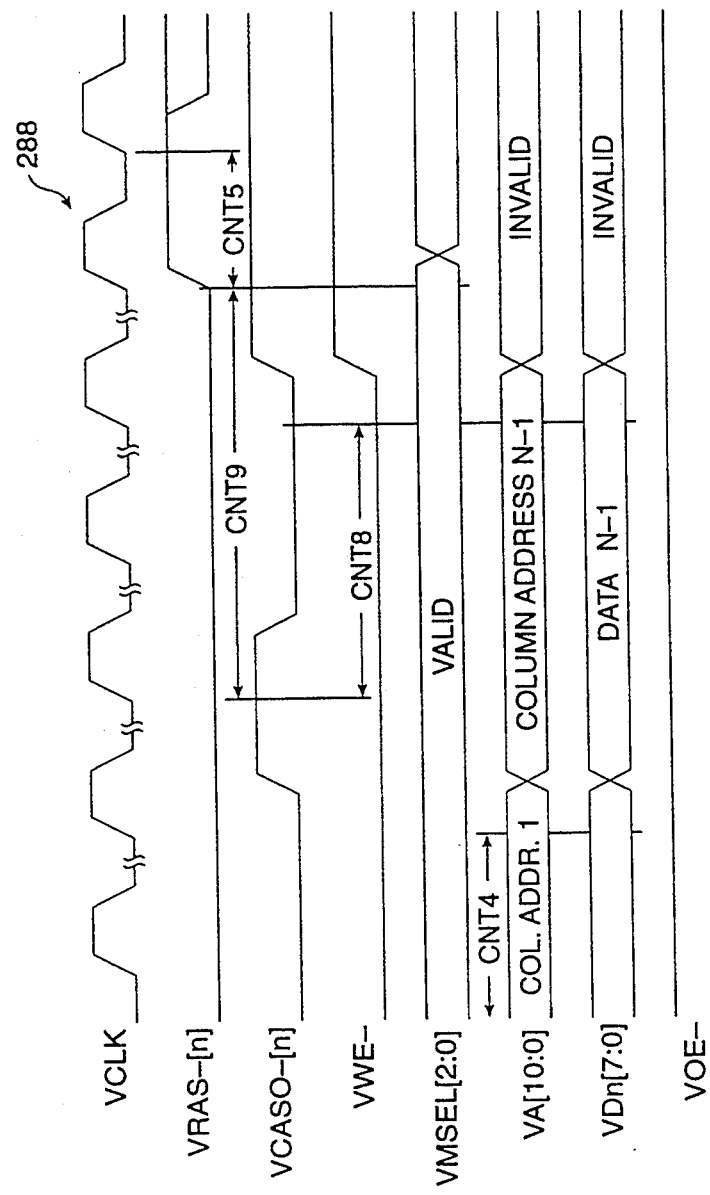

To assist in meeting critical DRAM timing parameters during read cycles, the MEC has an internal transparent latch to hold the incoming data after CAS returns "high". This allows the MEC to latch the data on the following cycle, thereby reducing memory access time requirements. This latch is clocked by the input signals VCASI-(3:0) generally connected to the DRAM CAS pins. FIG. 12 shows MEC 20 timing diagrams for video bus read operations.

e. Refresh of Video Memories

Video interface unit 185 may also be used to refresh the DRAM and VRAM memories. A built-in CAS-before-RAS refresh controller (not shown) may be optionally used to refresh DRAM-based memories on the video bus. CPU 122 activates the controller by writing to the video bus refresh enable (VREN) register. Writing a "1" to this register causes the refresh controller to clear its internal 16 bit refresh counter and to perform a single CAS-before-RAS refresh cycle on the video bus. To prevent a refresh cycle from causing a DRAM to go into test mode, MEC 20 refresh controller performs all CAS-before-RAS refresh cycles with write enable asserted. As long as VREN is 1, the refresh controller increments the refresh counter on each rising edge of VCLK and performs another refresh cycle on the video bus whenever the counter matches the contents of the following registers:

VRFPMS(7:0)—Video Bus Refresh Period, Most Significant Half
VRFPLS(7:0)—Video Bus Refresh Period, Least Significant Half VRFPMS and VRFPLS are initialized by CPU 122.

Whenever the 16 bit refresh counter matches the concatenation of VRFPMS and VRFPLS, the counter automatically resets and begins counting up to the next refresh cycle. The counter continues to increment, even while the refresh controller is performing a refresh cycle on the video bus. If the refresh counter signals a refresh while the video bus is busy, the controller does not preempt the current bus usage, but waits until the bus becomes available. The refresh counter continues to increment while the refresh controller waits for the bus.

In general, the refresh period is set to the minimum value of {Tref/nrows}/Tvclk as calculated over all DRAM's on the bus, where: Tvclk is the period of VCLK; Tref is the refresh time for a given DRAM or VRAM on the video bus, and nrows is the number of rows in the given DRAM or VRAM. This formula assumes that the amount of time during which the refresh controller is delayed from performing a refresh due to the bus being busy is not statistically significant.

To assist in maintaining DRAM and VRAM contents during MEC reset, the VREN and internal refresh counter registers are cleared in response to a hard reset or reboot. An MEC soft-reset (caused by host processor 38) does not affect the states of VREN, VRFPMS, VRFPLS, or the internal refresh counter.

The MEC's refresh controller is also designed to accommodate the special requirements of most DRAMs and VRAMs. Following an initial power-up pause of 100 to 200 u.s. or any time its refresh time interval is exceeded, a DRAM or VRAM generally requires an eight RAS cycle "wake-up" before the device will operate properly. As part of MEC 20 initialization, CPU 122 can accomplish this wake-up by writing "1" to VREN eight times in a row (separating adjacent writes by the time required to perform a refresh cycle), since each write to VREN generates a single CAS-before-RAS refresh cycle. Alternatively, after loading VRFPMS and VRFPLS and setting VREN to "1" CPU 122 can wait out eight refresh cycles before starting MEC 20 program execution.

Figure 13:
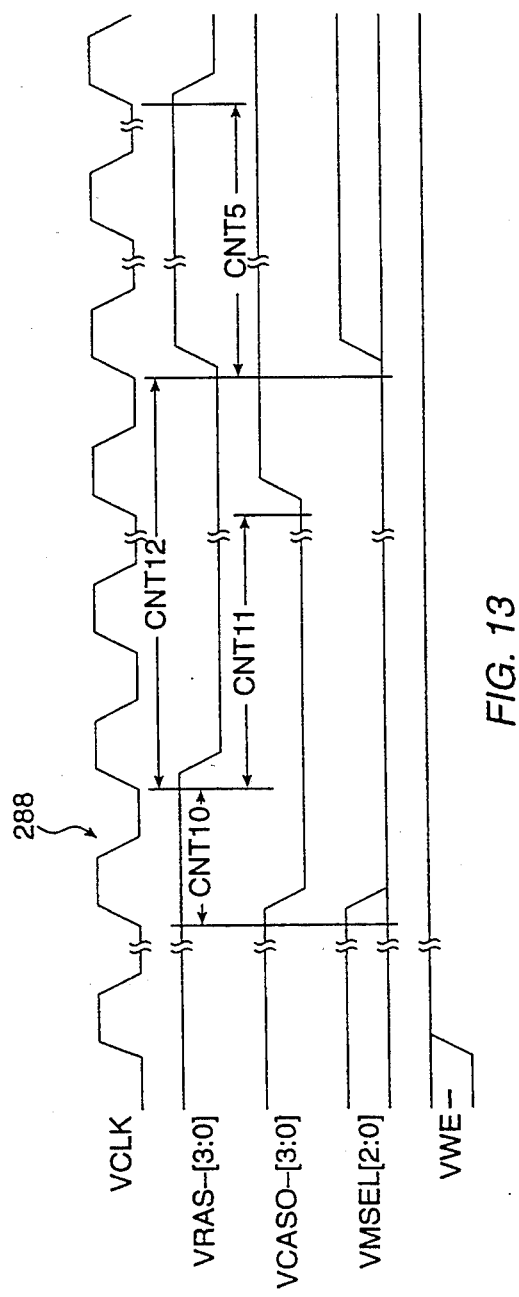
FIG. 13 is a timing diagram of a CAS before RAS refresh cycle according to an embodiment of the present invention.

FIG. 13 shows a timing diagram of a MEC CAS-before-RAS refresh cycle. During all refresh cycles, video interface unit 185 sets all VMSEL(2:0) pins to "low" to signal that refresh is occurring. Therefore, if VREN=1, only seven encodings of the VMSEL(2:0) pins are usable to select particular memory banks during normal read/write memory cycles since VMSEL(2:0)=0 is reserved to signal refresh cycles. All VCASO-(3:0) and VRAS-(3:0) pins are cycled as shown in FIG. 13 so that all memories on VD0(7:0) through VD3(7:0) are affected by refresh.

f. Video Input Buffer Architecture and Operation

Video input buffer 175 stores the full and/or quarter resolution image data fetched by video interface unit 185. Video input buffer 175 may function as a one or as four or more separate buffer segments. Loading can proceed in parallel with block matching. Both the full and quarter resolution pels may be stored in different segments of video interface buffer 175. This loading scheme avoids redundant fetches of pels during hierarchical searches. Pels in video input buffer 175 are subsequently transferred into a selected segment of the search memory under the direction of CPU 122.

Figure 14:
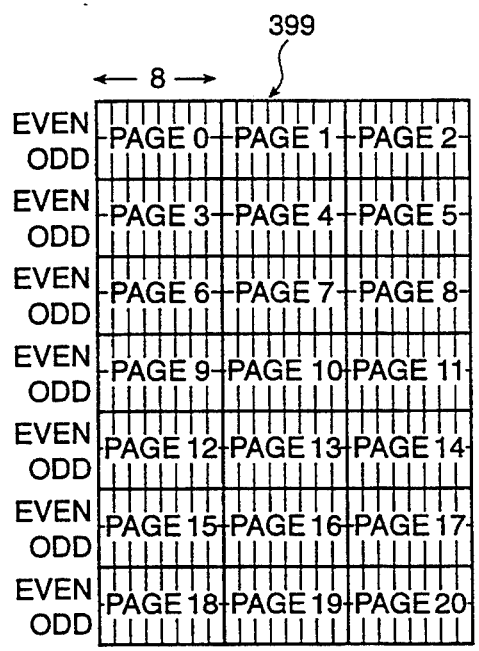
FIG. 14 is a diagram of a video input buffer logical page structure according to an embodiment of the present invention.

In one embodiment of the present invention, video input buffer 175 comprises a 2k byte memory, divided into 128 pages and partitioned into four segments. Physically, the video input buffer storage is made up of an even bank and an odd bank. The even bank stores even-ordered rows from the external video memory. The odd bank stores odd-ordered rows from the external video memory. In the embodiment of the invention, each bank is made up of eight 128×8 VIB_RAMs, forming an 8-pel row. Each page 399, as shown in the example of FIG. 14, corresponds to a two row by eight column tile of pels. Each video memory segment, in turn, comprises a rectangular array of pages. CPU 122 configures video input buffer segment k (for k=0, 1, 2, 3) by initializing the registers listed in Table 2.

Figure 15A:
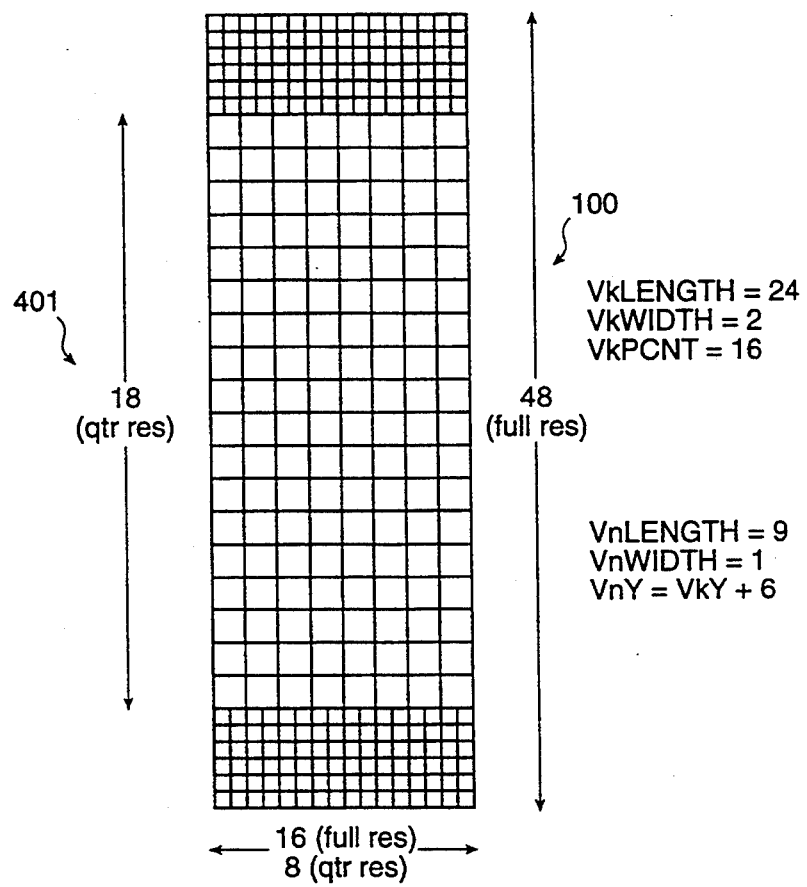
FIG. 15A is a diagram of a simultaneous load full and quarter resolution into the video interface buffer according to an embodiment the present invention.
Figure 15:
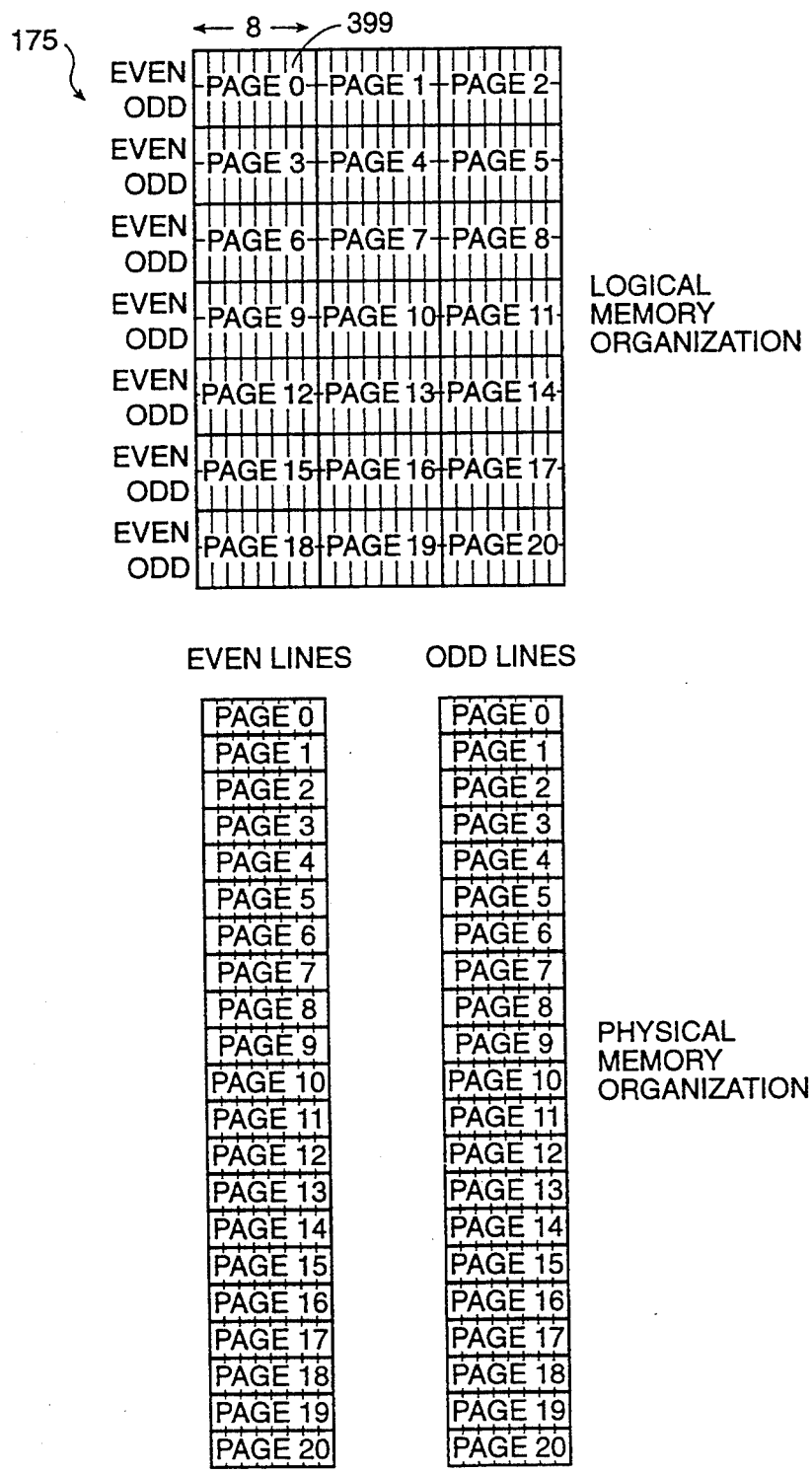
FIG. 15 is an diagram showing the logical to physical mapping in video buffer memory according to an embodiment of the present invention.

CPU 122 can command video interface unit 185 to load one or more video input buffer 175 segments automatically by writing to a load command register (LDVIB(7:0)). In response to CPU 122 writing to the load command register, video interface unit 185 first allows any previously started command to transfer the contents of video input buffer 175 to search memory 160 to finish; and waits for the MEC's video bus to become available before loading video input buffer 175. Bits 2k+1:2k of the load command register control loading of segment k and are encoded as shown in Table 3. The video interface timing control registers are listed in Table 4. FIG. 15 shows the logical segment to physical storage mapping of video input buffer 175. Video input buffer 175 is loaded with data from video interface unit 185. When loading a full-resolution image to video input buffer 175, 2 pels are written to each bank of the buffer RAMs at a time for 32-bit video data bus or 1 pel each for 16-bit video data bus. When loading a quarter-resolution image to video input buffer 175, only 1 pel is written to video input buffer 175 at a time. When copying images from video input buffer 175 to search memory 160, a full row of 8 pels are read out from each video input buffer 175 bank and written to search memory 160.

Video interface unit 185 begins servicing the video input buffer 175 segments in order starting with segment 0 by examining the contents of the load command register. The actions taken by video interface unit 185 for the various encodings of LDVIB(2k+1:2k) are as follows, for k=0,1,2,3:

LDVIB(2k+1:2k)=00:
Segment k is not loaded.
LDVIB(2k+1:2k)=01:
VkPCNT pels are fetched from each of 2*VkLENGTH image rows beginning at logical image coordinates (VkX, VkY) and stored undecimated only in segment k beginning at row 0, column 0. If VkPCNT is less than 8*VkWIDTH, only the first VkPCNT columns of each of the 2*VkLENGTH rows of segment k are written to. The VMSEL pins are set to VkMSEL.
LDVIB(2k+1:2k)=10:
VkPCNT pels are fetched from each of 4*VkLENGTH image rows beginning at logical image coordinates (VkX, VkY), decimation filtered, and stored only in segment k beginning at row 0, column 0 (i.e. segment k is loaded with a total of VkPCNT,VkLENGTH pels). If VkPCNT is less than 16*VkWIDTH, only the first VkPCNT/2 columns of each of the 2*VkLENGTH rows of segment k are written to. The VMSEL pins are set to VkMSEL.
'LDVIB(2k+1:2k)=11:
VkPCNT pels are fetched from each of 2*VkLENGTH image rows beginning at logical image coordinates (VkX, VkY) and stored undecimated in segment k beginning at for 0, column 0. If VkPCNT is less than 8*VkWIDTH, only the first VkPCNT columns of each of the 2,VkLENGTH rows of segment k are written to. Beginning at logical row VnY, where n=k+1 and VnY is greater than or equal to VkY, VkPCNT pels from each of the next 4*VnLENGTH image rows are also decimation filtered and the results stored in segment n beginning at row 0, column 0; see FIG. 15A shows an example of how a full resolution image 400 and quarter resolution image 401 might be loaded simultaneously into video input buffers 175, as described above. VkPCNT is less than or equal to 16*VnWIDTH, and 4*VnLENGTH+VnY must be less than or equal to 2*VkLENGTH+VkY. If VkPCNT is less than 16*VnWIDTH, only the first VkPCNT/2 columns of each of the 2*VnLENGTH rows of segment n are written. The VMSEL pins are set to VkMSEL.

Figure 16A:
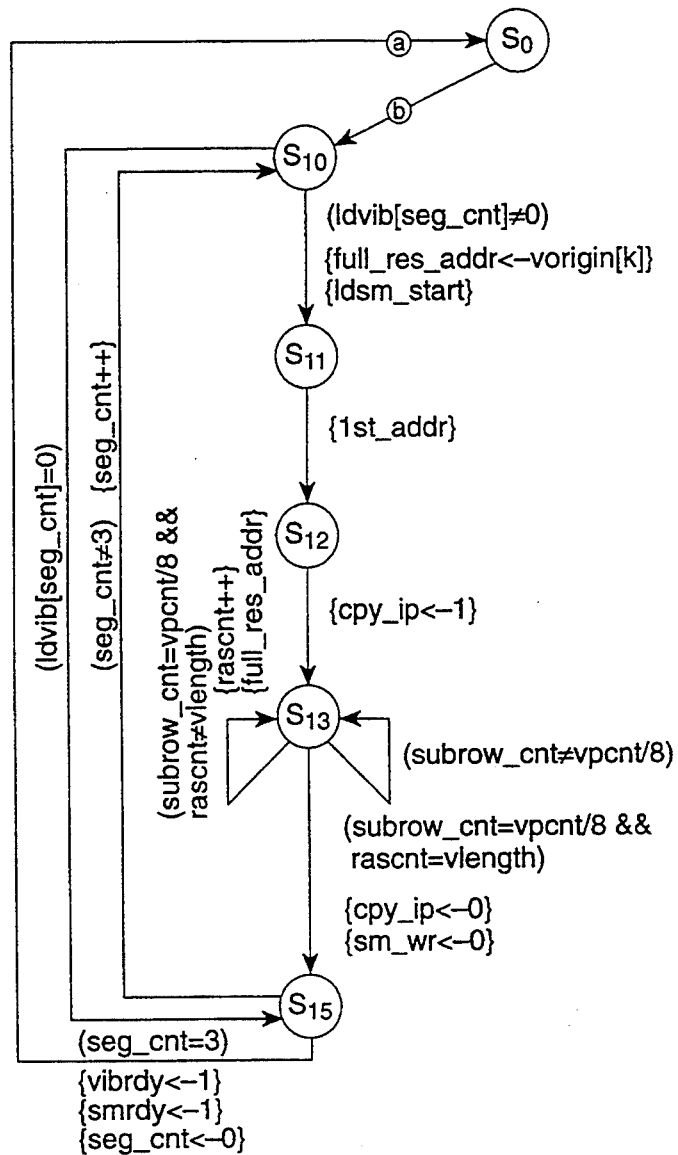
FIG. 16 is a state diagram for a video input buffer sequence according to an embodiment of the present invention.
Figure 16B:
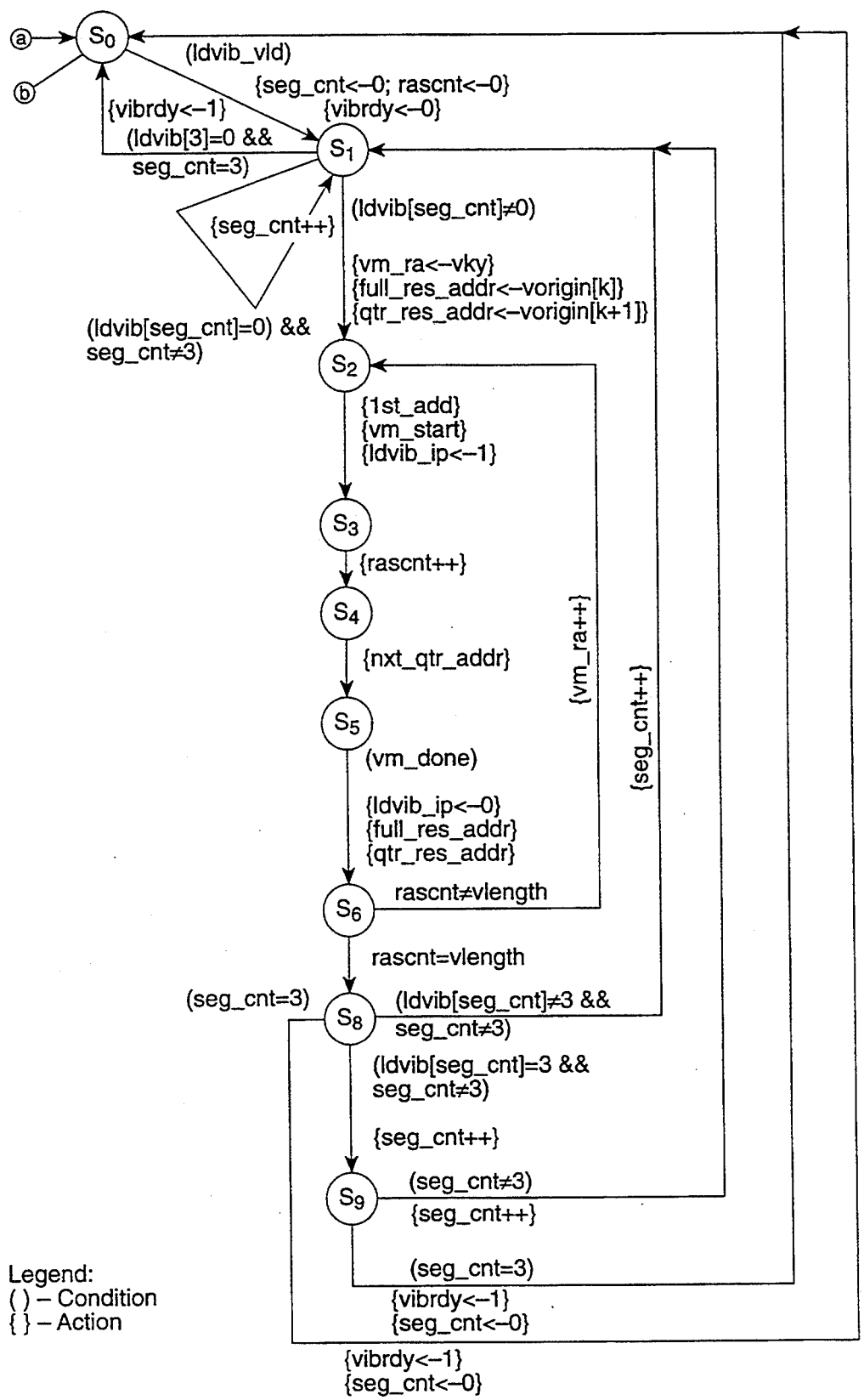

FIG. 16 shows the state transition diagram 459 of the video input buffer sequencer state machine. After reset, the state remains at state 0 until a LDVIB or LDSM command is received from CPU 122. Since either type of CPU commands may not get executed immediately by the state machine, they are latched until the state machine processes them. In one embodiment of the invention, for LDVIB command to be executable, VIU 100 must not have been allocated to the write video buffer unit for execution of a WRMEM instruction.

If a LDVIB command is executable, the state transitions to state 1. The LDVIB command latch (LDVIB_VLD_LCH) is also reset. The LDVIB command for the current segment, which starts at 0-, is inspected. If no-op (0), the segment pointer (SEG-CNT) is incremented to point to the next segment. If not no-op, the starting row address (RD_VM_RA) for the video memory read is formed from the corresponding Vk_Y input. A transition to state 2 is made. A request for a page-mode read cycle (VM_RD_START) is sent to VIU. The state machine then transitions through states 3, 4, 5 and remains at state 5 until the page-mode cycle is completed. It then transitions to state 6. The number of page-mode cycles RASCNT, which was incremented during state 3, is compared against the length of the current segment (VLENGTH). If the segment is not filled yet, the state machine returns to state 2 and RD_VM_RA is incremented for the next page-mode access. If the segment is filled-up, the state transitions to state 8. If not last segment yet and the current segment's LDVIB command does not load full-resolution and quarter-resolution images to two adjacent segments ("double-load") the state machine transitions back to state 1. At state 8, RASCNT is reset, and the segment pointer SEG_CNT is incremented. If "double-load" was executed, the segment pointer is incremented to cause the next segment to be skipped and the state transitions to state 9. At state 9, the segment pointer is incremented again. If not last segment, the state then transitions back to state 1. Otherwise, it returns to state 0 and sets VIB RDY status for the CPU.

At state 0, if an outstanding LDSM command is executable, the state machine switches to state 10. At state 10, the last LDVIB command executed is examined. If current segment's (starting at 0) LDVIB command was a no-op, the state transitions directly to state 15. If not no-op, the state transitions to state 11 and the LDSM_START signal is asserted for one clock cycle. The state machine then transitions to state 12. At state 12, CPY_IP is asserted and the state changes to state 13, where it remains until the segment is copied to the search memory. During state 13, the subrow indicator increments every clock cycle, and "modulo'ed" by Vk_WIDTH−1. The RASCNT is used to keep count of the number of logical odd/even row pairs read out of the VIB. When RASCNT reaches Vk_LENGTH-1, the state transitions to state 15. At state 15, the segment pointer is incremented. If not all segments have been processed yet, the state machine returns to state 10. Otherwise, it returns to state 0 and SM_RDY status is asserted.

The VIB sequencer is also responsible for allocating VIU to write video buffer unit when it is not already processing a LDVIB command. On simultaneous LDVIB and write video buffer unit request (AIU__WR__CMD), VIU is allocated to the write video buffer unit (ALLOC__WRVM). Neither execution of the LDVIB nor the WRMEM are interruptable by the other once execution has started.

2. Search Memory

Search memory 160 contains the section of the image to which the input token is compared for the CPU program to arrive at the best motion vector. In a preferred embodiment of the invention, search memory 160 is divided into 512 pages and, like video input buffer 175, may be partitioned into four segments. Each page of search memory 160 corresponds to a two row by eight column tile of pels. Each segment, in turn, comprises a rectangular array of pages, where the maximum number of page columns in any search memory 60 segment is 16, and the maximum number of page rows is 64. CPU 122 configures search memory 60 segment k (for k=0, 1, 2, 3) by initializing registers.

Figure 17:
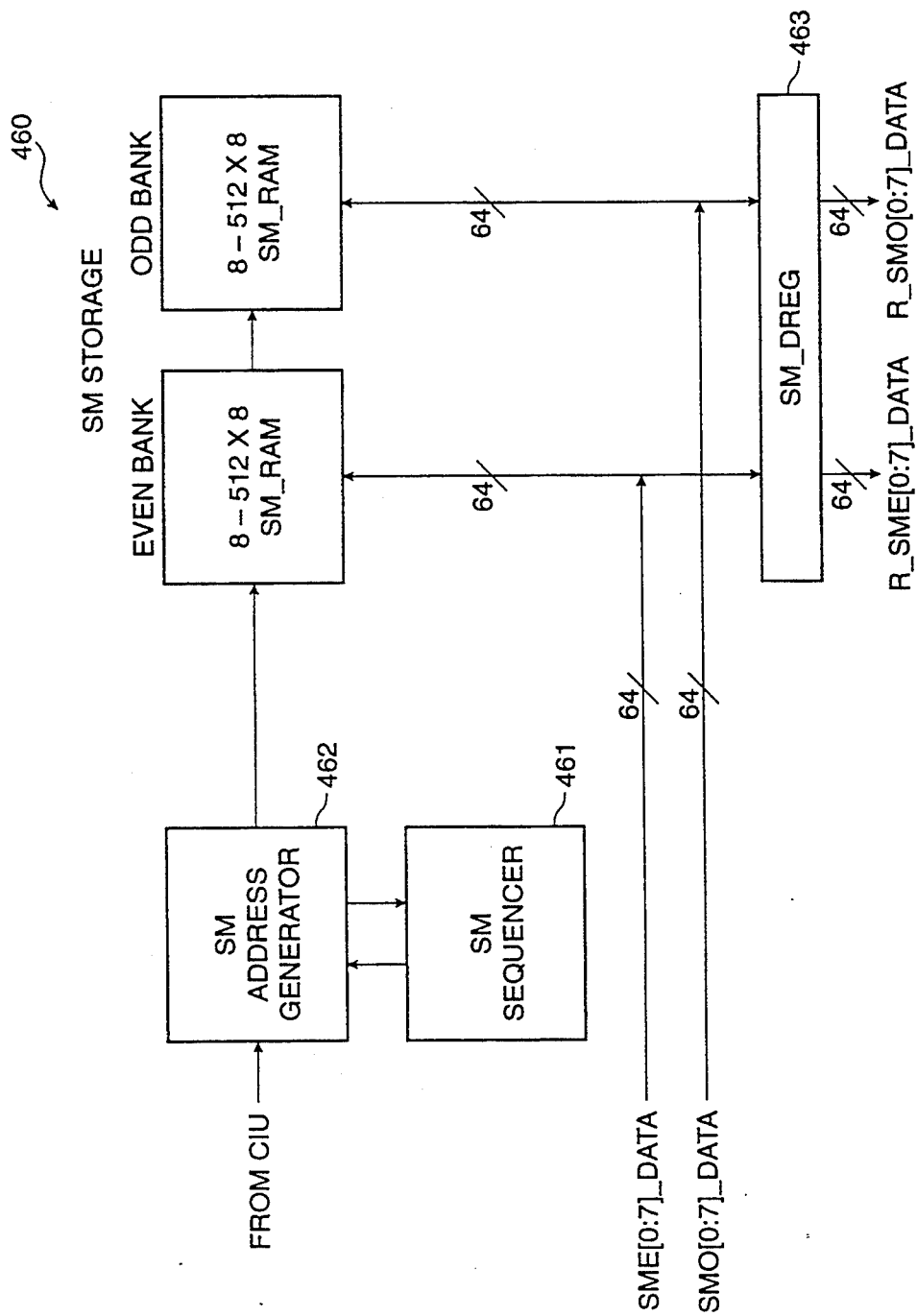
FIG. 17 is a block diagram of a search memory according to an embodiment of the present invention.

FIG. 17 shows a block diagram of search memory 160. Search memory 160 includes an SM storage 460, an SM sequencer 461, an SM address generator 462, and an SM data pipeline register 463. SM sequencer 461 is responsible for executing the CPU block match command and the copy to output token buffer command. In addition, SM sequencer 461 works in tandem with the VIB sequencer. The SM address generator 462 computes the physical addresses for SM storage 460.

Search memory storage 460 implements an 8K-byte logical search memory using an even bank 480 and an odd bank 481. Each bank is made up of eight 512×8 RAMS (SM__RAMs) to form an 8-pel physical row across each bank of SM storage. The four logical segments are specified by these CPU-loaded parameters: Sk__ORIGIN, Sk__WIDTH. Sk__ORIGIN is specified in even/odd row pairs; Sk__WIDTH is specified in multiples of 8 pel per bank. Search memory 160 is initialized by the LDSM which copies the VIB segments to the corresponding segments in the search memory.

Figure 18:
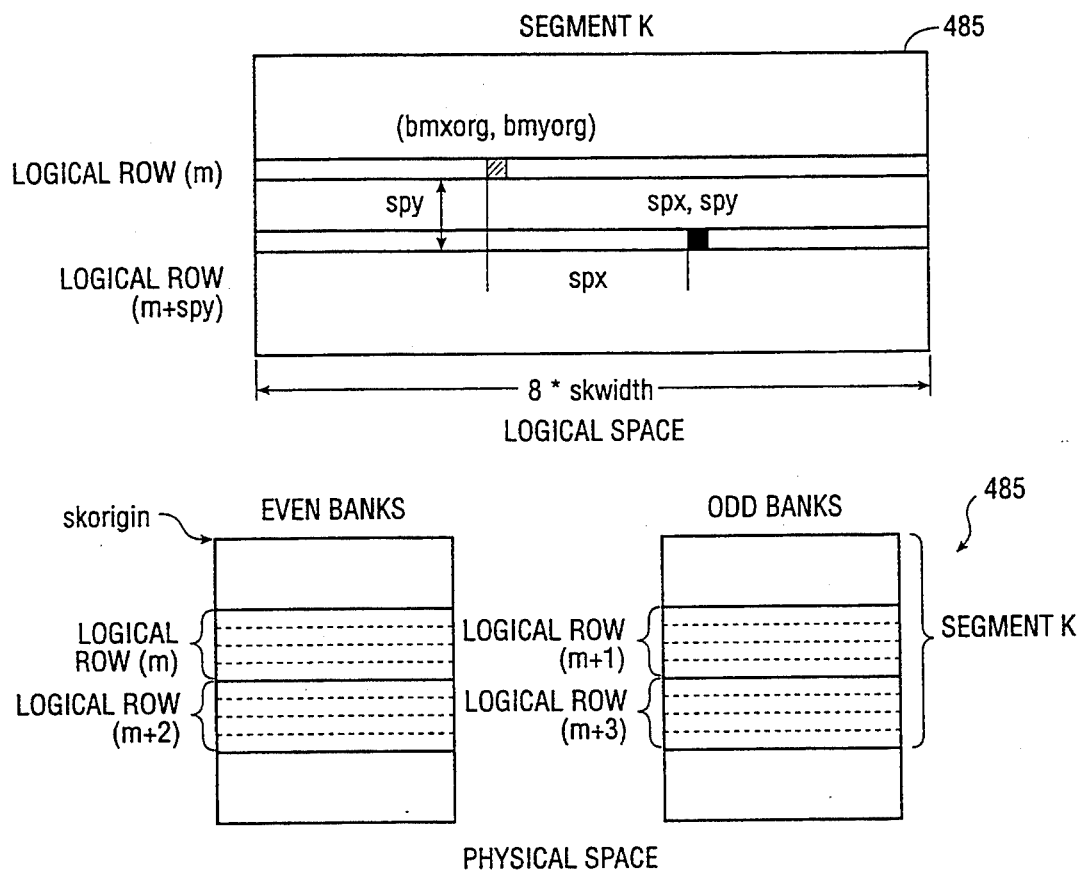
FIG. 18 is a diagram showing mapping of a logical memory segment to physical memory segment according to an embodiment of the present invention.
Figure 20:
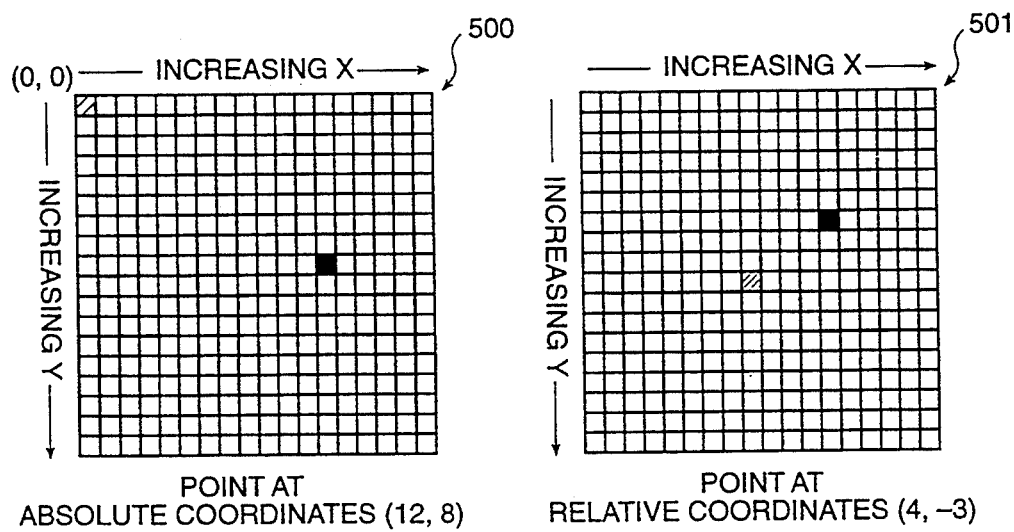
FIG. 20 is a diagram of absolute and relative search memory coordinate systems according to an embodiment of the present invention.

FIG. 18 shows the mapping from a logical search memory 485 segment to the physical search memory 486. SM address generator 462 is responsible for calculating the physical addresses to the two banks of search RAMs. In the logical to physical translation of search memory 160, the physical starting column and row addresses during a block match are computed as follows:

$$sm\_col\_addr=(BMXORG+(SPX>>1))\% \; 8;$$

where "%" is the "module" operator and ">" is right shift with sign extension;

$$sm\_row\_addr=Sk\_ORIGIN+((BMYORG+(SPY>>1))/2 * SK\_WIDTH+((BMXORG+(SPX>>1))/8\% Sk\_WIDTH;$$

The same formulae are used to compute the physical starting column and row address for search memory 160 during LDOTB command execution, with the OTB parameters substituted for the block match parameters. The starting column address is used mainly in the interpolator 190 to re-align the search image with the input token. During the LDSM command execution, the physical search memory address is computed as follows:

$$ldsm\_lrow=Sk\_ORIGIN+Vk\_ROW,$$
$$Sk\_WIDTH \; ldsm\_lrow=ldsm\_lrow+Vk_{COL};$$

for $$(i=0; \; i<Vk\_LENGTH; \; i++) \; \{for$$
$$(subrow\_cnt=0; \; subrow \; cnt<Vk\_WIDTH;$$
$$subrow$$
$$cnt++)ob\_adra=ldsm\_lrow+subrow\_cnt;$$
$$ldsm\_lrow=ldsm\_lrow+Sk\_WIDTH;\}$$

Figure 19A:
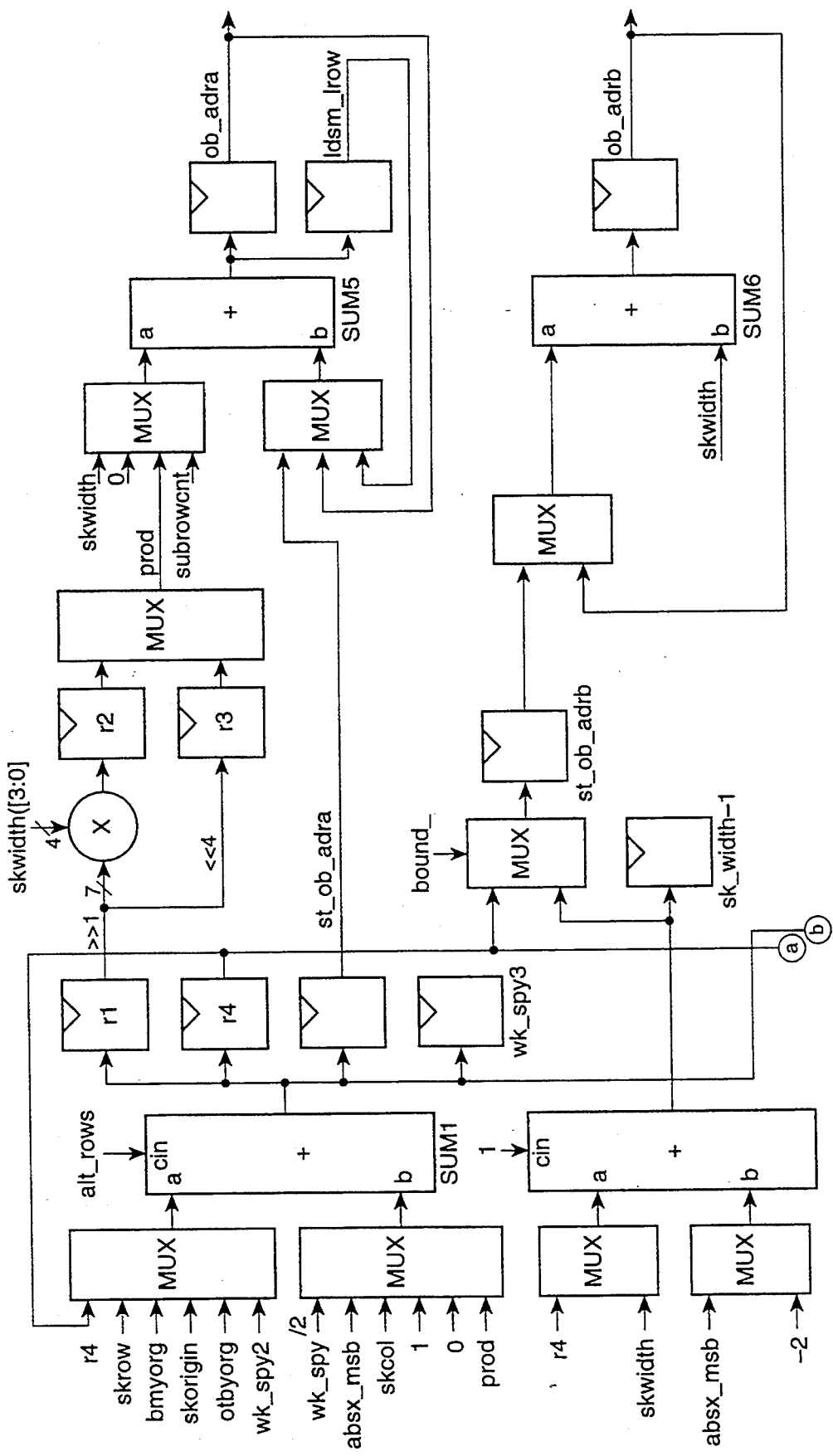
FIG. 19 is a block diagram of hardware for computing search memory address according to an embodiment of the present invention.
Figure 19B:
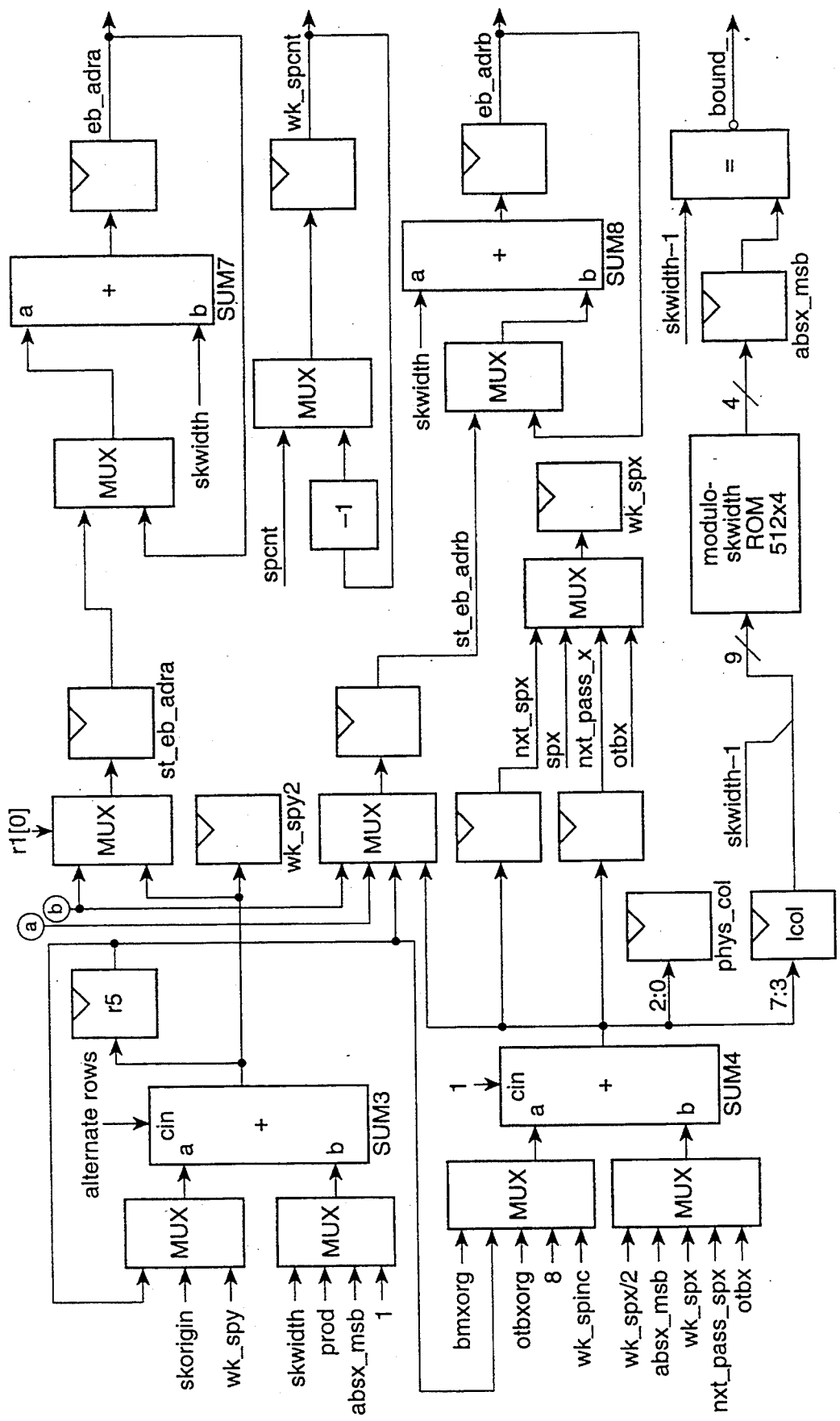

The SM address generator 462 also computes the relative y coordinates of the 2nd and 3rd search points in the triplet search. SM address generator 462 also computes the x coordinate of the next triplet to be block-matched. FIG. 19 shows a block diagram of the arithmetic resources to compute the address for search memory 160. Address 491 through 492 are used to form the starting addresses and the coordinates of the next searches. Adders 495 and 496 are used to form the write or read addresses for search memory 160 during the actual operation of the search memory.

SM sequencer 461 is responsible for executing the block match command and the copy to OTB command. SM sequencer 462 is also responsible for generating the timing control signals required by 190 block match processor unit 250, token buffer units 175 and 265 and the interpolator 190. These control signals are appropriately pipelined to match the latency of the data path at the units.

SM sequencer 461 also updates the SPRDY, BMPIDLE, LDOTBRDY status flags to the CPU. The SPRDY status is reset 1 cycle after SPY__VLD input is asserted. SPY__VLD is activated one cycle after the CPU write cycle to the SPY register in the CIU. SPRDY is set on the cycle that the CPU-loaded search parameters are copied into the local registers in SM address generator 462. The BMPIDLE status flag is reset at the same time SPRDY is set. It is reset when the last search has completed, through the minimum MAD detector logic in the BMP unit. The LDOTBRDY status flag is reset 1 cycle after OTBY__VLD input is asserted. OTBY__VLD is activated 1 cycle after the CPU write cycle to the OTBY register in the CIU. It is set at the completion of the copy to the output token buffer command.

CPU 122 copies the current contents of video input buffer 175 into search memory 160 by writing to the LDSM command register. A state machine then examines the contents of the LDVIB command register to determine which of the four video input buffer 175 segments contain the data to be transferred. If LDVIB(2k+1:2k)00 for k=0 or 2, the state machine copies 16*VkWIDTH pels from each of VkLENGTH page rows of video input buffer 175 segment k into search memory segment k beginning at page row VkROW, page column VkCOL. If LDVIB(2n+1:2-n)≠00 or LDVIB(2k+1:2k)=11 (binary) for n=1 or 3 and k=n−1, the state machine also copies 16*VnWIDTH pels from each VnLENGTH page rows of video input buffer 175 segment n into search memory segment n beginning at page row VnROW, page column VnCOL.

Figure 30:
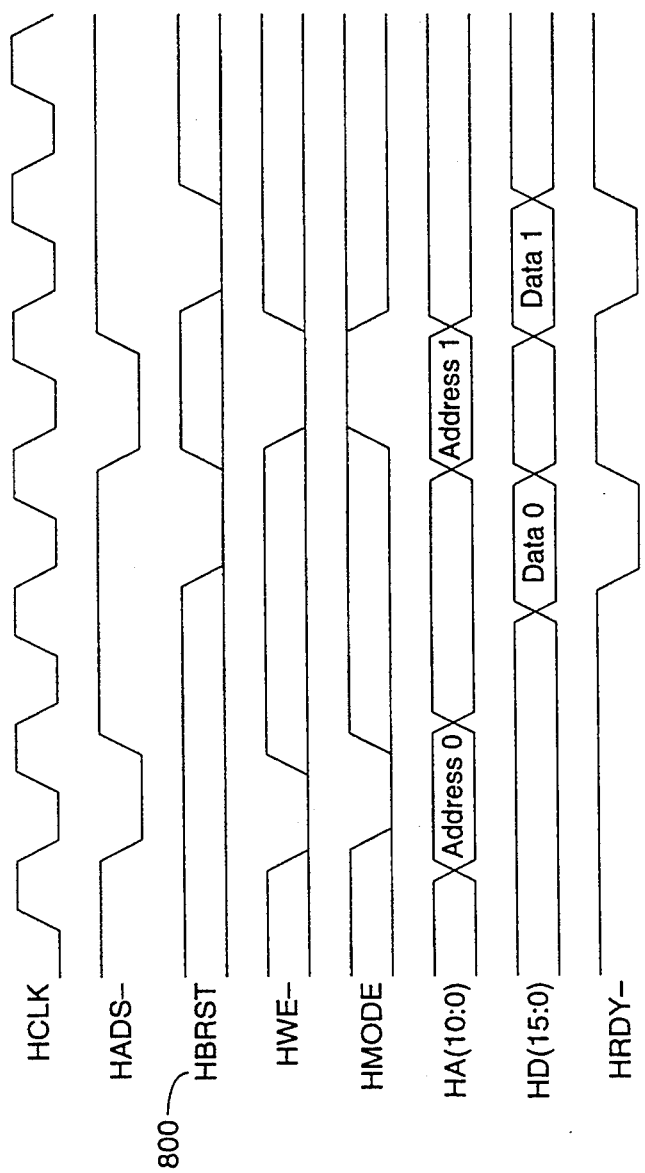
FIG. 30 is a timing chart of a non-burst write cycle on the MEC host interface bus according to an embodiment of the present invention.

After all segments have been copied, the state machine signals CPU 122. The CPU does not write to LDSM while a previously issued LDSM command is executing, or while block matching is in progress. However, after writing to LDSM, CPU 122 may then write to LDVIB without disrupting the LDSM's execution since the LDVIB command will not yet have started executing. As shown in FIG. 30, two types of two dimensional coordinate systems 500 and 501, may be used by the CPU when addressing a segment of the search memory. Absolute (X,Y) coordinates 500 assume an origin in the upper left corner of the rectangle of pels stored in the segment, and coordinate values are always positive integers. Relative (X,Y) coordinates 501 are specified relative to an origin defined by CPU 122 and may be positive or negative. The CPU 122 uses absolute coordinates when specifying where to write pels copied from video input buffer into the search memory and uses relative coordinates when specifying the blocks of pels to be read from search memory 160 during block matching or for transfer to token output buffer 265.

Search memory 160 outputs 16 pels on every clock cycle and can simultaneously contain from one to four separate search windows. For a two level hierarchical search, a search window generally holds either full or quarter resolution pels. Therefore, simple predictive searches such as those required by Px64, use two search windows when performed hierarchically. MPEG bidirectional prediction when performed hierarchically requires four search windows: two for forward prediction and two for backward prediction.

3. Block Matching Processor

Block matching processor 250 compares either an 8×8 or 16×16 block from a token pel buffer 270 with blocks of equal size read from search memory 160. Blocks are selected from a search memory segment specified by CPU 122 using (X,Y) search coordinates relative to an absolute origin also specified by CPU 122. For 16×16 block comparisons, the search coordinates may have half pel resolution, and block interpolation processor 190 will interpolate pels from search memory 160 as needed before sending them to block matching processor 250. The block matching processor 250 compares a block from a token pel buffer with three blocks from search memory 160 in response to each search coordinate pair sent by CPU 122. The three blocks are vertically aligned in search memory 160, with the search coordinate pair specifying the location of the upper left corner of the uppermost block. The blocks may start on either successive or alternating rows of search memory 160.

Figure 21:
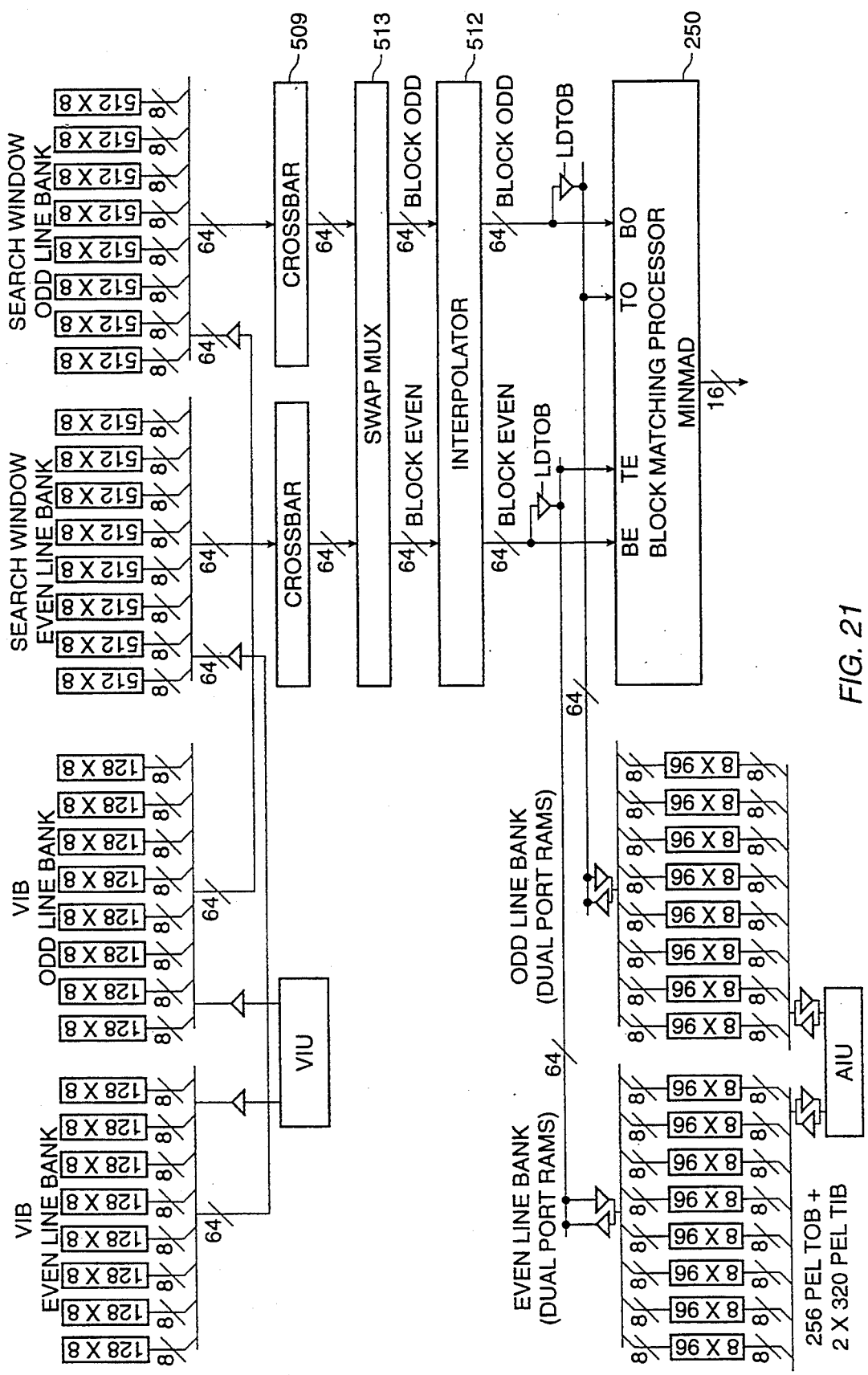
FIG. 21 is a block diagram of a block matching processor architecture according to an embodiment of the present invention.
Figure 21A:
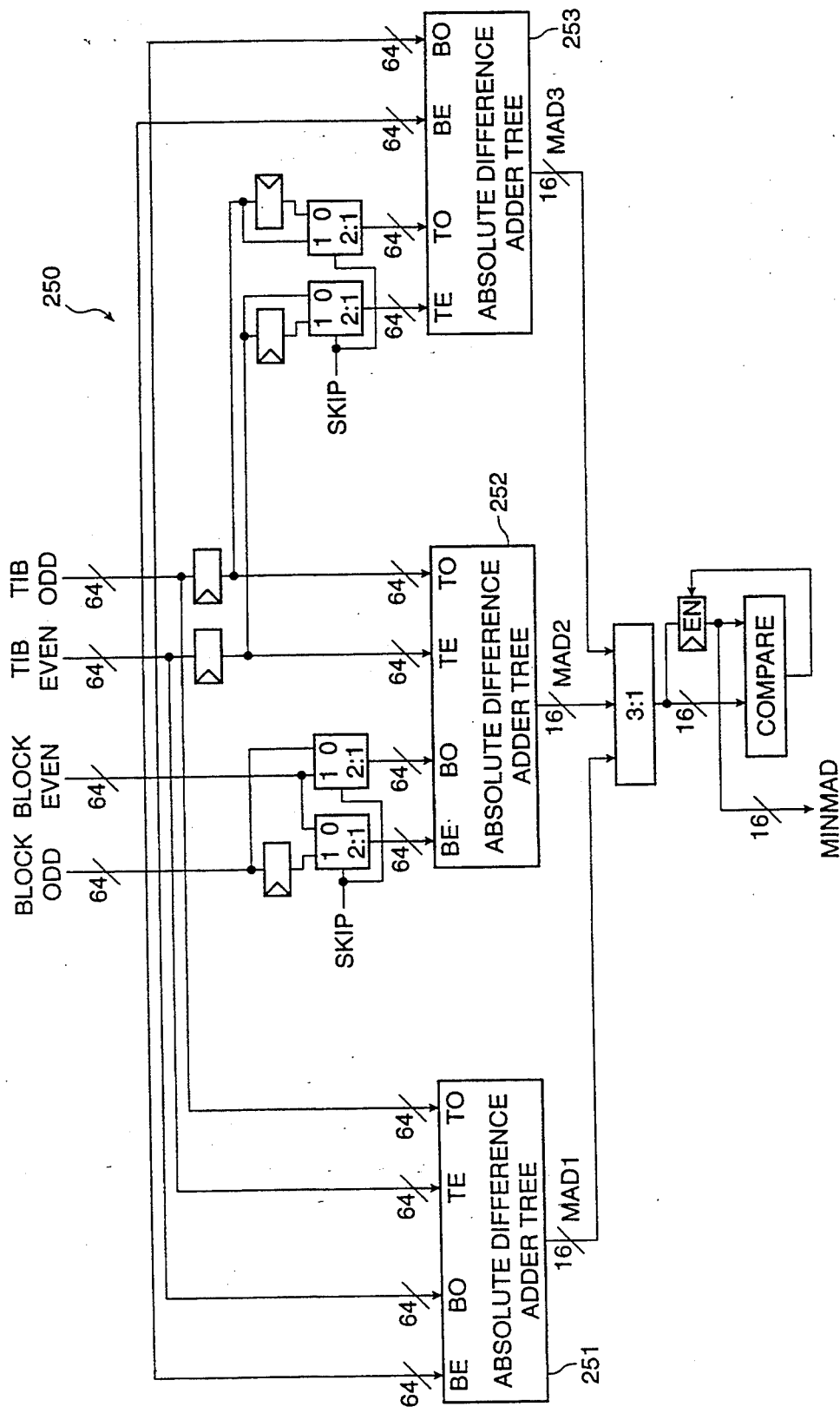
FIG. 21A is a more detailed block diagram of a block matching processor architecture according to an embodiment of the present invention.

FIGS. 21 and 21A are block diagrams of a block matching architecture including block match processor 250. Block matching processor 250 includes absolute difference processors 251-253 (AD_PROC) which calculate the MAD of a triplet of search points. The line-delay sub-unit (LINE_DLY) delays the rows of token data and the rows of image from interpolator unit 190, based on the type of triplet being block matched. The output from the line-delay feeds AD_PROC 2 and 3. Block matching processor 250 also includes the minimum MAD detector sub-unit (MINMAD_DET). This sub-unit compares the MADs from the three processor with the current minimum and updates the minimum.

In a preferred embodiment, block matching processor 250 contains three adder trees each capable of computing and accumulating the sum of 16 absolute differences every 50 MHz clock cycle. The first adder stage forms the difference between the image data and the token input data; the rest of the adder stages sum the absolute differences and accumulate the sum. The carry in for these adder stages are used to complete the absolute values of all the negative differences from the first adder stage. This computational power permits block matching on the 16×16 pel blocks to be performed at a maximum rate of one every 120 nsec; or on the 8×8 blocks at a maximum rate of one every 33.3 nsec.

Figure 22:
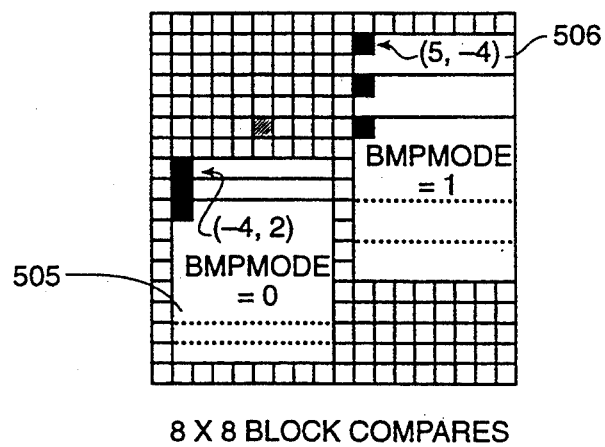
FIG. 22 is an illustration of block matching processor configurations according to an embodiment of the present invention.
Figure 22:
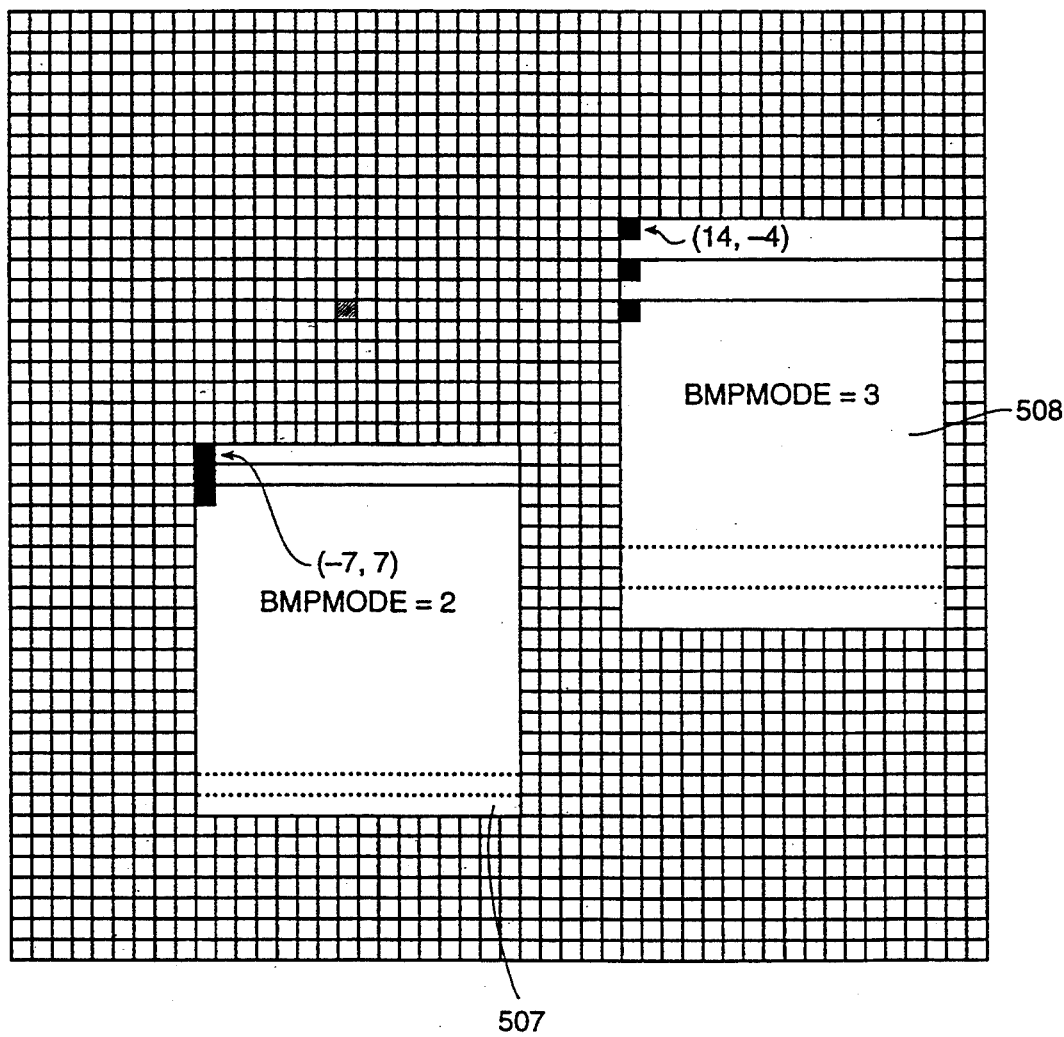

Prior to starting a search, CPU 122 configures block matching processor 250 and associated logic using configuration registers. FIG. 22 illustrates the block matching patterns 505, 506, 507 and 508, performed in response to the various settings of the configuration (BMPMODE) register. Block matching processor 250 computes the MAD for each of the three block comparisons and automatically tracks the minimum using the registers listed in Table 5-1. For 16×16 block comparisons, the MAD is an unsigned positive number up to 16 bits long; for 8×8 block comparisons, the MAD can be up to 14 bits long. Optimally, CPU 122 may cause one or more of the three MADs to be ignored when the minimum is computed.

The registers holding MAD data may be read at any time by CPU 122. Both the MADMS and MADLS registers are treated as containing unsigned positive integers and are sign-extended with zero bits to form 12 bit integers. MADX and MADY indicate the location of the current minimum MAD and are derived by block matching processor 250 from the search coordinates sent by CPU 122. MADX and MADY contain 2's complement integers with bit 7 being the sign bit and are also sign-extended to 12 bits when read. Block matching processor 250 initializes the minimum MAD to "infinity" when CPU 122 writes to the INITMAD command register.

Search coordinates (X,Y) are relative to the absolute origin stored in the BMXORG and BMYORG registers and indicate the location of the upper left corner of the first of the three vertically aligned blocks within search memory 160 to be compared with the input block from the token pel buffer 210. Each X or Y coordinate is an 8 bit two's complement fractional integer in the range [−64.0, 63.5] whose binary point is between bits 1 and 0. Search coordinates on half pel increments require horizontal and/or vertical pel interpolation by black interpolation processor 190. For 8×8 block matches, all search coordinates are assumed to be on full pel increments, and the least significant bit (i.e., the fractional part) of each coordinate is treated as zero, regardless of its actual value. Block matching performance in terms of the number of PCLK clock cycles per search coordinate triplet is shown in Table 5-2 for the various combinations of BMPMODE and interpolations. Interpolation results are sent to block matching processor 250.

When reading the search memory, block matching processor 250 translates relative search coordinates (xrel, yrel) to absolute coordinates (xabs, yabs) as follows:

xabs=((xrel>>1)+BMXORG) mod (8*SkWIDTH)

yabs=((yrel>>1)+BMYORG) & 0×7f where "a>>b" means right shift a by b bits with sign extension, "a & b" means bit-wise "and" a with b, "0×7f" is the hex integer "7f" and all additions are done using 8 bit two's complement arithmetic. Block matching processor 250 horizontally addresses the search memory "module" by the memory width; i.e., search coordinates can "wrap around" horizontally, allowing a window in the search memory to act like a circular buffer and be horizontally "slid" across an image. However, vertical address wrap-around is not supported, and if search coordinates cause row accesses to overrun the first or last row of a search memory segment, the data fetched will be indeterminant and cause one or more erroneous MAD calculations.

CPU 122 configures a pattern of search coordinates for processing by block matching processor 250 by writing to the registers shown in Table 6. CPU 122 writes to the registers in Table 6 when the SPRDY status bit is "1". CPU 122 then writes to SPY. Block matching processor 250 interprets a write to SPY as an indication that all of the registers in Table 6 contain valid data for a new search pattern. A write to SPY by CPU 122 also automatically sets SPRDY to "0". When block matching processor 250 is ready to start processing a new pattern, block matching processor 250 copies the registers in Table 6 into its own set of working registers for use during block matching and then sets SPRDY to "1" thereby allowing CPU 122 to describe another pattern before the current one has finished executing.

Blockmatching processor 250 sets the BMPIDLE status bit to "1" when both the SPRDY status bit is "1" and all the block matching processor pipelines are empty (i.e., the final MAD from the last search pattern has been computed). To avoid disrupting any searches in progress, CPU 122 may write to INITMAD or to any of the block matching configuration registers listed in Table 7 only when BMPIDLE is "1".

Figure 23:
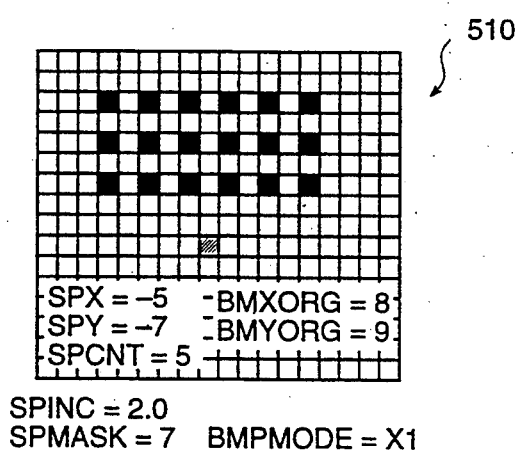
FIG. 23 is an example search pattern executed by the block matching processor of the present invention.

FIG. 23 shows an example 510 of how block matching processor 250 executes the search pattern described by the registers in Table 6. Block matching processor 250 matches the search pattern against a total of SPCNT+1 triplets whose relative coordinates are given by (SPX+k*SPINC,SPY), for k=0,1, . . . , SPCNT. By setting the SPMASK register to other than binary "111", the CPU may "mask out" MADs to be excluded from the minimum MAD calculation in block matching processor 250.

4. Block Interpolation Processor

If the least significant bit of either X or Y search coordinate is "1" and 16×16 block matches are being performed, block interpolation processor 190 performs horizontal and/or vertical interpolation of search memory data. In a preferred embodiment of the invention, the output rate of block interpolation processor 190 matches the maximum input rate of block matching processor 250. Table 8 summarizes the various block sizes read from search memory 160 by block interpolator 190 and interpolated to form the 16×16 blocks processed by block matching processor 250.

Pel interpolation is performed on the block sizes shown in Table 8 using the conventions established by the International Standards Organization MPEG1 specification. As an example, consider the following 3 by 3 array of pels on a logical grid with half pel spacing:

| P1 | H | P2 |
| V | B | X |
| P3 | X | P4 |

Pels P1, P2, P3, and P4 are located at full pel coordinates; pels H, V, and B are located at half pel coordinates and need to be interpolated from P1, P2, P3, and P4. The bilinear interpolation formulas used by MEC 20 are as follows:

| | |
|---|---|
| H = (P1 + P2) // 2 | (horizontal interpolation only) |
| V = (P1 + P3) // 2 | (vertical interpolation only) |
| B = (P1 + P2 + P3 + P4) // 4 | (bidirectional interpolation) | where "//" indicates integer division with rounding to the nearest integer, with half-integer values rounded up.

The block diagram of FIG. 21 shows interpolator 190 in relation to a crossbar switch 509 and a swap mux 507. The crossbar switch sub-unit (XBARS) implements eight 8-way, pel-wide switch for each bank of search memory 160 data output. Each set of switches allows the block match or load output token buffer to start from any column, instead of always starting at column 0 of each bank. The crossbar switches for the two banks of search memory data are operated in the same way.

A line swap sub-unit (SWAP_MUX) swaps the even and odd rows from search memory 160, if desired, before sending to either block match processor 250 output token buffer. This logic allows the block match or copy to output token buffer to start from an odd logical row.

Figure 24A:
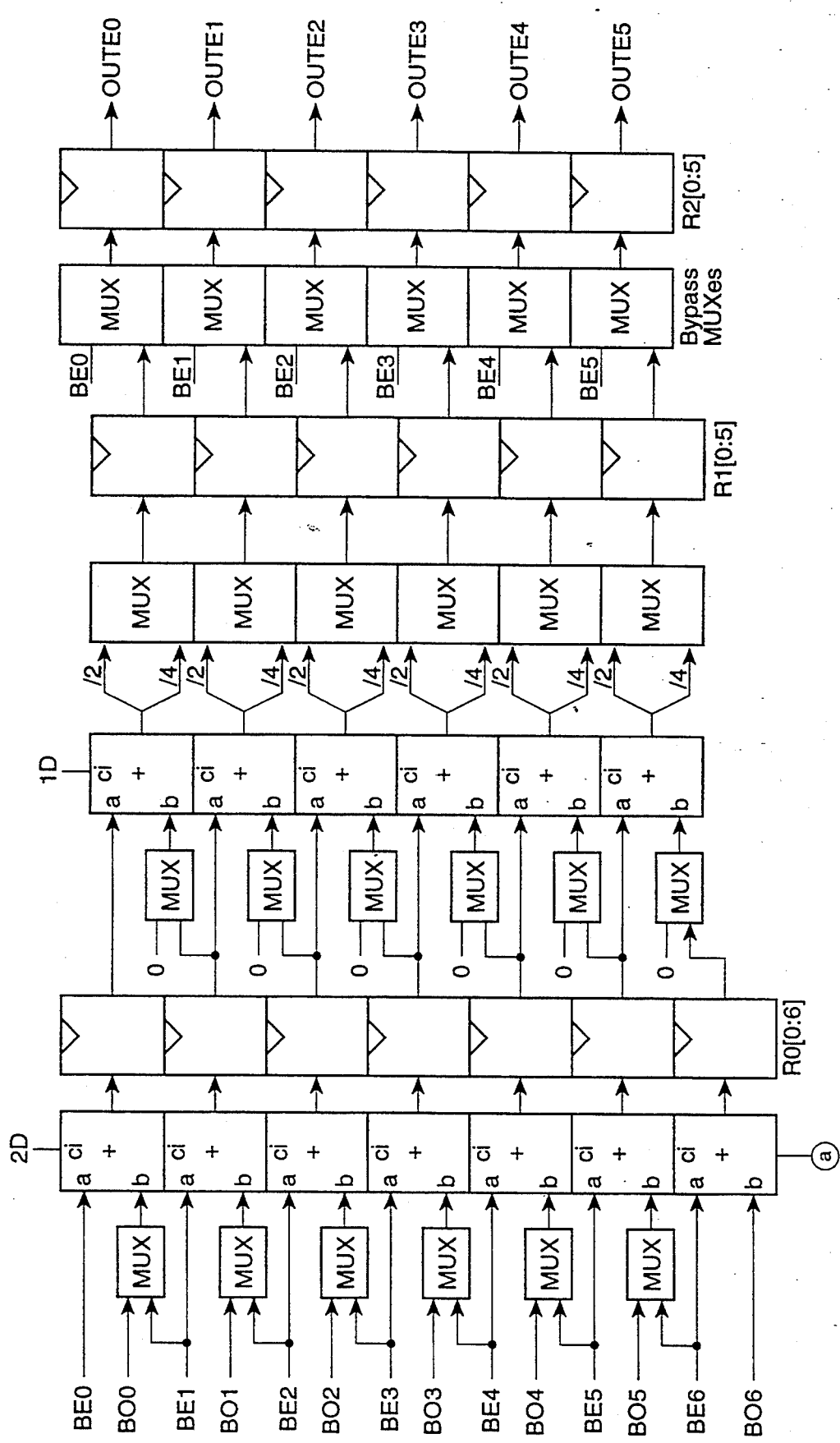
FIG. 24 is a block diagram of an interpolator according to an embodiment of the present invention.
Figure 24B:
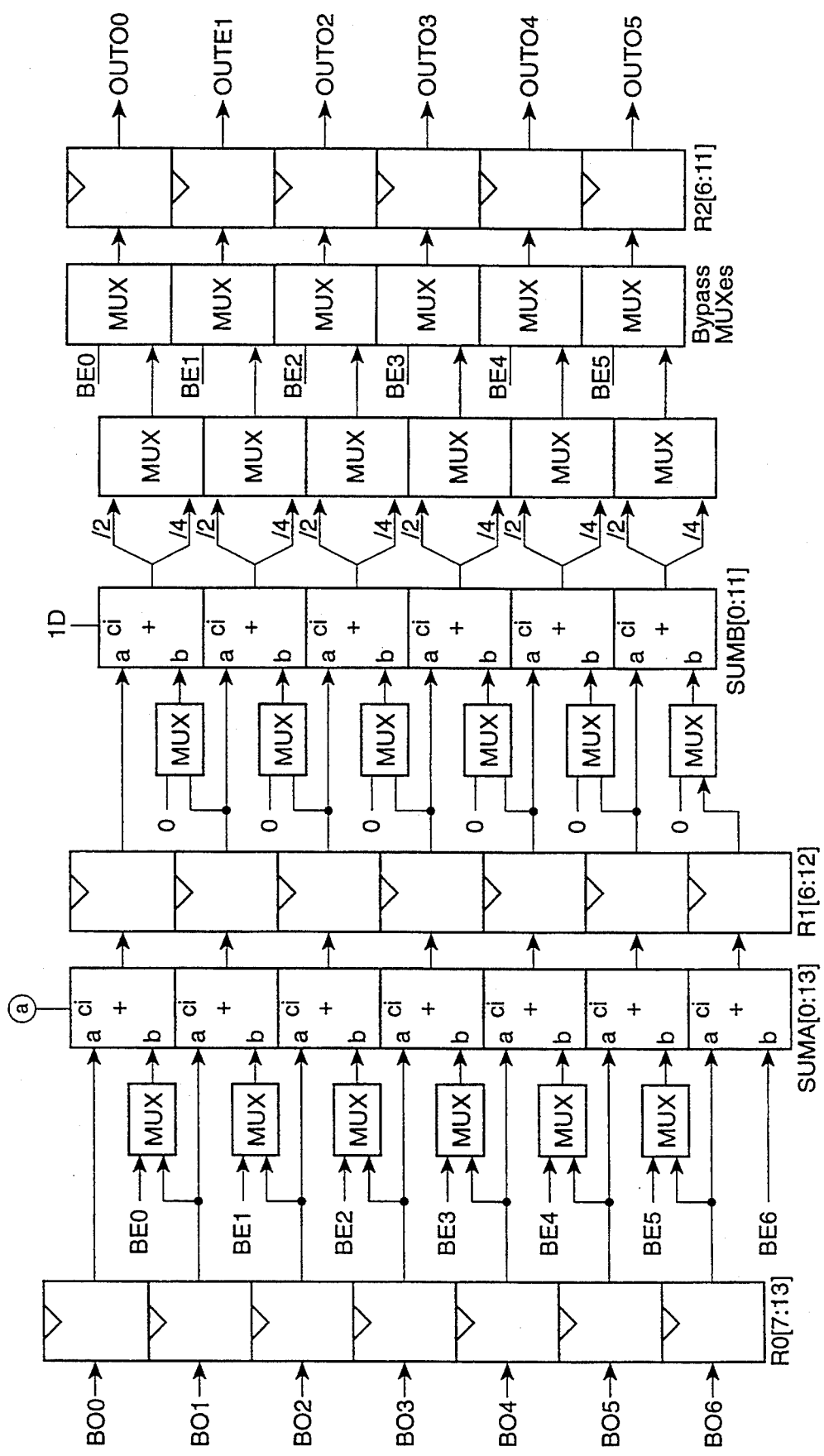

The interpolator unit 190 also includes the half-pel interpolator processor 512 (INTERPOLATE). It is capable of interpolating an image on the x axis or y axis, or both, or none at all. Interpolator 512 breaks up the 16-pel logical row into three passes. In the first pass, six interpolated pels are output per logical row. In the second pass, the next 6 pels are output. Finally, in the third pass, the last 4 pels are output. FIG. 24 shows the architecture of interpolator 512. It has a latency of 3 clock cycles for any type of interpolation. The last stage multiplexers in the interpolator implement the bypass function when no interpolation is desired. In that case, all 8 pels from each search memory bank are passed through interpolator 190.

5. Central Processing Unit

Figure 25:
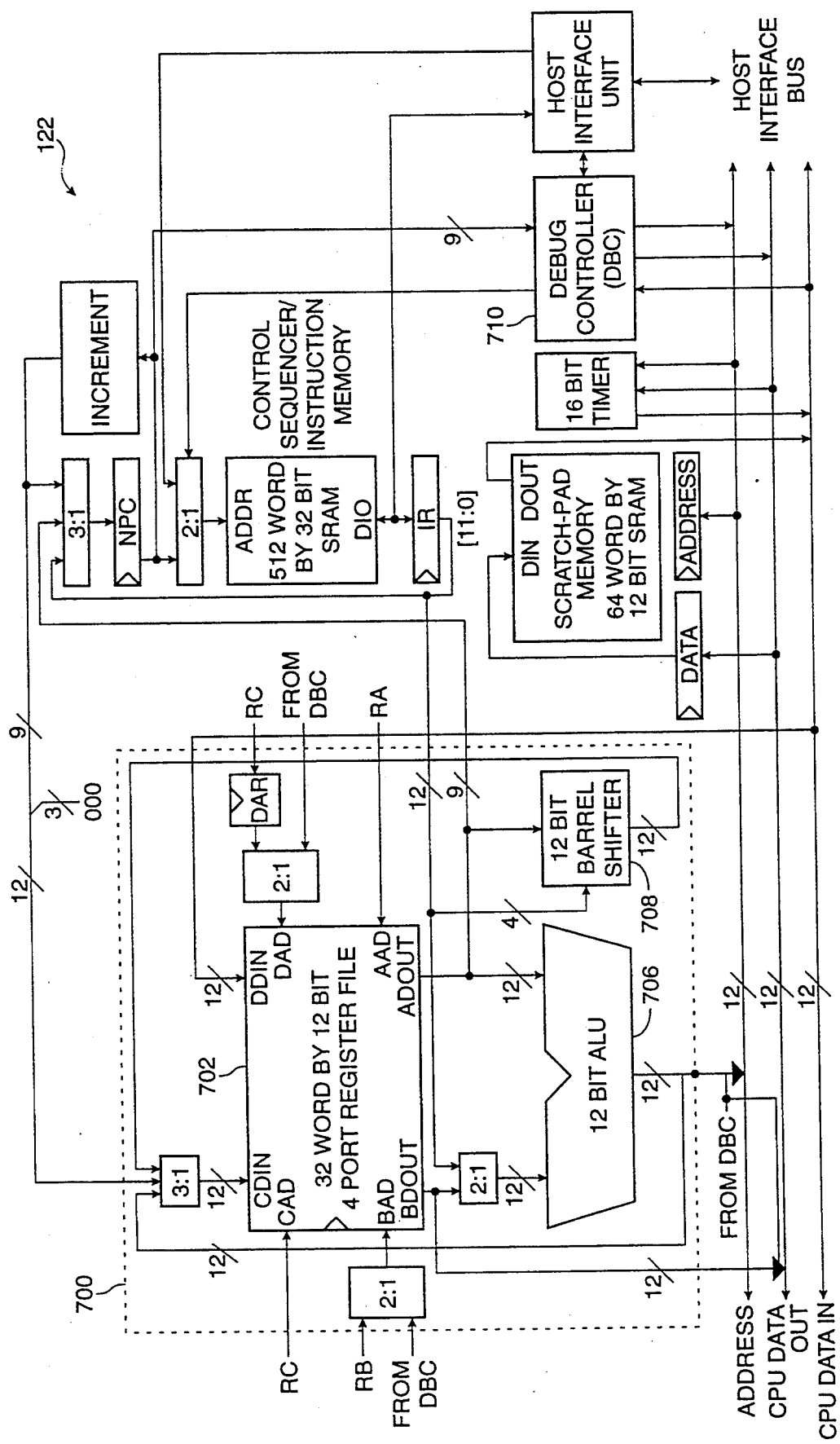
FIG. 25 is a block diagram of a MEC CPU according to an embodiment of the present invention.

The CPU 122 coordinates all activities on the motion estimation coprocessor chip of the present invention. FIG. 25 illustrates one embodiment of CPU 122 of the present invention. In the block diagram of FIG. 25, CPU 122 comprises a 12 bit RISC microcontroller core 700 and 64 word scratchpad memory 125. The CPU 122 also includes a debug controller 710. Core 700 contains a 32 word, 4 port register file 702, 12 bit ALU 706, and 12 bit bidirectional barrel shifter 708. CPU 122 contains several registers and memories which it may access in the course of program execution. Most CPU 122 registers reside in the CPU memory map and may be accessed by the CPU program using load and store instructions. Special registers may also be provided to permit CPU 122 to communicate with external host processor 38 (FIG. 1) via a CPU-to-host interrupt.

Figure 26:
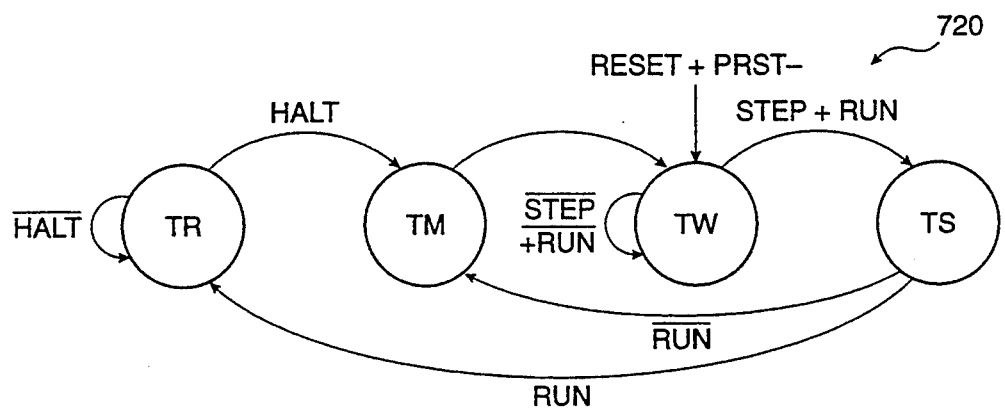
FIG. 26 is a debug controller state diagram according to an embodiment of the present invention.

CPU 122 operates in one of a functional or debug mode. A state machine inside debug controller 710 determines the operational mode of CPU 22 based upon commands received from host processor 38. The state diagram 720 for debug controller 710 appears in FIG. 26. State transitions occur on each edge of the system clock and are controlled by host processor 38 writing to the RUN, HALT, and STEP locations in the host memory map.

a. Debug Mode

In the debug mode, CPU 122 is halted and executes instructions only under the single step control of host processor 38. During the debug mode, host processor 38 may inspect and/or modify the CPU 22 register file and program memory, all registers and memories connected to the CPU 122 memory bus and read the CPU current (PC) and next program (nPC) counters. The PC register is within debug controller 710, and its input is connected to the output of the nPC register in FIG. 25. The CPU 122 enters the debug mode via the TW state when the MEC is reset or via the TM state when the host writes to HALT when CPU 122 is in the functional mode. While in the debug mode, CPU 122 is in one of the TM, TW, or TS states.

Figure 27:
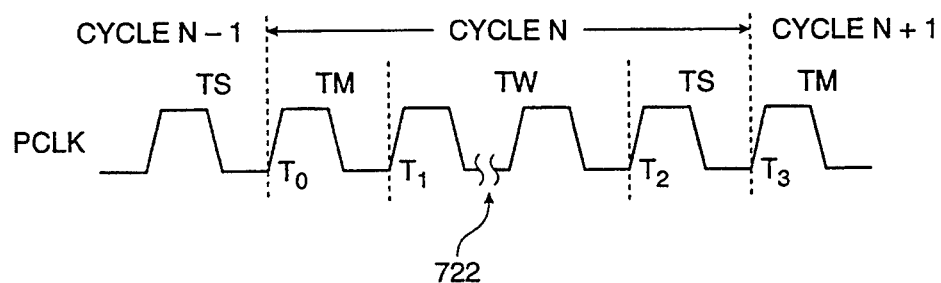
FIG. 27 is a timing chart for a debug cycle according to an embodiment of the present invention.

In debug mode, CPU instructions are executed in "cycles" consisting of multiple periods of PCLK. As shown in FIG. 27, each cycle begins in the TM state and ends in the TS state. Between the single clock TM and TS states are an undefined number of clock periods 722 during which the debug controller 710 is in the TW state and the host processor may inspect and/or modify the contents of registers and memories. Exactly one instruction is executed per debug cycle.

During the TM state which begins at time $T_0$ in FIG. 27, debug controller 710 services any load or store instructions which were in the instruction register (IR) during the previous debug (or, possibly, functional) cycle. Data read by a load instruction is fetched and clocked into a 12 bit memory data holding register inside debug controller 710. CPU 122 program-directed loads of the register file, DAR, nPC, and instruction register are disabled, and ALU 706 and the register file 702 B port are prevented from driving the CPU memory address and data output bus. Debug controller 710 also sets the DBRDY status bit to "1" and clears the HALT flip-flop during the TM state.

After spending one PCLK cycle in the TM state, debug controller 710 enters the TW state beginning at $T_1$ during which it again clears the HALT flip-flop and allows the host processor to read the nPC or PC register, read or write any address in the CPU register file, or read or write any address in the CPU memory map. The host reads a register or memory by writing its address to RADDR (12:0) in the host memory map. Address assignments appear in Table 9. A host write to RADDR (12:0) also sets the DBRDY status bit to "0". Debug controller 710 then reads the location selected by RADDR (12:0) into the DBDAT (11:0) register and sets DBRDY to "1" when finished. In the meantime, host processor 38 may poll DBRDY and read DBDAT (11:0) once DBRDY is "1".

Host processor 38 writes data to a register or memory by first writing the data to DBDAT (11:0), and then writing the address of the register or memory to WADDR (12:0) in the host memory map. A host write to WADDR (12:0) also sets the DBRDY status bit to "0". Debug controller 710 then writes the contents of DBDAT (11:0) to the address in WADDR (12:0) and sets DBRDY to "1" when finished. The host polls DBRDY to make certain DBRDY is "1" before attempting another read or write.

If the STEP or RUN flip-flop is set while debug controller 110 DBC is in the TW state, debug controller 710 transitions to the TS state at time $T_2$ as shown in FIG. 27. A host processor 38 write to STEP also causes debug controller 710 to set the DBRDY status bit to "0". Note that to guarantee that each write to STEP causes the execution of exactly one CPU instruction, the host does not write to STEP unless it can also guarantee that DBRDY is "1" by either reading DBRDY or simply inserting a time delay of at least four PCLK cycles between writes to STEP.

During the TS state, debug controller 710 clears the STEP and HALT flip-flops and re-enables all the register load and CPU 122 bus signals previously disabled at time $T_0$ to allow new register states (including new contents of the PC, nPC and instruction register) to be clocked in at time $T_3$. This includes clocking the contents of debug controller memory data holding register into the appropriate address of the register file if the current debug cycle is the "delay slot" of load instruction from the previous cycle. TS does not change the state of DBRDY.

If the RUN flip-flop is not set during the TS state, debug controller 710 transitions to the TM state to begin the next debug cycle at time $T_3$. If the RUN flip-flop is set, debug controller 710 transitions to TR, and CPU 122 enters the functional mode.

b. Functional Mode

The CPU 122 transitions from debug to functional mode when host processor 38 writes to RUN. When in the functional mode, CPU 122 executes a RISC program stored in memory and controls other units on the chip via internal memory-mapped load and store operations. The RISC program directs the search algorithm being carried out by block matching processor 250, and controls the video input buffers, token input buffers, and token output buffer. The RISC core provides for single clock cycle (PCLK) execution of each of its 22 instructions except those dealing with memory loads and program jumps. Instructions dealing with memory loads and program jumps require an extra clock cycle to complete.

Figure 28:
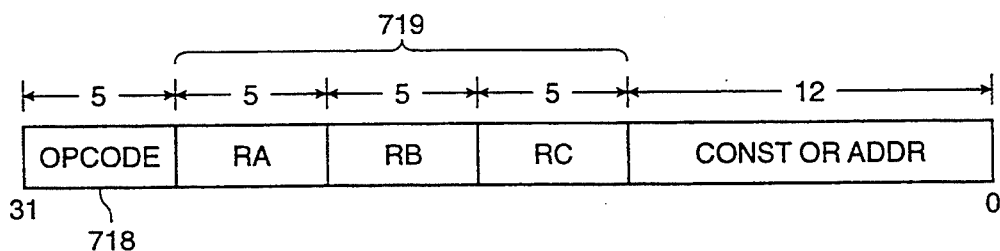
FIG. 28 is a CPU instruction format according to an embodiment of the present invention.

FIG. 28 shows an example instruction format for CPU 122. Each instruction is 32 bits long and includes a 5 bit OPCODE field 718 for defining the type of instruction. Three port identification fields 719 of five bits each identify the register port and a twelve bit address field follows.

During functional mode, addresses for the A, B, and C ports of register file 702 (FIG. 25) are respectively provided by the Ra, Rb, and Rc fields 719 of the instruction register (IR). The address of the D port, which is used to store data fetched by load instructions, is input from the D port address register (DAR) which delays the Rc field of the instruction register by one PCLK cycle to compensate for the fetch latency. A write to the same register at the same time from both the C and D ports has undefined consequences.

The memory addresses generated by the load and store instructions reference the CPU memory map (Table 13). Addresses are driven onto the 12 bit internal address bus from ALU 706 during the cycle in which the load or store instruction resides in the instruction register. During the same cycle, any data being written to memory by a store instruction is also driven onto the 12 bit output data bus from the B port of register file 702. Both address and data (if applicable) are then clocked into registers at the bus destination. During the next cycle, store data are written to the addressed location and load data are fetched from the addressed location and written into the D port of register file 702. Because of latency, data fetched using a load instruction cannot be used until the second instruction to follow the load instruction.

Branch instructions (i.e. opcode mnemonics beginning with "B") include a "link" feature used to implement subroutine calls. For example, register Rc holds the subroutine return address given by (nPC)+1 ("nPC"="next program counter") which is subsequently jumped to at the end of a subroutine via the JALR instruction. The link operation can be effectively disabled in a branch or jump instruction by setting Rc=RO.

The SRA, SRL, and SLL opcodes in Table 10 obtain the shift count from the least significant 4 bits of the instruction const field which are interpreted as an unsigned number between 0 and 15; bits 15:4 of const are ignored. A logical left or right shift (using the SLL or SRL opcode, respectively) with a shift count of twelve or more produces a 12 bit zero result, whereas an arithmetic right shift (using SRA) with a shift count of eleven or more produces a result consisting of twelve copies of the input most significant bit.

6. Host Processor Interface

MEC 20 supports a 16 bit data and interrupt interface with a variety of host processors (for example, host processor 38 of FIG. 1). In one embodiment of the invention, host-visible MEC registers and memories are mapped into a 2048 word by 16 bit address space. MEC 20 appears as a memory slave to the host processor.

The address assignment of every host-readable and/or writable memory location and register within MEC 20 is defined in Table 11. Many of the registers and memories in the memory map contain undefined or reserved bits. The host processor writes zeros to these bit positions when writing to these registers and memories. However, data read from these bit positions will always be undefined. Accessing undefined addresses in the memory map will have unpredictable consequences. Also, a host processor write to a read-only address or a host processor read from a write-only address does not affect the data at the address in question and any data read will be undefined.

a. Host Interface Bus Transfers

MEC 20 host interface bus as defined in Table 12 comprises of 1 clock, 11 address, 16 data, 1 interrupt, and 6 control signal pins. All signal levels are TTL compatible. The bus operates in slave-only mode and supports both non-burst and burst read and write bus cycles. Bus transfers are 16 bits wide. One of two data transfer timing modes, Mode 0 or Mode 1, can be selected for any access.

Figure 29:
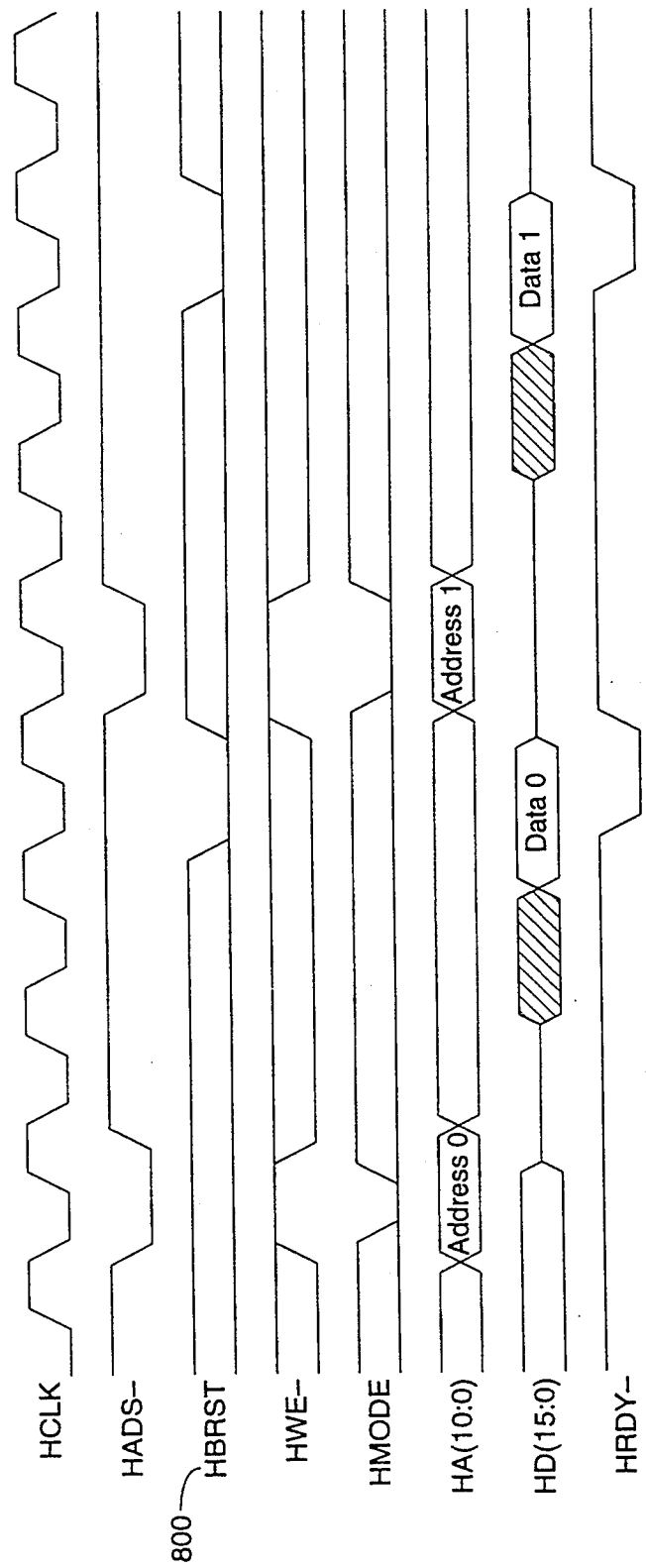
FIG. 29 is a timing chart of a non-burst read cycle on the MEC host interface bus according to the present invention.

Non-burst read cycle timing is shown in FIG. 29. All non-burst read accesses use Timing Mode 0. A read cycle begins with the host processor asserting the address being read onto HA(10:0) and clocking it into MEC 20 via the HADS- to indicate that a read transfer is being performed. HMODE is set low to select Timing Mode 0. Note that HBRST 800 is ignored by MEC 20 while HADS- is being asserted at the beginning of a cycle, and that HA(10:0), HWE-, and HMODE are ignored whenever HADS- is not being asserted.

MEC 20 turns on its data bus output drivers beginning with the second clock cycle to follow its sampling of HADS-, HA(10:0), HWE-, and HMODE. One clock cycle later, the MEC asserts valid data onto the bus and also asserts HRDY- to signal to the host that it has done so. As shown in FIG. 29, both the data and HRDY- are asserted for only a single clock cycle. MEC 20 then turns off its data bus output drivers on the following clock cycle.

To terminate a non-burst read (or write) cycle, HBRST 800 is deasserted (set low) during the clock cycle in which MEC 20 is asserting HRDY-. If HBRST 800 is not deasserted, MEC 20 assumes that a burst cycle is underway and automatically starts accessing the next sequential address.

As also shown in FIG. 29, HADS- may be asserted to start another read (or write) cycle during the clock cycle immediately following the assertion of HRDY- for the previous cycle. In one embodiment of the present invention, pipelining of successive accesses in not supported and HADS- may not be asserted during the clock cycle in which HRDY- is being asserted.

Non-burst write cycle timing is shown in FIG. 30 for both Timing Modes 0 and 1. A write cycle begins with the host processor asserting the address being written onto HA(10:0) and clocking it into MEC 20 via the HADS- signal on the next rising edge of HCLK. HWE- is asserted (low) with HADS- to indicate that a write transfer is being performed, and HMODE is set low or high to select Timing Mode 0 or 1, respectively.

For Mode 0, MEC 20 samples the data bus on the second rising edge of HCLK following its sampling of HADS-, while for Mode 1, MEC 20 samples the data bus on the first rising edge. However, a host processor may start asserting data onto the data bus at the same time it asserts an address onto the address bus as long as it takes into account the time required for MEC 20 to turn off its data output drivers at the end of any immediately preceding read cycle.

MEC 20 asserts HRDY- during the clock cycle in which it samples the data. As with non-burst read cycles, HBRST 800 must also be deasserted (low) during this clock cycle in order to terminate the access.

Burst cycles can be used to transfer streams of data words at consecutive addresses between the host processor and MEC 20 in a highly efficient manner. Burst cycles using Timing Mode 0 can effectively transfer one data word every two clock cycles, while Mode 1 bursts can effectively transfer one data word on every clock cycle. Burst cycles may start at any address within the MEC's host memory map (Table 12).

Figure 31:
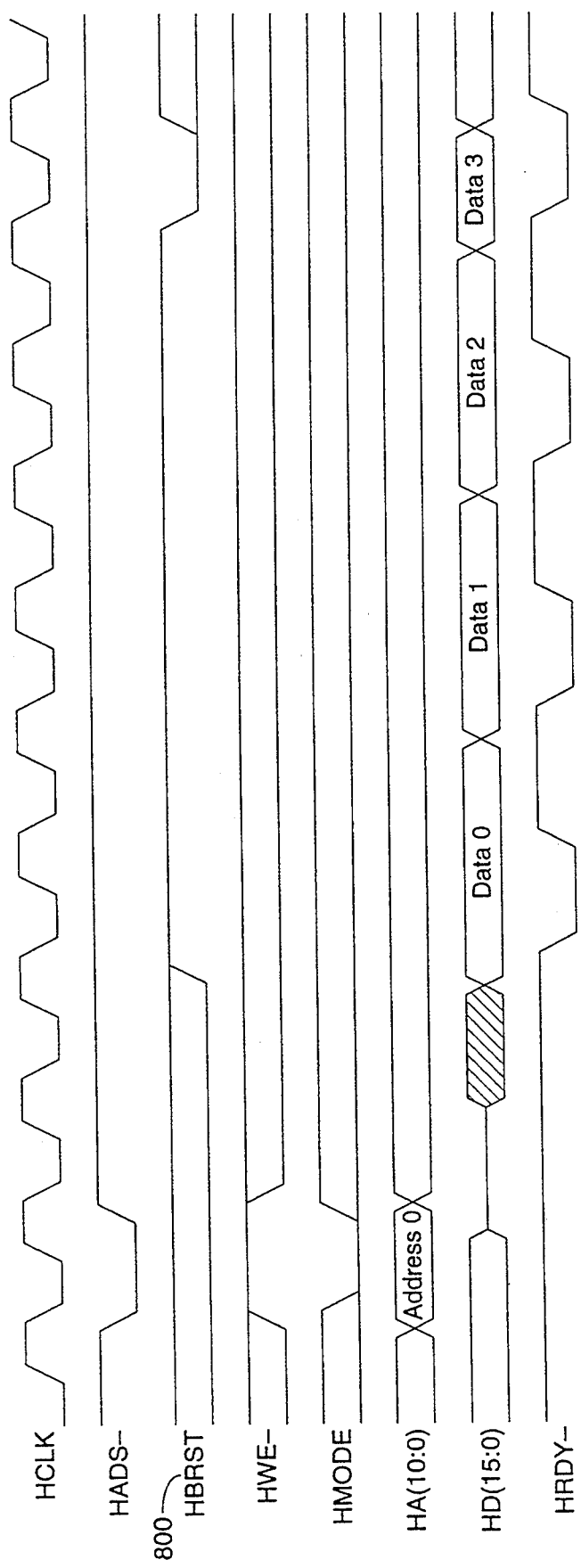
FIG. 31 is a timing chart for a four word burst read cycle on the MEC host interface bus according to an embodiment of the present invention.

Mode 0 timing for a four word burst read cycle is shown in FIG. 31. The cycle begins with the host processor asserting the address of the first word being read onto HA(10:0) and simultaneously asserting HADS-. HWE- is also deasserted (set high) with HADS- to indicate that a read transfer is being performed, and HMODE is set low to select Mode 0. MEC 20 turns on its data bus output drivers beginning with the second clock cycle to follow its sampling of HADS-. One clock cycle later, MEC 20 asserts valid data onto the bus and asserts HRDY- for a single clock cycle.

To request another access at the next sequential address, HBRST 800 is be asserted (set high) during the clock cycle in which MEC 20 is asserting HRDY-. MEC 20 ignores the state of the HA(10:0) pins during the burst. There is no real limit to the length of burst cycles; an address of 2047 automatically wraps around to 0 when incremented. If HBRST 800 is asserted while MEC 20 is asserting HRDY-, MEC 20 asserts valid data from the next access onto the data bus two clock cycles later, and again asserts HRDY-. Prior to common assertion of HBRST 800 and HRDY-, the data from the previous access remains asserted on the bus.

The final access in the burst sequence is signalled by the deassertion of HBRST during its corresponding HRDY- clock cycle, MEC 20 then terminates the burst cycle on the next rising clock edge and turns off its data bus output drivers.

Figure 32:
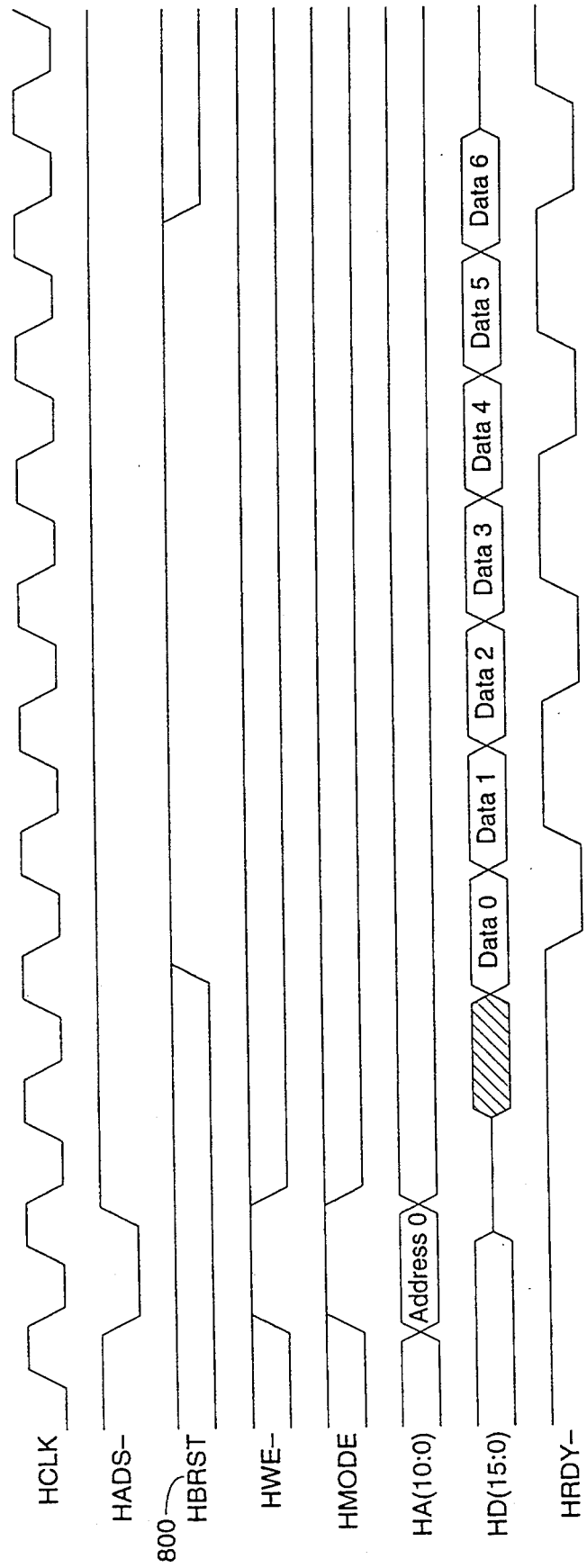
FIG. 32 is a timing chart for a Mode 1 burst read cycle on the MEC host interface bus according to an embodiment of the present invention.

FIG. 32 depicts a seven word burst read cycle using Timing Mode 1. In Mode 1 burst reads the length of the burst is loaded beforehand into the following 8 bit register: BLENGTH(7:0)—Burst Length. BLENGTH is part of the MEC 20 host memory map and can be initialized using a non-burst write cycle; its reset state is zero. BLENGTH should be loaded with two less than the total number of words to read; e.g. BLENGTH=5 for the example shown in FIG. 26. Therefore, the minimum length of a Mode 1 burst read is 2 words and the maximum length is 255+2=257 words. BLENGTH has no effect on the execution of Mode 0 burst read cycles, nor on the execution of any type of burst write cycle.

Figure 33:
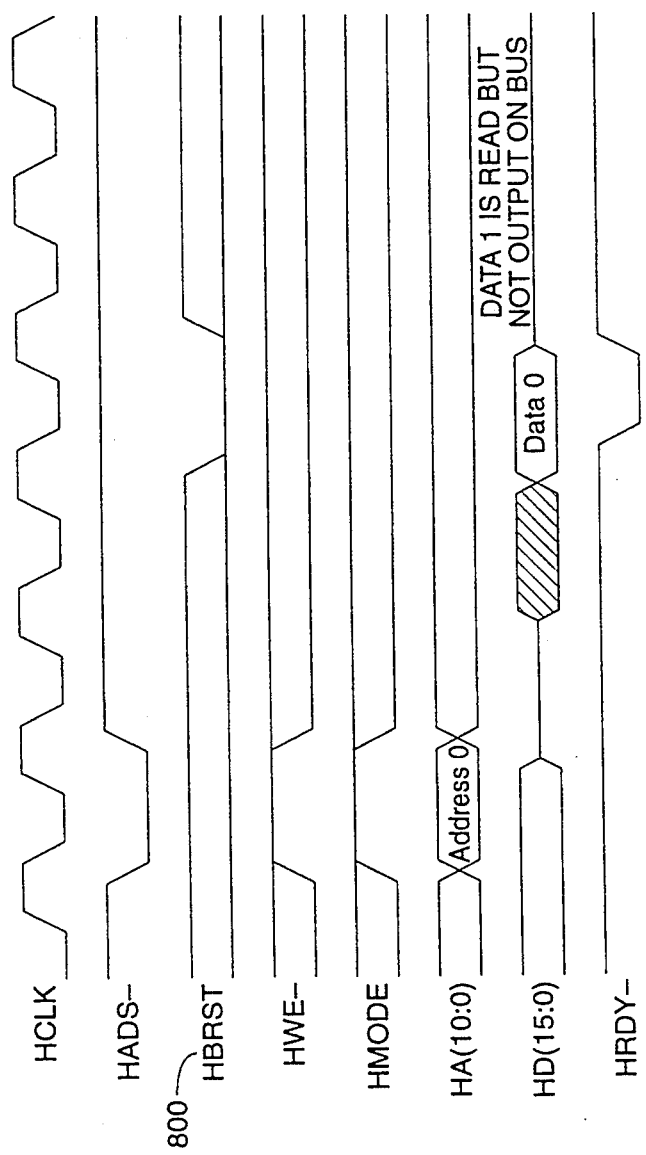
FIG. 33 is a timing chart for a Mode 1 burst read cycle with early termination according to an embodiment of the present invention.

The differences between Mode 1 and the Mode 0 burst read cycle shown in FIG. 31, are that for the Mode 1 cycle, HMODE is initially set high (instead of low) and there is only a single clock cycle (instead of two clocks) separating one burst access from the next. Just as for a Mode 0 burst read, however, HBRST 800 is asserted during the burst for every additional word to be accessed after the first word, and MEC 20 asserts HRDY- for every word it asserts on the data bus. However, unlike a Mode 0 burst read, Mode 1 burst reads do not require HBRST 800 to be deasserted during the last access. Also, if HBRST 800 is deasserted during a Mode 1 burst read cycle prior to reading all (BLENGTH+2) words, the burst cycle terminates on the rising edge of the next clock to follow the deassertion. Due to internal pipelining, MEC 20 reads one additional word beyond the point of termination, even though this word is never asserted onto the data bus. An example of such an "early termination," (as opposed to the "normal termination") is depicted in FIG. 33. In FIG. 33, HBRST 800 is deasserted during the HRDY- cycle for "Data 0", causing the burst to be terminated at that point. However, internally MEC 20 still reads "Data 1".

Figure 34:
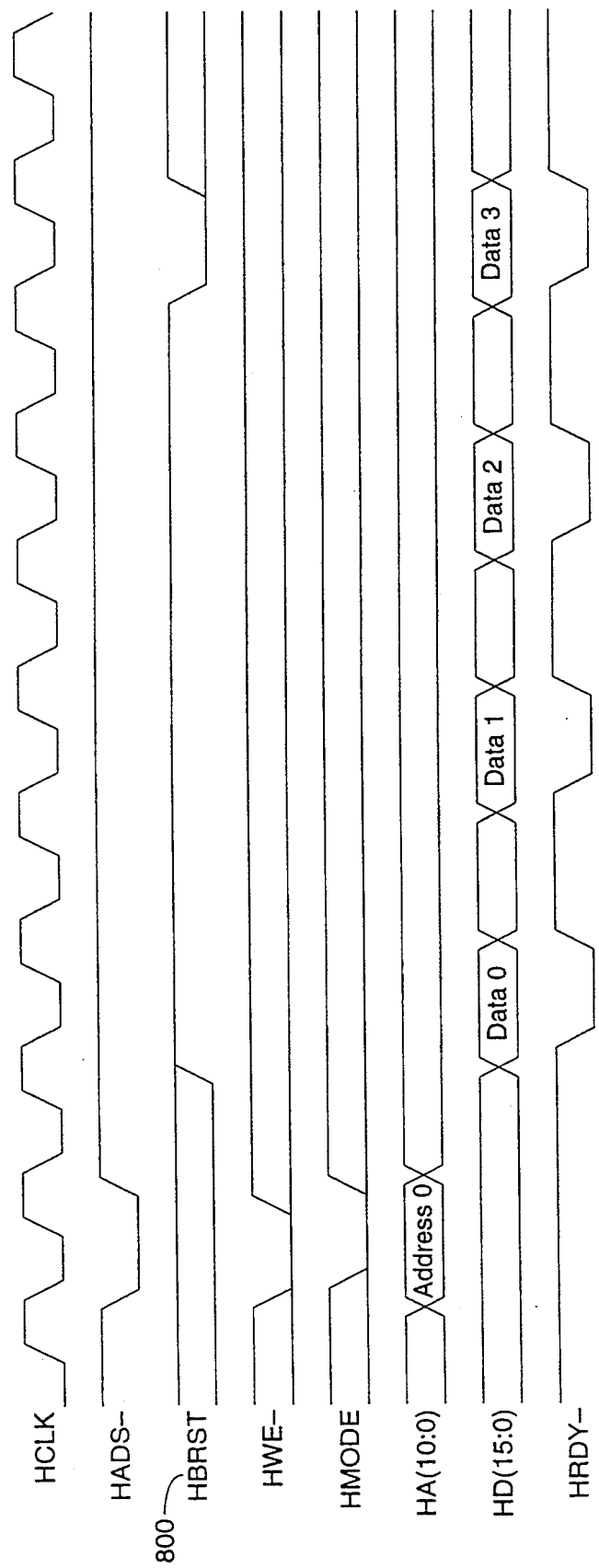
FIG. 34 is a timing chart for a four word burst write cycle on the MEC host interface bus according to an embodiment of the present invention.

A four word Mode 0 burst write cycle is shown in FIG. 34. The Mode 0 burst write cycle starts out like a Mode 0 non-burst write cycle and is effectively converted into a burst write cycle by the assertion of HBRST 800 during every assertion of HRDY- by MEC 20. MEC 20 internally increments the address to be written to on each additional burst access. Data are written at the rate of one word every two clock cycles, giving the host processor two clock cycles in which to set up data prior to its being sampled by MEC 20. The burst cycle is terminated by the deassertion of HBRST during the last burst write access.

Figure 35:
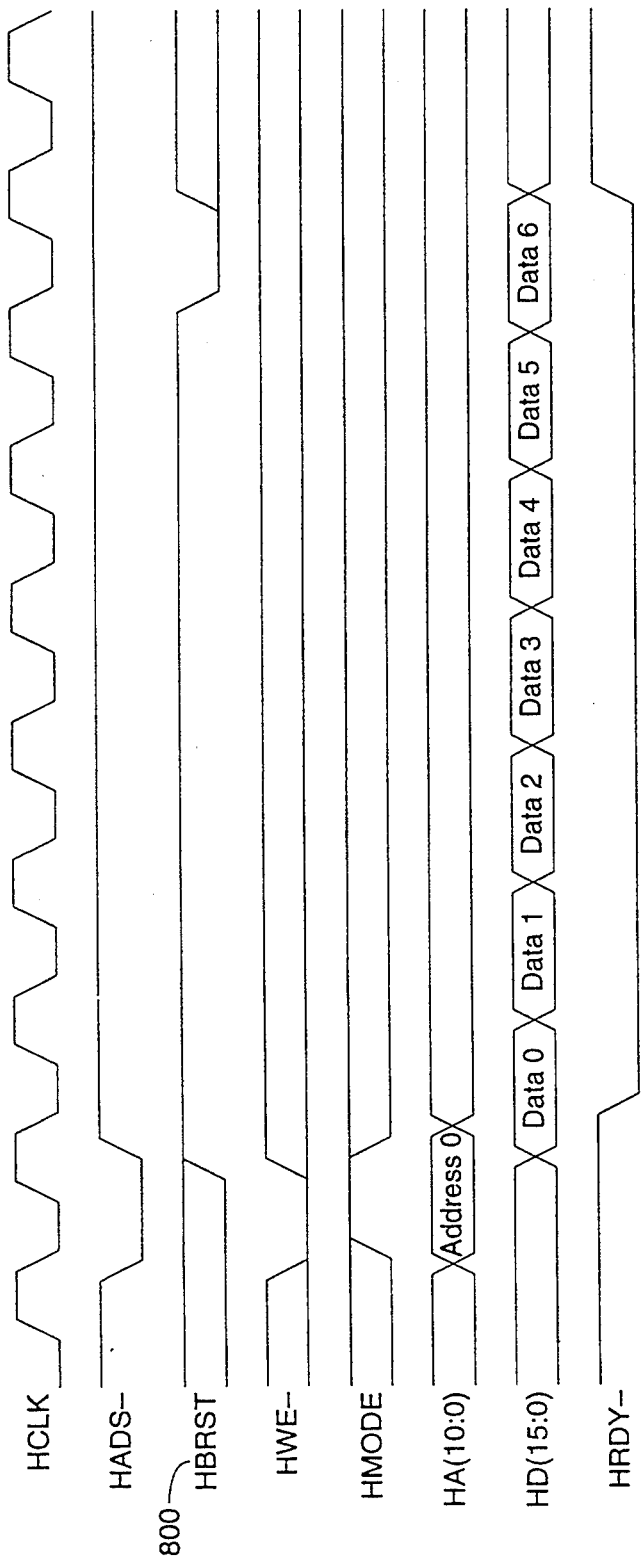
FIG. 35 is a timing chart for a Mode 1 burst write cycle on the MEC host interface bus according to an embodiment of the present invention.

A seven word Mode 1 burst write access is depicted in FIG. 35. Again, it starts like a Mode 1 non-burst write access and is converted into a burst write by the assertion of HBRST during the sampling of each data word by the MEC. Data are written at the rate of one word every clock cycle, giving the host processor only a single clock cycle in which to set up data prior to its being sampled by MEC 20. The burst cycle is terminated by the deassertion of HBRST 800 during the last burst write access.

b. Host Processor/MEC Communications

The MEC CPU 122 and host processor may use two 12 bit registers to pass data between them in conjunction with the execution of a CPU 122 program. The HDIN(11:0) register may be written with arbitrary data by the host processor for subsequent reading by CPU 122. CPU 122 may not write to HDIN, nor may the host processor read from it. MEC 20 sets the HDINRDY status bit to "1" and the HDINACK status bit to "0" whenever the host writes to HDIN and sets HDINRDY to "0" and HDINACK to "1" whenever CPU 122 reads HDIN. HDIN appears in both the CPU 122 and host memory map. HDINACK and HDINRDY appear only in the host memory map and CPU 122 memory map, respectively.

Conversely, the HDOUT(11:0) register may be written with arbitrary data by CPU 122 for subsequent reading by the host processor. The host processor may not write to HDOUT, nor may CPU 122 read from HDOUT. MEC 20 sets the HDOUTRDY status bit to "1" and the HDOUTACK status bit to "0" whenever the CPU 122 writes to HDOUT; and sets HDOUTRDY to "0" and HDOUTACK to "1" whenever the host reads HDOUT. HDOUT appears in both the CPU 122 and host memory map. HDOUTRDY and HDOUTACK appear only in the host memory map and CPU 122 memory map, respectively.

CPU 122 may also signal the presence of new data in HDOUT by writing to the HINT command register, thereby causing a host interrupt. The MEC's HINT-output pin may be asserted (low) in response to CPU 122 writing to the HINT command register in its memory map or the MEC detecting an instruction error. However, the host processor must first enable assertion of HINT- by writing a "1" to the HINTEN register in the MEC's host interface memory map. Conversely, assertion of HINT- may be disabled by writing "0" to HINTEN. Once HINT- is asserted, HINT- remains asserted until the host writes any value to the CLRHINT register in the host memory map.

The host processor can reset the entire MEC 20 by writing any value to the RESET register in the MEC host memory map. Registers in MEC 20 assume their predefined initial states (if any) as defined in the host and CPU memory maps of Tables 11 and 13, respectively. Upon receipt of a host initiated reset, CPU 122 enters the debug operational mode and CPU 122 program execution jumps to location zero.

7. Auxiliary Interface Bus and Token Input Buffers

Auxiliary interface bus 281 allows MEC 20 to communicate with image compression coprocessor 45 and permits image compression coprocessor 45 to execute instructions on MEC 20 and receive the results. The MEC auxiliary interface bus comprises 1 clock, 24 multiplexed address/data, and 8 control signal pins as shown in Table 14 and is pin-compatible with the image compression coprocessor auxiliary bus.

MEC 20 processes image compressor coprocessor 45 external instructions with the opcodes shown in Table 15. In a preferred embodiment of the invention, up to three different instructions may execute simultaneously on MEC 20 so long as the opcode bits of no two of the instructions are the same.

The execution of an instruction on MEC 20 starts with image compression coprocessor 45 performing an "auxiliary processor write cycle" to MEC 20 and ends with an "auxiliary processor write cycle" once the instruction has finished executing. An image compression coprocessor 45 external instruction is mapped onto MEC 20 by matching the least significant two bits of the instruction opcode with the state of the MEC's XPID(1:0) pins. External instructions defined for MEC 20 may have either zero or one input tokens, and may return either zero or one output as a result. Input and output tokens may be either data or control tokens, with data tokens assumed to have four data blocks.

Figure 36A:
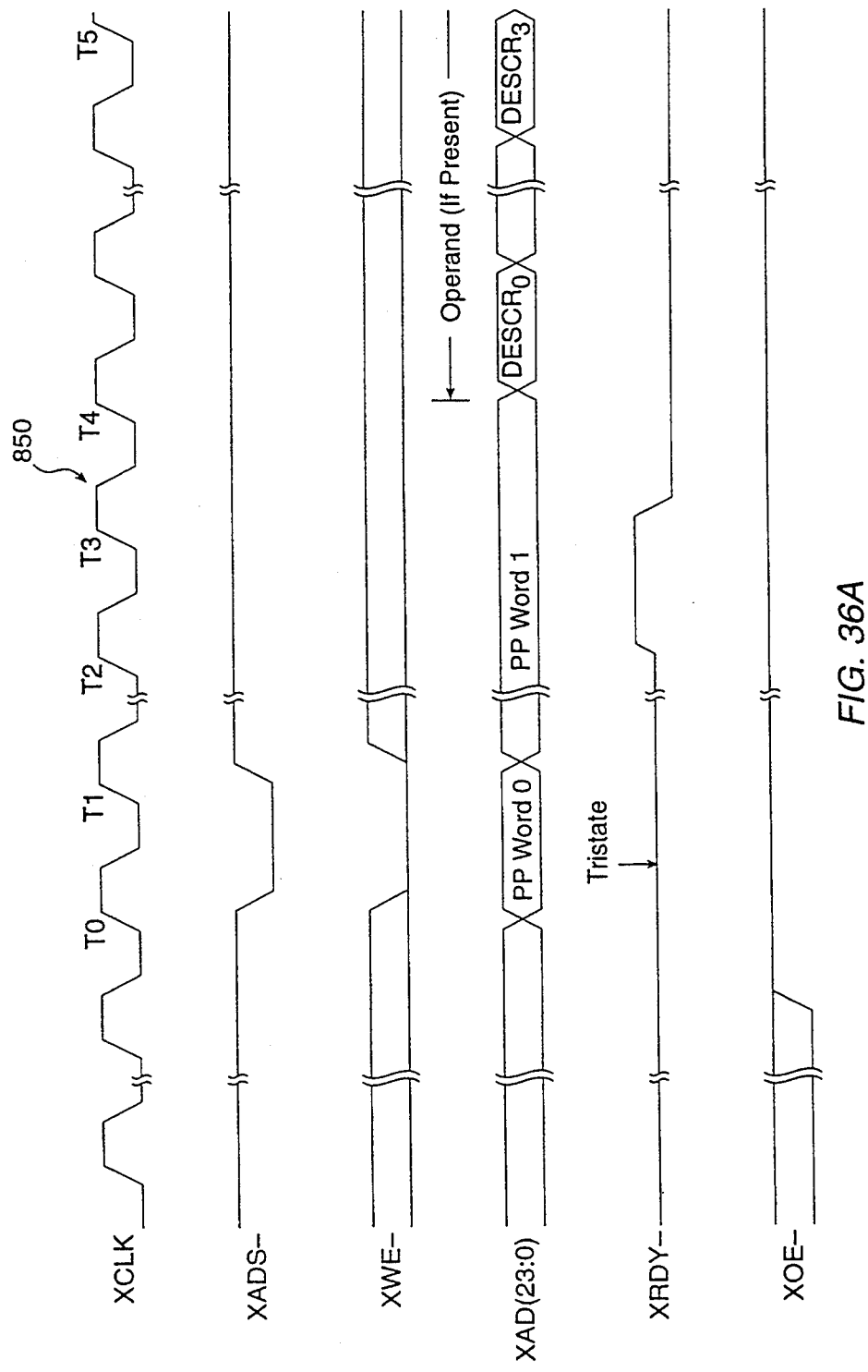
FIG. 36 is a timing chart of an MEC processor write cycle according to an embodiment of the present invention.
Figure 36B:
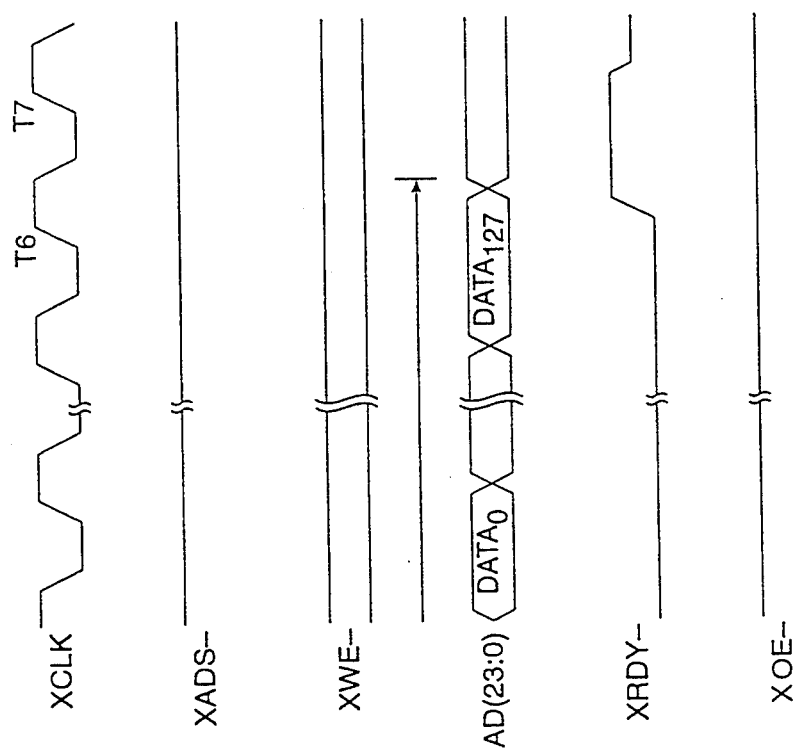
Figure 37A:
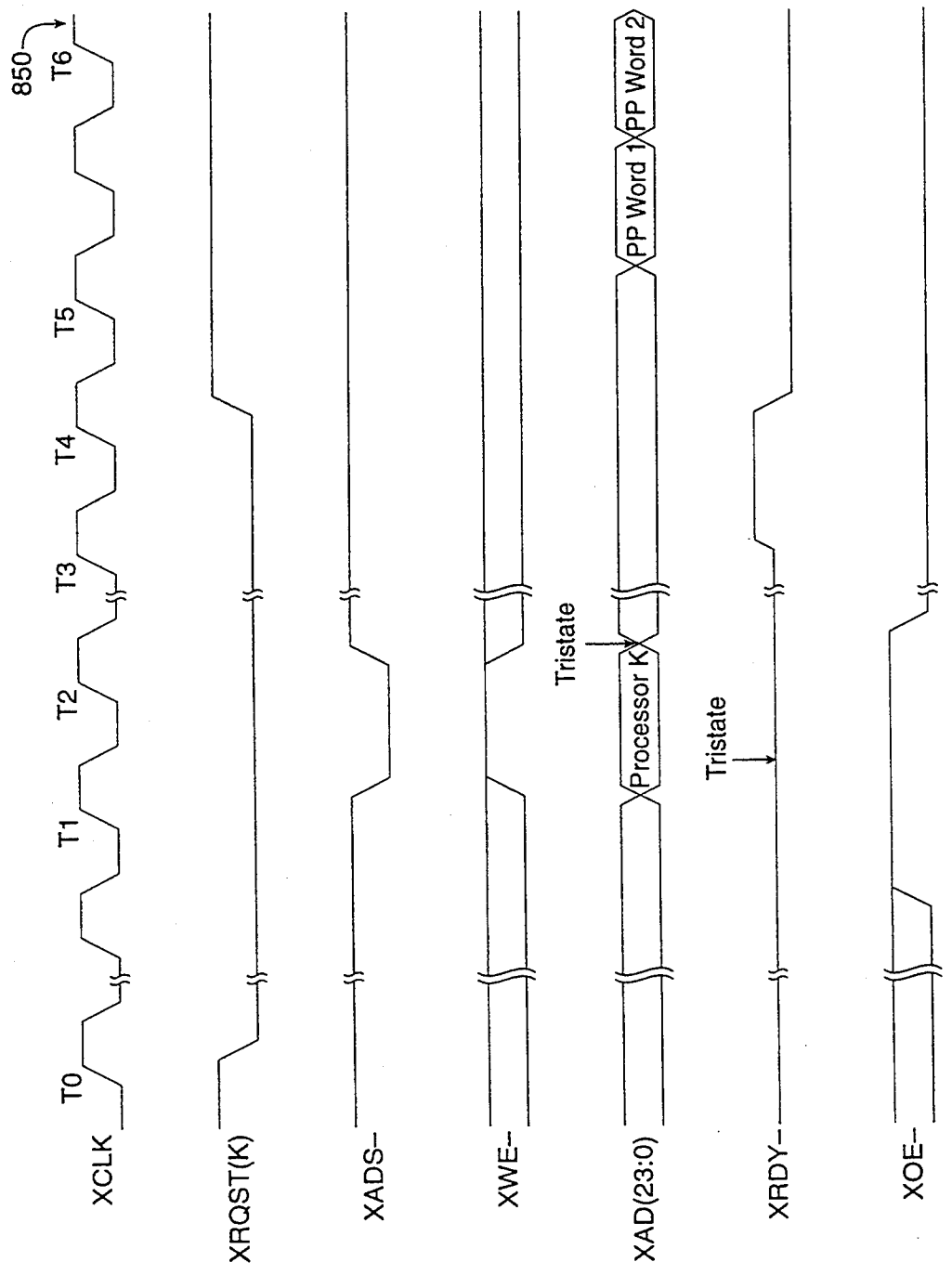
FIG. 37 is a timing chart of an MEC processor read cycle according to an embodiment of the present invention.
Figure 37B:
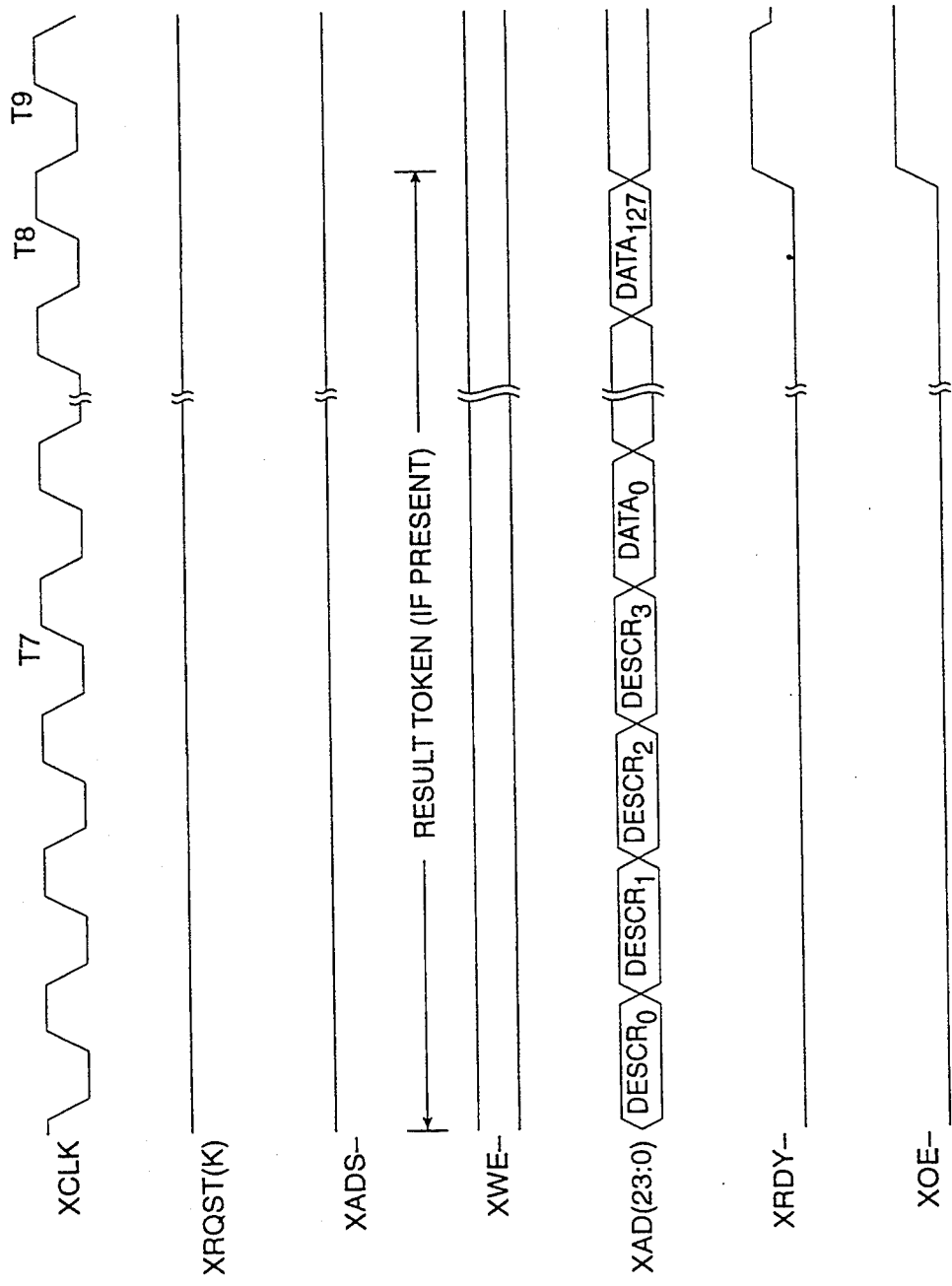

Auxiliary processor write cycle timing is shown in FIG. 36. A write cycle begins at time T0 with image compression coprocessor 45 asserting both XADS- and XWE- low in conjunction with the assertion of the first of two 24 bit "processor packet" words onto XAD(23:0). Processor Packet Words 0 and 1 are defined in Table 16. Image compression coprocessor 45 asserts XOE- at least one XCLK 850 cycle before starting the write cycle in order to guarantee reliable data transmission. Processor packet word 0 is then clocked into MEC 20 (and all other external processors) at time T1, and image compression coprocessor 45 begins asserting processor packet word 1 onto the bus. Processor packet word 1 remains asserted on the bus until MEC 20, selected by bits 1:0 of processor packet word 0 responds by untristating XRDY- and driving it high at time T2 and then asserting it low one clock cycle later at time T3. The image compression coprocessor 45 then samples the asserted XRDY- signal on the next rising edge of XCLK 850 at time T4.

After receiving processor packet word 0, the auxiliary interface unit 281 examines bits 16:14 and bit 11 of processor packet word 0 to prepare to receive any operand token which may follow processor packet word 1. If bit 11 is "0" no operand token is to be transmitted, and the write cycle ends at time T4 with image compression coprocessor 45 tristating the auxiliary interface bus and MEC 20 deasserting XRDY- (not shown in FIG. 36). Otherwise, image compression coprocessor 45 starts the transmission of the operand control or data token by sending its 96 bit token descriptor over the bus in four 24 bit words If bit 16 of processor packet word 0 is "0" the operand is a control token, and transmission ends at time T5 in FIG. 36. Otherwise, the last word of token descriptor data is followed by 128 words of pel data as indicated by bits 15:14 of processor packet word 0, and the transfer ends at time T6. The bus transfer format for operand tokens is shown in Table 17. Also at time T6, the MEC deasserts XRDY-, and one clock cycle later, at time T7, tristates it. Image compression coprocessor 45 will not start another processor write (or read) cycle until at least one XCLK 850 period after the last word is clocked into MEC 20.

To complete the execution of an instruction, MEC 20 requests a read cycle from image compression coprocessor 45 by asserting the XRQST pin at time TO. The image compression coprocessor 45 acknowledges the request by simultaneously setting XADS- low, XWE- high, and asserting the CPU 122 ID onto XAD(1:0) at time T1 for one XCLK 850 cycle. At time T2, MEC 20 samples XADS-, XWE-, and XAD(23:0), and image compression coprocessor 45 deasserts these signals, tristates its XAD(23:0) output buffers and then enables MEC 20 onto XAD(23:0) by asserting XOE- low.

At this point, image compression coprocessor 45 waits for MEC 20 to assert XRDY-. Beginning at time T2, MEC 20 compares the ID read from XAD(1:0) with its own ID on the XID(1:0) pins. Assuming a match, image compression coprocessor 45 untristates XRDY-, driving it high at time T3 and then low at time T4; image compression coprocessor 45 also deasserts XRQST- at time T4. MEC 20 starts to transmit data at time T5.

Initially, at time T5, MEC 20 asserts processor packet word 0 onto the bus and packet processor word 0 is clocked into image compression coprocessor 45 on the next rising clock edge, and processor packet word 1 is asserted. With the possible exception of bits 16:14, processor packet word 0 is a copy of the processor packet word 0 which was sent during the processor write cycle which started the instruction. Bits 16:14 must be modified, if necessary, to describe the type of result token, if any, being sent back to image compression coprocessor 45. Processor packet word 1 copies from the processor packet word 1 sent during the processor write cycle.

If bits 13:12 of processor packet word 0 are both "0" the instruction does not have a result token, and the processor read cycle ends at time T6 with MEC 20 deasserting XRDY- and image compression coprocessor 45 deasserting XOE- (not shown).

If neither of bits 13:12 of processor packet word 0 is not "0" a result token exists; bit 16 of processor packet word 0 is then used to determine the type of result token. If bit 16 is "0" the result is a control token which is transmitted to image compression coprocessor 45 over the next four periods of XCLK 850, and the read cycle ends at time T7. If bit 16 is "1" the result is assumed to be a four block data token which is transmitted to image compression coprocessor 45 over the next 128 XCLK 850 periods, ending at time T8. Descriptor and data words are formatted on the bus as shown in Table 17. Also at time T8, MEC 20 deasserts XRDY- and image compression coprocessor 45 deassets XOE. One clock cycle later, at time T9, MEC 20 tristates XRDY-.

MEC 20 handles instructions at both a hardware and software level. "Hardware" error handling is done using dedicated logic, while "software" error handling is done by the program running on CPU. Hardwired logic in MEC examines processor packet word 0 from image compression coprocessor 45 for the gross error conditions shown in Table 18. If an error is detected, MEC 20 "halts" by disabling all of its state machines and setting the ERROR register to "1". This register is host-readable and appears in the host 38 memory map. If host 38 has enabled MEC 20 interrupt generation via the HINTEN register, a hardware error also causes an interrupt output on the MEC's HINT- pin.

Image compression coprocessor programs performing the MPEG or H.261 encoder algorithm typically use the IPREDICT instruction to send a control token containing a motion vector or a data token containing four 8×8 blocks of luminance pels to MEC 20 for use by the motion estimation algorithm running on the MEC's CPU 122. IPREDICT may optionally output a control token to signal its conclusion.

MEC 20 does not predefine the parameter fields in IPREDICT instruction. This field is left to be interpreted by the MEC program. For example, parameter and/or undefined OPCODE bits in the IPREDICT instruction can be used to select the type of prediction to be performed (forward, backward, or bidirectional).

Token pels received from image compression coprocessor 45 via the IPREDICT instruction are stored in the pair of token pel input buffers 270 full resolution pels from an input token plus another 64 quarter resolution pels created by 4:1 decimation filtering the full resolution pels as they enter input token buffer 270. The quarter resolution pels in the ITPBs are used in 8×8 block comparisons during hierarchical motion estimation searches. The double-buffered memory interface formed by token input buffers 270 allows MEC 20 to receive a new IPREDICT operand token from image compression coprocessor 45 while a previously input token is used in block matching.

Figure 38:
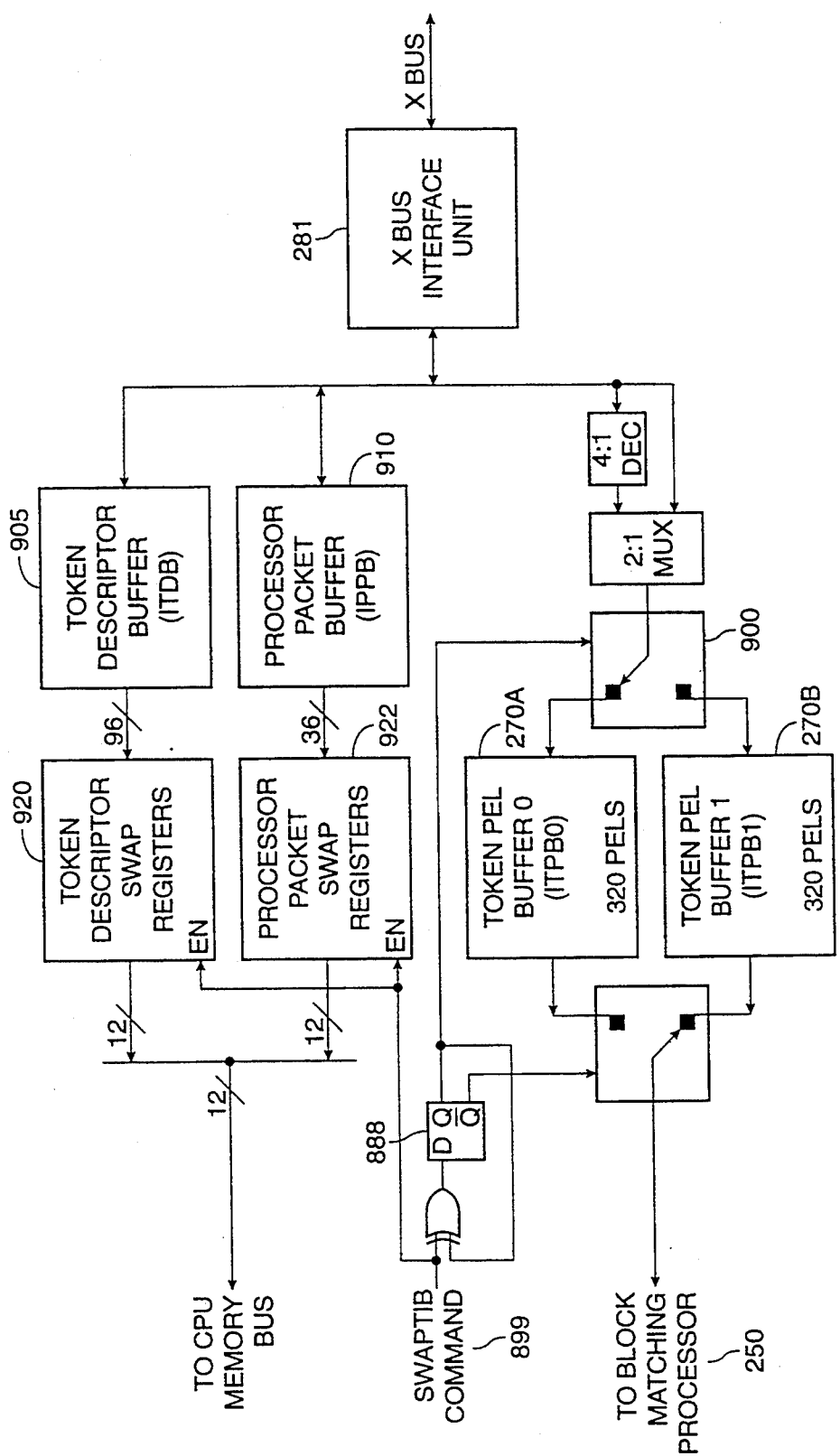
FIG. 38 is a block diagram of an IPREDICT memory interface according to an embodiment of the present invention.

FIG. 38 shows the IPREDICT memory interface. This interface comprises a collection of registers and memories which store token pels, token descriptors, and processor packet words. A flip-flop 888 whose state is toggled by the SWAP command register 899 controls data switches 900 to determine which token input buffer 270 receives pels from auxiliary interface unit 281 and which token input buffer 270 outputs pels to block matching processor 250. The 96 bit token descriptor and two 24 bit processor packet words received from the bus are stored in two sets of registers respectively called the IPREDICT token descriptor buffer 905 and the IPREDICT processor packet buffer 910. Buffers 905 and 910 cannot be accessed directly by CPU 122. Instead, the SWAP command from CPU 122 causes the contents of 132 of the 144 bits in buffers 905 and 910 to be copied into two sets of "swap" registers 920 and 922 which may then be read by the CPU 122. This copying operation completes in one PCLK cycle. The token descriptor and processor packet swap registers are described in Tables 19 and 20, respectively. The CPU 122 does not write to these registers.

Initially, during the processor write cycle of an IPREDICT Instruction, MEC 20 stores processor packet word 0 and processor packet word 1 in the buffer 910. If bit 11 of processor packet word 0 is "1" MEC 20 also stores the descriptor from the input operand in buffer 905. Finally, if bit 16 of processor packet word 0 is "1", the operand is a data token, and MEC 20 stores 320 pels (256 from the auxiliary bus and another 64 filtered) in the token input buffer 270 currently set to receive input data. MEC 20 then sets the ITBRDY status bit to "1". Error conditions exist if bit 11 of processor packet word 0 is "0" (no operand) or if bit 16 is "1" and bits 15:14 of processor packet word 0 are not both "1" (operand is a data token with less than four blocks).

Once CPU 122 has finished processing the previous IPREDICT input token, CPU 122 waits until the ITBRDY status bit is "1" and then writes to the SWAP command register. As a result the contents of buffers 905 and 910 are copied into their corresponding swap registers 920 and 922. The token input buffers 270 are switched, thereby allowing the new input token to be accessed by CPU 122 and block matching processor 250. However, SWAP also causes the ITBRDY status bit to be set "0" and MEC 20 to conclude the IPREDICT instruction by requesting a processor read cycle from image compression coprocessor 45.

If each of bits 13:12 of processor packet word 0 stored in buffer 910 is "0" the processor packed words sent back to image compression coprocessor 45 by MEC 20 during the read cycle are copied directly from buffer 910. However, if either of bits 13:12 is not "0" the IPREDICT instruction has a destination and bit 16 of processor packet word 0 sent back to image compression coprocessor 45 is forced to "0" to indicate an output control token. In this case, MEC 20 follows its bus transmission of processor packet word 0 and processor packet word 1 with four 24 bit token descriptor words copied buffer 905 with the exception that the most significant bit of the first descriptor word is forced to be "0" to indicate a control token.

Predictions resulting from motion estimation are sent back to image compression coprocessor 45 via the OPREDICT instruction either as control tokens containing only motion vectors or as data tokens containing both predicted pels and motion vectors. OPREDICT may optionally use a control or data token as an operand. As with the IPREDICT instruction MEC 20 does not predefine the parameter fields in the OPREDICT instruction. CPU 122 may load the OPREDICT buffer 265 using the load configuration registers of Table 21.

Figure 39:
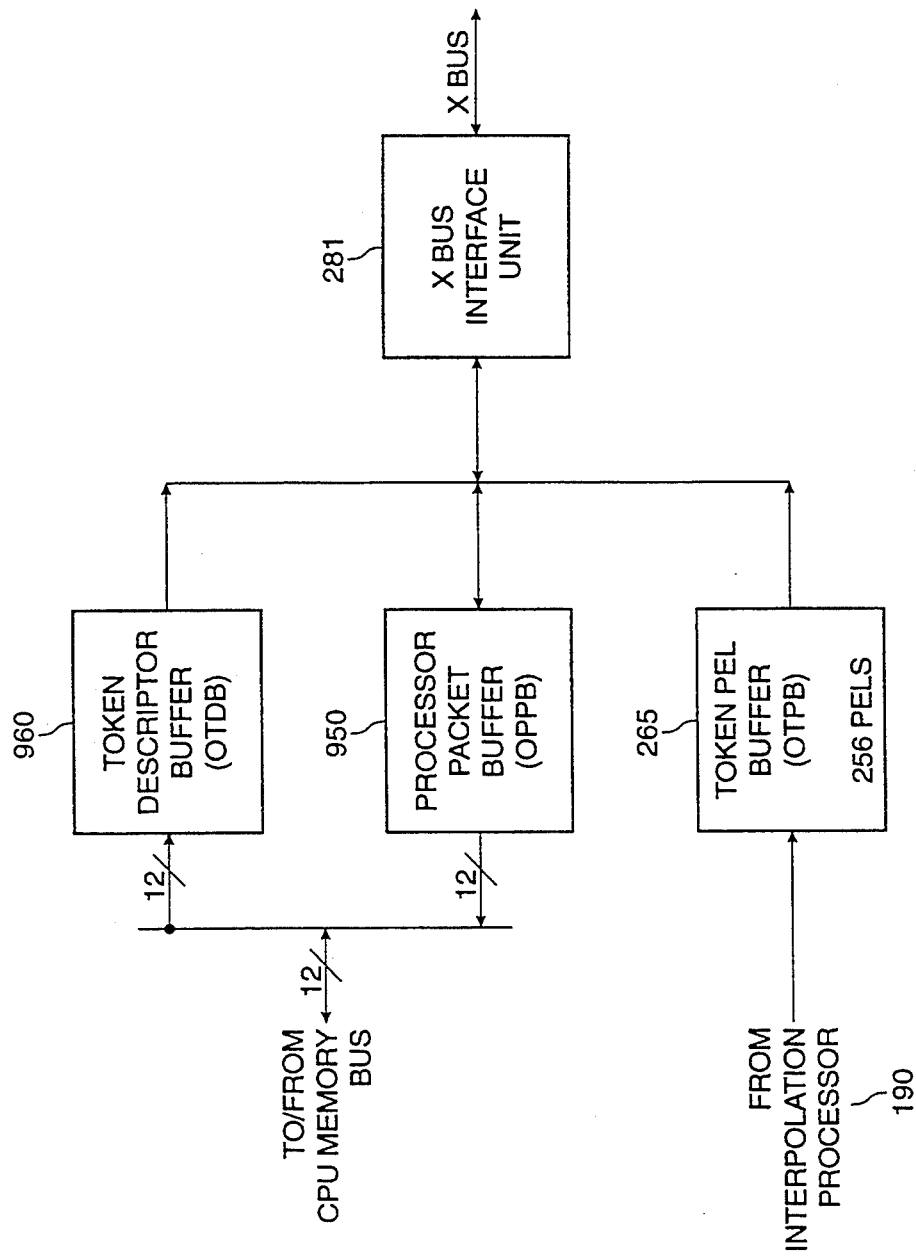
FIG. 39 is a block diagram of an OPREDICT memory interface according to an embodiment of the present invention.

FIG. 39 is a block diagram of the OPREDICT memory interface. Unlike IPREDICT, the MEC 20 memory interface for supporting the OPREDICT instruction is not double buffered. Two 24 bit processor packet words received from the bus at the start of the instruction are stored in the OPREDICT processor packet buffer 950. The descriptor and pel data portions of the result token to be transmitted to the image compression coprocessor 45 at the end of the instruction are stored in the OPREDICT token descriptor buffer 960 and token output pel buffer 265, respectively. Under direction of CPU 122, buffer 960 is written with pels from search memory 60 after they have passed through block interpolation processor 190. CPU 122 can write to the buffer 960 and read from the buffer 950 via the registers described in Tables 21 and 22, respectively.

During the processor write cycle which starts an OPREDICT instruction, MEC 20 stores processor packet word 0 and processor packet word 1 in buffer 950 and sets the ORQST status bit to "1". CPU 122 is then free to read buffer 950 via the registers listed in Table 22. The MEC 20 detects an error if the OPREDICT instruction does not have a destination; i.e. neither bit 12 or 13 of processor packet word 0 is "1". If bit 11 of processor packet word 0 is "1" MEC 20 also reads an operand from image compression coprocessor 45, but discards the operand. If bit 16 of processor packet word 0 is "0" the operand is a control token. If bit 16 of processor packet word 0 is not "0" the operand is a data token whose length is indicated by bits 15:14 of processor packet word 0.

When CPU 122 is ready to send a result token back to image compression coprocessor 45, CPU 122 waits until the OTBRDY status bit is "1" to be sure that any previous result has been transmitted. CPU 122 then optionally loads buffer 960 by writing to the OTBY register. Writing to OTBY also causes the LDOTBRDY status bit to be set to "0". While the buffer 960 is filling, CPU 122 can also write the result descriptor via the registers listed in Table 23. Once CPU 122 finishes writing the result descriptor CPU 122 writes the SEND command register to conclude execution of the OPREDICT instruction.

In response to the SEND command, MEC 20 sets OTBRDY to "0" and then waits until both ORQST and LDOTBRDY are set to "1". The latter signal indicates that buffer 960 has finished loading. MEC 20 then sets the ORQST status bit to "0" and requests a processor read cycle from the image compression coprocessor 45. During the read cycle, MEC 20 sends image compression coprocessor 45 copies of processor packet word 0 and processor packet word 1 from buffer 950 with the exception that bit 16 of processor packet word 0 is forced to be the same as bit 11 (the token descriptor type bit) from OTD and bits 15:14 of processor packet word are forced to be "11".

MEC 20 follows the transmission of processor packet word 1 with the result token descriptor copied from the OPREDICT token descriptor registers with the exception that bits 93:92 of the descriptor are forced to be "11". If bit 11 of OTD is "1" MEC 20 follows the token descriptor on the bus with 256 pels of token data copied from buffer 960. MEC 20 sets the OTBRDY status bit to "1" at the conclusion of the read cycle.

Image compression coprocessor 45 programs typically use a WRMEM instruction to send a token containing four 8×8 blocks of luminance pels to MEC 20 for writing into prediction memory. This instruction is generally used to write a reconstructed encoder input image into prediction memory so that it can be used later for motion estimation searches. WRMEM may or may not produce a result token. If the WRMEM instruction has a destination in the image compression coprocessor 45 program, it outputs a control token; otherwise, it produces no result. WRMEM has predefined parameter fields. These fields may be similar to those used by the image compression coprocessor 45 video memory write instructions.

Figure 40:
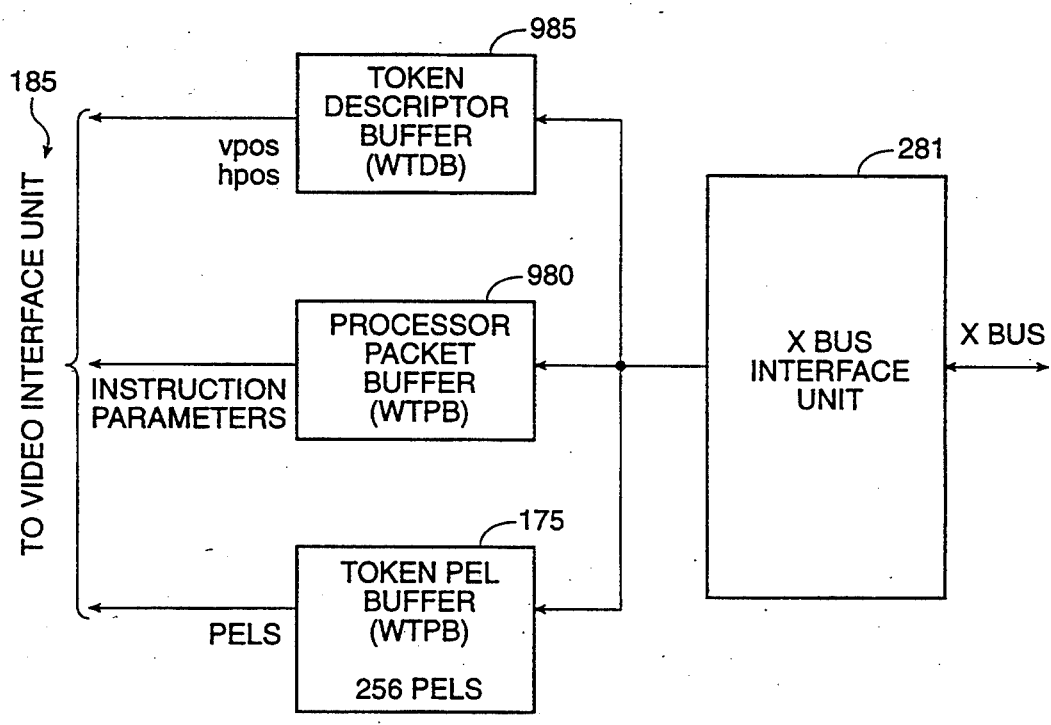
FIG. 40 is a block diagram of an WRMEM memory interface according to an embodiment of the present invention.

FIG. 40 is a block diagram of a WRMEM memory interface. Like OPREDICT, the MEC memory interface for supporting the WRMEM instruction is not double buffered. As shown in FIG. 40, two 24 bit processor packet words received from auxiliary interface bus 281 at the start of the instruction are stored in the WRMEM processor packet buffer 980. The descriptor and block data portions of the operand data token to be written to the memory on the MEC's video bus are stored in the WRMEM token descriptor buffer 985 and token pel buffer 175, respectively. Unlike both the IPREDICT and OPREDICT instructions, CPU 122 plays no role in the execution of WRMEM instructions. The MEC 20 auxiliary interface unit 281 and video interface unit 185 execute WRMEM instructions transparently.

During the processor write cycle of a WRMEM instruction, MEC 20 stores processor packet word 0 and processor packet word 1 in the buffer 980. If bit 11 of processor packet word 0 is "1" MEC 20 also stores the descriptor from the input operand in buffer 985. Finally, if bit 16 of processor packet word 0 is "1" the operand is a data token, and MEC 20 stores 256 pels in the buffer 175. Error conditions exist if bit 11 of processor packet word 0 is "0" or bits 16:14 of processor packet word 0 are not all set to "1".

At the conclusion of the processor write cycle, the auxiliary interface unit 281 notifies the video interface unit 185 which then writes the pels in buffer 175 to video memory as a 16×16 block using parameters from buffer 980 and the hpos and vpos descriptor fields from buffer 985. Video interface unit 185 notifies auxiliary interface unit 281 when it is finished, and auxiliary interface unit 281 then attempts to conclude the WRMEM instruction by requesting a processor read cycle from image compression coprocessor 45.

If each of bits 13:12 of processor packet word 0 stored in buffer 980 is "0" the processor packet words sent back to the image compression coprocessor by the MEC 20 during the read cycle are copied directly from buffer 980. However, if either of bits 13:12 is not "0" the WRMEM instruction has a destination, and bit 16 of processor packet word 0 sent back to image compression coprocessor 45 is forced to "0" to indicate an output control token. In this case, MEC 20 follows transmission of processor packet word 0 and processor packet word 1 with four 24 bit token descriptor words copied from the buffer 985 with the exception that the most significant bit of the first descriptor word is forced to be "0" to indicate a control token.

Although the present invention has been described by way of preferred embodiments and certain variations and modifications, other variations and modifications can also be used, the invention being defined by the following claims.

TABLE 1

Video Bus Interface Signals

| Signal Name | Definition |
| --- | --- |
| VA(10:0) | Video memory address (tristate outputs) - indicates the memory row or column address being accessed; can be directly connected to the address pins on DRAMs or VRAMS. These pins are in the high impedance state whenever the VDIS pin is asserted or the MEC does not possess the video bus (bus arbitration is discussed in Section 4.8). |
| VMSEL(2:0) | Video memory select (tristate outputs) - selects the memory "bank" in which pels are being accessed and also indicated when the MEC is refreshing memories on the video bus. VMSEL(2:0) can be used, if needed, by each memory on the bus to qualify control signals. These pins are in the high Impedance state whenever the VDIS pin is asserted or the MEC does not possess the video bus. |
| VD0(7:0) | Video memory data bus 0 (input/output) - used to transfer pels for both the 16 bit and 32 bit access modes; can be directly connected to DRAM or VRAM data pins. The output buffers on these pins are in the high impedance state whenever the MEC is reading video data, the VDIS pin is asserted, or the MEC does not possess the video bus. |
| VD1(7:0) | Video memory data bus 1 (input/output) - used to transfer pels for both the 16 bit and 32 bit access modes; can be directly connected to DRAM or VRAM data pins. The output buffers on these pins are in the high impedance state whenever the MEC is reading video data, the VDIS pin is asserted, or the MEC does not possess the video bus. |
| VD2(7:0) | Video memory data bus 2 (input/output) - used to transfer pels for both the 16 bit and 32 bit access modes; can be directly connected to DRAM or VRAM data pins. The output buffers on these pins are in the high impedance state whenever the MEC is reading video data, the VDIS pin is asserted, or the MEC does not possess the video bus. |
| VD3(7:0) | Video memory data bus 2 (input/output) - used to transfer pels for both the 16 bit and 32 bit access modes; can be directly connected to DRAM or VRAM data pins. The output buffers on these pins are in the high impedance state whenever the MEC is reading video data, the VDIS pin is asserted, or the MEC does not possess the video bus. |
| VRAS- (3:0) | Video memory row address strobes (tristate outputs) - VRAS-(k) is the row address strobe for memories connected to video data bus VDK and should be qualified, as needed, by VMSEL(2:0); otherwise, it can directly connected to DRAM or VRAM "RAS" pins. These pins are in the high impedance state whenever the VDIS pin is asserted or the MEC does not possess the video bus. |
| VCASO- (3:0) | Video memory column address strobe outputs (tristate outputs) - VCASO-(k) is the column address strobe for memories connected to video data bus VDk; it can be directly connected to DRAM or VRAM "CAS" pins. These pins are in the high impedance state whenever the VDID pin is asserted or the MEC does not possess the video bus. |
| VCASI- (3:0) | Video memory column address strobe inputs (inputs) - VCASI-(k) should be connected to the CAS pins of the memory chips connected to video data bus VDk; acts as the enable on a transparent latch within the MEC which is used to latch data from video data bus VDk during memory reads. |
| VWE- | Video memory write enable (tristate output) - used for every memory, regardless of which data bus it resides on; can be directly connected to DRAM or VRAM "write enable" pins. This pin is in the high impedance state whenever the VDIS pin is asserted or the MEC does not possess the video bus. |
| VOE- | Video memory output enable (tristate output) - |

TABLE 1-continued

Video Bus Interface Signals

| Signal Name | Definition |
|---|---|
| | used for every memory, regardless of which data bus it resides on; can be directly connected to DRAM or VRAM "output enable" pins. This pin is in the high impedance state whenever the VDIS pin is asserted or the MEC does not possess the video bus. |
| VDIS | Video bus disable (input) - When signal is asserted (high), all tristate (and bidirectional) date, address, and control outputs on the video bus are unconditionally put into the high impedance state. |
| VRQSTI | Video bus request input (input) - Input signal for bus request daisy chain; should be connected to VRQSTO of next lower priority bus master. Bus arbitration is discussed in Section 4.8. |
| VRQSTO | Video bus request output (output) - Output signal for bus request daisy chain; should be connected to VRQSTI of next higher priority bus master. |
| VGRNTI | Video bus acknowledge input (input) - Input signal for bus grant daisy chain; should be connected to VGRNTO of next higher priority bus master. |
| VGRNTO | Video bus acknowledge output (output) - Output signal for bus grant daisy chain; should be connected to VGRNTI of next lower priority bus master. |
| VCLK | Video bus clock (input) - used to synchronize all operations on the video bus. |

TABLE 2

VIB Segment Configuration Registers

| | |
|---|---|
| VkORIGIN(6:0): | Starting page address of segment k (range = [0,127]). |
| VkLENGTH(6:0): | Number of page rows in segment k (range = [1,64]). |
| VkWIDTH(4:0): | Number of page columns in segment k (range = [1,16]). |
| VkX(11:0): | Logical starting X (column) address in image memory of the upper left corner of segment k; VkX(O) is hardwired to "0" (i.e. all fetches are forced to start on even numbered columns of the image memory). |
| VkY(11:0): | Logical starting Y (row) address in image memory of the upper left corner of segment k; VkY(O) is hardwired to "O" (i.e. all fetches are force to start on even numbered rows of the image memory). |
| VkPCNT(7:0): | Either the number of pels to be read from each row of image memory when filling segment k with full resolution data, or one half the number of pels to be read from each row of image memory when filling segment k with quarter resolution data; VkPCNT(0) is hardwired to "0" (i.e. an even number of pels are always fetched from a row), and VkPCNT must be less than or equal to 8*VkWIDTH. |
| VkMSEL(2:0): | VMSEL(2:0) pin outputs while fetching segment k. |
| VkROW(5:0): | Starting page row number in segment k of the search memory for pels copies from segment k of the VIB (range = [0,63]). |
| VkCOL(3:0): | Starting page column number in segment k of the search memory for pels copied from segment k of the VIB (range = [0,15]). |

TABLE 3

Definition of LDVIB Command Register

| LDVIB(2k + 1:2k) | Definition |
|---|---|
| 00 | Don't load segment k |
| 01 | Load only segment k with full resolution pels |
| 10 | Load only segment k with quarter resolution pels |
| 11 | Load segment k with full resolution pels and segment k + 1 with quarter resolution pels |

TABLE 3-continued

Definition of LDVIB Command Register

| LDVIB(2k + 1:2k) | Definition |
|---|---|
| | derived from the full resolution pels |

TABLE 4

Video Interface Timing Control Registers

| Register | Description | Symbols | Use |
|---|---|---|---|
| VCNT1(4:0) | Row address to RAS-active delay | Tasr | N |
| VCNT2(4:0) | Row address to column address delay | Tasr + Trah | N |
| VCNT3(4:0) | RAS-active to CAS-active delay | Trcd | N |
| VCNT4(4:0) | CAS- cycle period | Tcp + Tcas | N |
| VCNT5(4:0) | RAS- precharge time | Trp | N,R |
| VCNT8(4:0) | CAS- pulse width | Tcas | N |
| VCNT9(4:0) | CAS- active to RAS-inactive delay | Trsh | N |
| VCNT10(4:0) | CAS- active to RAS-inactive delay | Tcsr | R |
| VCNT11(4:0) | RAS- active to CAS-inactive delay | Tchr | R |
| VCNT12(4:0) | RAS- active to RAS-inactive delay | Tras | R |
| Restrictions: | VCNT2 must be greater than VCNT1; VCNT1 + VCNT3 must be greater than VCNT2; VCNTx must be strictly greater than zero. | | |
| Register Use: | N = Normal page [??] read and write cycles R = Refresh cycles | | |

TABLE 5-1

MAD Tracking Registers

| | |
|---|---|
| MADMS(10:0): | bits 15:5 of current minimum MAD |
| MADLS(4:0): | bits 4:0 of current minimum MAD |
| MADX(7:0): | relative X coordinate of current minimum MAD |
| MADY(7:0): | relative Y coordinate of current minimum MAD |

TABLE 5-2

Block Matching Performance

| BMPMODE | Interpolation | Throughput |
|---|---|---|
| 00 | not applicable | 5 |
| 01 | not applicable | 6 |
| 10 | none | 18 |
| 10 | horiz. or vert. | 27 |
| 11 | none | 20 |
| 11 | horiz. or vert. | 30 |

TABLE 6

Search Pattern Configuration Registers

| | |
|---|---|
| SPX(7:0): | relative X coordinate of first search coordinate triplet. |
| SPY(7:0): | relative Y coordinate of first search coordinate triplet. |
| SPCNT(7:0): | one less than the total number of triplets to be searched |
| SPINC(4:0): | horizontal (X) increment from one triplet to the next (unsigned fractional positive number with binary point between bits 1:0). |
| SPMASK (2:0): | selects MADs from each triplet for use in calculation of minimum MAD; if SPMASK(n) = 1, the MAD from the nth search coordinate of each triplet is factored into the minimum MAD calculation, where coordinate 0 is defined to be the top-most coordinate in a triplet. |

TABLE 7
Block Matching Configuration Registers

BMSEG(1:0): search memory segment to be searched (0, 1, 2, or 3)
BMXORG(6:0): absolute X coordinate of search origin in segment BMSEG
BMYORG(6:0): absolute Y coordinate of search origin in segment BMSEG
BMPMODE(1:0) block matching processor operational mode -
  00 = match 8 × 8 blocks on successive rows
  01 = match 8 × 8 blocks on alternate rows
  10 = match 16 × 16 blocks on successive rows
  11 = match 16 × 16 blocks on alternate rows

TABLE 8
Block Sizes Needed for Interpolation

| xlsb | ylsb | Interpolation | Interpolation Block Size |
|---|---|---|---|
| 0 | 0 | none | not applicable |
| 0 | 1 | vertical | 17 rows by 16 columns |
| 1 | 0 | horizontal | 16 rows by 17 columns |
| 1 | 1 | horiz. and vert. | 17 rows by 17 columns |

TABLE 9
Debug Address Mappings

| RADDR or WADDR (in binary) | | | | Selected CPU Register or Memory |
|---|---|---|---|---|
| 0 | XXXX | XXXX | XXXX | Register or memory at CPU address "XXX" (hex) |
| 1 | 000X | XXX0 | 0000 | R0 in register file |
| 1 | 000X | XXX0 | 0001 | R1 in register file |
| 1 | 000X | XXX0 | 0010 | R2 in register file |
| . | . | . | . | . |
| . | . | . | . | . |
| . | . | . | . | . |
| 1 | 000X | XXX1 | 1111 | R31 in register file |
| 1 | 001X | XXXX | XXXX | nPC (read only access) |
| 1 | 010X | XXXX | XXXX | PC (read only access) |
| 1 | 011X | XXXX | XXXX | Reserved |
| . | . | . | . | . |
| . | . | . | . | . |
| . | . | . | . | . |
| 1 | 111X | XXXX | XXXX | Reserved |

TABLE 10
CPU Instruction Set

| Instruction | | Definition | Opcode |
|---|---|---|---|
| ADD | Rc, Ra, Rb | Ro = Ra + Rb | 00 |
| ADDI | Rc, Ra, const | Rc = Ra + const | 01 |
| SUB | Rc, Ra, Rb | Rc = Ra - Rb | 02 |
| SUBI | Rc, Ra, const | Rc = Ra - const | 03 |
| AND | Rc, Ra, Rb | Rc = Ra & Rb | 04 |
| ANDI | Rc, Ra, const | Rc = Ra & const | 05 |
| OR | Rc, Ra, Rb | Rc = Ra \| Rb | 08 |
| ORI | Rc, Ra, const | Rc = Ra \| const | 09 |
| XOR | Rc, Ra, Rb | Rc = Ra ∧ Rb | 06 |
| XORI | Rc, Ra, const | Rc = Ra ∧ const | 07 |
| NOR | Rc, Ra, Rb | Rc = ~ (Ra \| Rb) | 0A |
| NORI | Rc, Ra, const | Rc = ~ (Ra \| const) | 0B |
| SRA | Rc, Ra, const | Rc = Ra >> const (arith, right shift) | 0C |
| SRL | Rc, Ra, const | Rc = Ra >> const (logical right shift) | 0D |
| SLL | Rc, Ra, const | Rc = Ra << const | 0E |
| BEQAL | Ra, Rb, addr, Rc | unconditionally store (nPC + 1) in Rc; branch to addr if Ra + Rb | 10 |
| BNEAL | Ra, Rb, addr, Rc | unconditionally store (nPC + 1) in Rc; branch to addr if Ra != Rb | 11 |
| BGTAL | Ra, Rb, addr, Rc | unconditionally store (nPC + 1) in Rc; branch to addr if Ra > Rb | 13 |
| BGEAL | Ra, Rb, addr, Rc | unconditionally store (nPC + 1) in Rc; branch to addr if Ra >= Rb | 15 |
| JALR | (Ra), Rc | store (nPC + 1) in Ro and jump to (Ra) | 16 |
| ST | (Ra + const), Rb | store Rb to location (Ra + const) | 19 |
| LD | Rc, (Ra + const) | load Rc from location (Ra + const) | 1B |

TABLE 11
MEC Host Memory Map

| Addr | Contents | Type | Reset | Bits | Comments |
|---|---|---|---|---|---|
| CPU Program Memory | | | | | |
| 000 | PGM(0)(31:16) | RW | none | 15:0 | Instruction 0, msw |
| 001 | PGM(0)(15:0) | RW | none | 7.2 15:0 | Instruction 0, lsw |
| 002 | PGM(1)(31:16) | RW | none | 15:0 | Instruction 1, msw |
| 003 | PGM(1)(15:0) | RW | none | 15:0 | Instruction 1, lsw |
| * | * | * | * | * | * |
| 3FE | PGM(511) | RW | none | 15:0 | Instruction 511, msw |
| 3FF | PGM(511) | RW | none | 15:0 | Instruction 511, lsw |
| 400 | Reserved for Program Memory Expansion | | | | |
| * | * | | | | |
| 5FF | Reserved for Program Memory Expansion | | | | |
| Host Interface Registers | | | | | |
| 600 | HDIN(11:0) | W | none | 11:0 | |
| 601 | HDOUT(11:0) | R | none | 11:0 | bits 15:12 read as zero |
| 602 | HDINACK | R | | | bits 15:1 read as zero |
| 603 | HDOUTRDY | R | | | bits 15:1 read as zero |
| 610 | ERROR | R | | | bits 15:1 read as zero |
| 611 | HINTEN | W | | 0 | |
| 612 | CLRHINT | W | | | data ignored |
| 613 | RESET | W | | | data ignored |
| 620 | RADDR(12:0) | W | none | 12:0 | |
| 621 | DBDAT(11:0) | RW | none | 11:0 | bits 15:12 read as zero |
| 622 | WADDR(12:0) | W | none | 12.0 | |
| 623 | DBRDY | R | | | bits 15:1 read as zero |
| 624 | STEP | W | | | data ignored |
| 625 | RUN | W | | | data ignored |
| 626 | HALT | W | | | data ignored; CPU is halted in response to PRST- |
| 630 | BLENGTH | RW | | | bits 14:7 undefined on read |

The columns in the table are defined as follows:
Addr    Address in hex.
Contents    MEC memory location or register name.
Type    Host read-only (R), host write-only (W), or host read/write (RW)
Reset   Reset state, if any; "none", indicates that the register at the address in question has no predefined initial state and that its current state is left unchanged by a reset; "na" indicates that reset is not applicable to the address since it corresponds to a host "command" and not a register. Unless otherwise indicated, a register is reset via either a "hardware", reset invoked by asserting the PRST- pin or a "software" reset invoked by the host writing to RESET.
A register marked with *** in its reset column is reset in response to a hardware reset but is left unchanged (or takes no predefined initial state) in response to a software reset.
Bits    Data bits being defined at the specified address.
Comments    Miscellaneous additional information.

TABLE 12

Host Interface Bus Signals

| Signal Name | Definition |
|---|---|
| HCLK | Host interface clock (input) - all bus address, data, and control signals (with the exception of HDIS) are sampled or asserted relative to the rising edge of this clock. |
| HA(10:0) | 11 bit address bus (input) - should always be specified relative to full 16 bit words. |
| HD(15:0) | 16 bit data bus (bidirectional) - always transfers 16 bit data, with bit 0 being the lsb. |
| HADS- | Address strobe (input) - asserted (low) to indicate that a new bus access is being started. |
| HMODE | Transfer timing mode (input) - asserted in conjunction with HADS- to specify the data transfer timing to be used for the access. |
| HBRST | Burst cycle request (input) - asserted at the end of a data transfer to request another transfer at the next sequential address. |
| HWE- | Write enable (input) - asserted (low) in conjunction with HADS- to indicate that a write cycle is being performed. |
| HDIS | Bus disable (input) - if asserted (high), unconditionally tristates the HD(15:0) pin output drivers; this signal is not registered internally by the MEC prior to being used. |
| HRDY- | Data ready (open drain output) - asserted (low) by the MEC when it is about to sample data from the bus for a write operation, or for a read operation, when it has asserted valid data onto the data bus. This signal is guaranteed to be valid for one rising edge of HCLK and must be externally pulled-up to $V_{cc}$ using a resistor. |
| HINT- | Host interrupt (output) - When enabled, this pin is asserted (low) by the MEC in response to the CPU writing to the HINT command register or the MEC's auxiliary interface unit detecting a hardware error. |

TABLE 13

| Addr | Contents | Type | Reset | Bus | Comments |
|---|---|---|---|---|---|
| Scratchpad Memory | | | | | |
| 000 | M(0)(11:0) | RW | none | 11:0 | |
| 001 | M(1)(11:0) | RW | none | 11:0 | |
| . | . | . | . | . | |
| . | . | . | . | . | |
| 03F | M(63)(11:0) | RW | none | 11:0 | |
| CPU Timer Host Interface Data Registers | | | | | |
| 800 | TIMERMS(3:0) | RW | 0 | 3:0 | bits 11:4 read as 0 |
| 801 | TIMERRLS(11:0) | RW | 0 | 11:0 | |
| 802 | HDIN(11:0) | R | none | 11:0 | |
| 803 | HDOUT(11:0) | W | none | 11:0 | |
| Command Registers | | | | | |
| 810 | INITMAD | W | none | | data ignored |
| 811 | LDVIB(7:0) | W | 00 | 7:0 | |
| 812 | LDSM | W | none | | data ignored |
| 813 | SWAP | W | none | | data ignored |
| 814 | SEND | W | none | | data ignored |
| 815 | HINT | W | none | | data ignored |
| Status Bits | | | | | |
| 820 | VIBRDY | R | 1 | 0 | bits 11:1 read as 0 |
| 821 | SMRDY | R | 1 | 0 | bits 11:1 read as 0 |
| 822 | ITBRDY | R | 0 | 0 | bits 11:1 read as 0 |
| 823 | SPRDY | R | 1 | 0 | bits 11:1 read as 0 |
| 824 | BMPIDLE | R | 1 | 0 | bits 11:1 read as 0 |
| 825 | OTBRDY | R | 1 | 0 | bits 11:1 read as 0 |
| 826 | ORQST | R | 0 | 0 | bits 11:1 read as 0 |
| 827 | LDOTBRDY | R | 1 | 0 | bits 11:1 read as 0 |
| 828 | TZERO | R | 0 | 0 | bits 11:1 read as 0 |
| 829 | HDINRDY | R | 0 | 0 | bits 11:1 read as 0 |
| 82A | HDOUTACK | R | 1 | 0 | bits 11:1 read as 0 |
| Video Interface Timing and Control Registers | | | | | |
| 900 | VCNT1(4:0) | RW | none | 4.5 | bits 5, 11 read as undefined |
| 900 | VCNT2(4:0) | RW | none | 4.5 | bits 5, 11 read as undefined |
| 901 | VCNT3(4:0) | RW | none | 4.5 | bits 5, 11 read as undefined |
| 901 | VCNT4(4:0) | RW | none | 4.5 | bits 5, 11 read as undefined |
| 902 | VCNT5(4:0) | RW | none | 4.5 | bits 5, 11 read as undefined |
| 902 | VCNT8(4:0) | RW | none | 4.5 | bits 5, 11 read as undefined |
| 903 | VCNT9(4:0) | RW | none | 4.5 | bits 5, 11 read as undefined |
| 903 | VCNT10(4:0) | RW | none | 4.5 | bits 5, 11 read as undefined |
| 904 | VCNT11(4:0) | RW | none | 4.5 | bits 5, 11 read as undefined |
| 904 | VCNT12(4:0) | RW | none | 4.5 | bits 5, 11 read as undefined |
| 905 | VARB | W | 0* | 4.8 | |
| 905 | VBUSMODE | W | 0* | 4.3.1 | |
| 905 | VREN | W | 0* | 4.7 | |
| 906 | VRFPMS(7:0) | RW | none | 4.7 | bits 11:8 read as undefined |
| 907 | VRFPLS(7:0) | RW | none | 4.7 | bits 11:8 read as undefined |
| Video Interface Buffer Configuration Registers | | | | | |
| A00 | V0ORIGIN(6:0) | RW | none | 4.1 | bits 11:7 read as undefined |
| A01 | V0LENGTH(6:0) | RW | none | 4.1 | |
| A01 | V0WIDTH(4:0) | RW | none | 4.1 | |
| A02 | V0X(11:0) | RW | none | 4.1 | bit 0 reads as 0 but is not written |
| A03 | V0Y(11:0) | RW | none | 4.1 | bit 0 reads as 0 but is not written |
| A04 | V0PCNT(7:0) | RW | none | 4.1 | bits 11:8 and 0 read as 0; bit 0 is not written |

TABLE 13-continued

| Addr | Contents | Type | Reset | Bus | Comments |
|---|---|---|---|---|---|
| A05 | V0ROW(5:0) | RW | none | 4.1 | bits 11:6 read as 0 |
| A06 | V0COL(3:0) | RW | none | 4.1 | bits 11:4 read as 0 |
| A07 | V0MSEL(2:0) | RW | none | 4.1 | bits 11:3 read as undefined |
| A08 | V1ORIGIN(6:0) | RW | none | 4.1 | bits 11:7 read as zero |
| A09 | V1LENGTH(6:0) | RW | none | 4.1 | |
| A09 | V1WIDTH(4:0) | RW | none | 4.1 | |
| A0A | V1X(11:0) | RW | none | 4.1 | bit 0 reads as 0 but is not written |
| A0B | V1Y(11:0) | RW | none | 4.1 | bit 0 reads as 0 but is not written |
| A0C | V1PCNT(7:0) | RW | none | 4.1 | bits 11:8 and 0 read as 0; bit 0 is not written |
| A0D | V1ROW(5:0) | RW | none | 4.1 | bits 11:6 read as 0 |
| A0E | V1COL(3:0) | RW | none | 4.1 | bits 11:4 read as 0 |
| A0F | V1MSEL(2:0) | RW | none | 4.1 | bits 11:3 read as undefined |
| A10 | V2ORIGIN(6:0) | RW | none | 4.1 | bits 11:7 read as zero |
| A11 | V2LENGTH(6:0) | RW | none | 4.1 | |
| A11 | V2WIDTH(4:0) | RW | none | 4.1 | |
| A12 | V2X(11:0) | RW | none | 4.1 | bit 0 reads as 0 but is not written |
| A13 | V2Y(11:0) | RW | none | 4.1 | bit 0 reads as 0 but is not written |
| A14 | V2PCNT(7:0) | RW | none | 4.1 | bits 11:8 and 0 read as 0; bit 0 is not written |
| A15 | V2ROW(5:0) | RW | none | 4.1 | bits 11:6 read as 0 |
| A16 | V2COL(3:0) | RW | none | 4.1 | bits 11:4 read as 0 |
| A17 | V2MSEL(2:0) | RW | none | 4.1 | bits 11:3 read as undefined |
| A18 | V3ORIGIN(6:0) | RW | none | 4.1 | bits 11:7 read as zero |
| A19 | V3LENGTH(6:0) | RW | none | 4.1 | |
| A19 | V3WIDTH(4:0) | RW | none | 4.1 | |
| A1A | V3X(11:0) | RW | none | 4.1 | bit 0 reads as 0 but is not written |
| A1B | V3Y(11:0) | RW | none | 4.1 | bit 0 reads as 0 but is not written |
| A1C | V3PCNT(7:0) | RW | none | 4.1 | bits 11:8 and 0 read as 0; bit 0 is not written |
| A1D | V3ROW(5:0) | RW | none | 4.1 | bits 11:6 read as 0 |
| A1E | V3COL(3:0) | RW | none | 4.1 | bits 11:4 read as 0 |
| A1F | V3MSEL(2:0) | RW | none | 4.1 | bits 11:3 read as undefined |
| Search Memory Configuration Registers | | | | | |
| B00 | S0ORIGIN(8:0) | RW | none | 5.1 | bits 11:9 read as undefined |
| B01 | S0WIDTH(4:0) | RW | none | 5.1 | bits 11:5 read as undefined |
| B02 | S1ORIGIN(8:0) | RW | none | 5.1 | bits 11:9 read as undefined |
| B03 | S1WIDTH(4:0) | RW | none | 5.1 | bits 11:5 read as undefined |
| B04 | S2ORIGIN(8:0) | RW | none | 5.1 | bits 11:9 read as undefined |
| B05 | S2WIDTH(4:0) | RW | none | 5.1 | bits 11:5 read as undefined |
| B06 | S3ORIGIN(8:0) | RW | none | 5.1 | bits 11:9 read as undefined |
| B07 | S3WIDTH(4:0) | RW | none | 5.1 | bits 11:5 read as undefined |
| Block Matching Processor Control and MAD Registers | | | | | |
| C00 | BMPMODE(1:0) | RW | none | 5.2 | bits 11:4 read as undefined |
| C00 | BMSEG(1:0) | RW | none | 5.2 | bits 11:4 read as undefined |
| C01 | BMXORG(6:0) | RW | none | 5.2 | bits 11:7 read as undefined |
| C02 | BMYORG(6:0) | RW | none | 5.2 | bits 11:7 read as undefined |
| C03 | MADX(7:0) | R | none | 5.2 | bits 11:8 equal bit 7 |
| C04 | MADY(7:0) | R | none | 5.2 | bits 11:8 equal bit 7 |
| C05 | MADMS(10:0) | R | 7FF | 5.2 | bit 11 reads as 0 |
| C06 | MADLS(4:0) | R | 1F | 5.2 | bits 11:5 read as 0 |
| C07 | SPX(7:0) | RW | none | 5.2 | bits 11:8 equal bit 7 |
| C08 | SPY(7:0) | RW | none | 5.2 | bits 11:8 equal bit 7 |
| C09 | SPCNT(7:0) | RW | none | 5.2 | bits 11:8 read as undefined |
| C0A | SPINC(4:0) | RW | none | 5.2 | bits 11:8 read as undefined |
| C0A | SPMASK(2:0) | RW | none | 5.2 | bits 11:8 read as undefined |
| C0B | OTBSEG(1:0) | RW | none | 5.4 | bits 11:2 read as undefined |
| C0C | OTBXORG(6:0) | RW | none | 5.4 | bits 11:7 read as undefined |
| C0D | OTBYORG(6:0) | RW | none | 5.4 | bits 11:7 read as undefined |
| C0E | OTBX(7:0) | RW | none | 5.4 | bits 11:8 equal bit 7 |
| C0F | OTBY(7:0) | RW | none | 5.4 | bits 11:8 equal bit 7 |
| IPREDICT Registers | | | | | |
| D00 | IPP0(11:0) | R | none | 3.3 | |
| D01 | IPP1(11:0) | R | none | 3.3 | |
| D02 | IPP2(11:0) | R | none | 3.3 | |
| D03 | ITD0(11:0) | R | none | 3.3 | |
| D04 | ITD1(11:0) | R | none | 3.3 | |
| D05 | ITD2(11:0) | R | none | 3.3 | |
| D06 | ITD3(11:0) | R | none | 3.3 | |
| D07 | IBITS(3:0) | R | none | 3.3 | bits 11:4 read as undefined |
| D08 | IFMVX(10:0) | R | none | 3.3 | bit 11 equals bit 10 |
| D09 | IFMVY(10:0) | R | none | 3.3 | bit 11 equals bit 10 |
| D0A | IBMVX(10:0) | R | none | 3.3 | bit 11 equals bit 10 |
| D0B | IBMVY(10:0) | R | none | 3.3 | bit 11 equals bit 10 |
| OPREDICT Registers | | | | | |
| E00 | OPP0(11:0) | R | none | 3.4 | |
| E01 | OPP1(11:0) | R | none | 3.4 | |
| E02 | OPP2(11:0) | R | none | 3.4 | |
| E03 | OTD0(11:0) | W | none | 3.4 | |
| E04 | OTD1(11:0) | W | none | 3.4 | |

TABLE 13-continued

| Addr | Contents | Type | Reset | Bus | Comments |
|---|---|---|---|---|---|
| E05 | OTD2(11:0) | W | none | 3.4 | |
| E06 | OTD3(11:0) | W | none | 3.4 | |
| E07 | OBITS(3:0) | W | none | 3.4 | |
| E08 | OFMVX(10:0) | W | none | 3.4 | |
| E09 | OFMVY(10:0) | W | none | 3.4 | |
| E0A | OBMVX(10:0) | W | none | 3.4 | |

TABLE 14

MEC Auxiliary Interface Bus Signal Definitions

| | |
|---|---|
| XCLK | Auxiliary interface clock (input) - all addresses, data, and control signals are sampled or asserted relative to the rising edge of this clock. |
| XAD(23:0) | 24 bit multiplexed address/data bus (input/output). |
| XADS- | Auxiliary processor address/data strobe (input) - XADS- is asserted (low) by the ICC* for one XCLK cycle at the beginning of every processor read or write transfer sequence (see Section 5.3). |
| XOE- | Output enable (input) - XOE- is asserted (low) by the ICC during read cycles to enable the output buffers of the MEC onto XAD(23:0); if XOE- is high, these output buffers are in the high impedance state. |
| XRDY- | Data ready (tristate output) - This signal is asserted (low) by the MEC throughout a data transfer sequence to indicate that it is either ready to supply data (in the case of a read) or accept data (in the case of a write). The MEC untristates XRDY- and deasserts it during the XCLK clock cycle preceding its assertion at the beginning of a transfer sequence and puts it back into the high impedance state one clock cycle after its deassertion at the end of a transfer sequence (see FIGS. 3-1 and 3-2). |
| XRQST- | Processor service request (output) - This signal is asserted (low) by the MEC whenever it has finished executing an Instruction previously dispatched to it by the ICC; this output should be connected to one of the ICC's XRQST-(3:0) pins. |
| XDIS | Output disable (input) - When this signal is asserted (high), the XRDY- and XAD(23:0) output drivers on the MEC are unconditionally forced into the high impedance state. |
| XID(1:0) | Processor ID select (input) - These pins indicate the processor ID or "address" of the MEC for purposes of communicating with the ICC; they are normally hardwired in a system. To determine if it is being selected by the ICC, the MEC compares these pins with bits 1:0 of the XAD(23:0) bus at the start of a processor read or write cycle. |

*ICC = Image Compression Coprocessor

TABLE 15

MEC Instruction Opcodes

| Mnemonic | OPCODE | Nominal Definition |
|---|---|---|
| IPREDICT | XX10XX | Performs motion estimation on input token. |
| OPREDICT | XX01XX | Sends result token from motion estimation back to image compression coprocessor. |
| WRMEM | XX11XX | Writes input token to prediction memory. |

TABLE 16

Processor Packet Word Definitions

| Word | Bit Positions | Contents |
|---|---|---|
| 0 | (23:17) | Instruction address |
| 0 | (16) | type field from operand token descriptor (for write cycles) or from result token descriptor (for read cycles) |
| 0 | (15:14) | nblocks field from operand token descriptor (for write cycles) or from result token descriptor (for read cycles) |
| 0 | (13:12) | ICC Instruction bits 30:29 (ND field) |

TABLE 16-continued

Processor Packet Word Definitions

| Word | Bit Positions | Contents |
|---|---|---|
| 0 | (11) | ICC Instruction bit 32 (NO(0) bit) |
| 0 | (10:6) | ICC Instruction bits 4:0 (PARAMS(4:0) field) |
| 0 | (5:0) | ICC Instruction bits 39:34 (OPCODE field) |
| 1 | (23:16) | ICC Instruction bits 28:21 (DEST1 field) |
| 1 | (15:8) | ICC Instruction bits 20:13 (DEST2 field) |
| 1 | (7:0) | ICC Instruction bits 12:5 (DEST3 field) |

Note: ICC = Image Compression Coprocessor

TABLE 17

Token Transfer Format on Auxiliary Interface Bus

| Bus Transfer # | XAD(23:12) Contents | XAD(11:0) Contents |
|---|---|---|
| 0 | Description bits 95:84 | Descriptor bits 83:72 |
| 1 | Descriptor bits 71:60 | Descriptor bits 59:48 |
| 2 | Descriptor bits 47:36 | Descriptor bits 35:24 |
| 3 | Descriptor bits 23:12 | Descriptor bits 11:0 |
| 4 | Block 0, Row 0, Column 0 | Block 0, Row 0, Column 1 |
| . | . | . |
| . | . | . |
| 35 | Block 0, Row 7, Column 6 | Block 0, Row 7, Column 7 |
| . | . | . |
| . | . | . |
| nblocks* 32 + 4 | Block nblocks, Row 0, Column 0 | Block nblocks, Row 0, Column 1 |
| . | . | . |
| . | . | . |
| nblocks* 32 + 35 | Block nblocks, Row 7, Column 6 | Block nblocks, Row 7, Column 7 |

TABLE 18

MEC Hardware Error Conditions

| Error Condition | Description |
|---|---|
| PPO(3:2) == 0 | Undefined MEC opcode. |
| [PPO(3) == 1 && PPO(11) == 0] \|\| [PPO(3) == 1 && PPO(16) == 1 && PPO(15:14) ! = 3] | IPREDICT or WRMEM instruction has a data token operand with less than four blocks, or has no operand at all. |
| PPO(3:2) == 3 && PPO(16) == 0 | WRMEM instruction has a control token operand. |
| PPO(3:2) == 1 && PPO(13:12) == 0 | OPREDICT instruction does not have a destination. |

Note:
PP0 = processor packet word 0
PP1 = processor packet word 1

TABLE 19

IPREDICT Token Descriptor Swap Registers

| Register | Descr Bits | Contents |
|---|---|---|
| ITD0(11:0) | 95:84 | concatenation of descriptor bits 95:85 with quant(4) |

TABLE 19-continued

IPREDICT Token Descriptor Swap Registers

| Register | Descr Bits | Contents |
| --- | --- | --- |
| ITD1(11:0) | 83:72 | concatenation of quant(3:0) and vpos |
| ITD2(11:0) | 71:60 | concatenation of hpos with cntrl(7:4) |
| ITD3(11:0) | 59:48 | concatenation of cntrl(3.0) with cntr2 |
| IBITS(3:0) | 47:44 | usrbits |
| IFMVX(10:0) | 43:33 | horizontal component of forward motion vector |
| IFMVY(10:0) | 32:22 | vertical component of forward motion vector |
| IBMVX (10:0) | 21:11 | horizontal component of backward motion vector |
| IBMVY(10:0) | 10:0 | vertical component of backward motion vector |

TABLE 20

OTPB Load Configuration Registers

| | |
| --- | --- |
| OTBSEG(1:0): | search memory segment to be accessed (0, 1, 2, or 3) |
| OTBXORG(6:0): | absolute X coordinate of origin in segment OTBSEG |
| OTBYORG(6:0): | absolute Y coordinate of origin in segment OTBSEG |
| OTBX(7:0): | relative X coordinate of 16 × 16 block to be copied into OTPB |
| OTBY(7:0): | relative Y coordinate of 16 × 16 block to be copied into OTPB |

TABLE 21

IPREDICT Processor Packet Swap Registers

| Register | Contents |
| --- | --- |
| IPP0(11:0) | PP0(11:0) from IPPB |
| IPP1(11:0) | PP1(23:12) from IPPB |
| IPP2(11:0) | PP1(11:0) from IPPB |

TABLE 22

OPREDICT Processor Packet Registers

| Register | Contents |
| --- | --- |
| OPP0(11:0) | PP0(11:0) from OPPB |
| OPP1(11:0) | PP1(23:12) from OPPB |
| OPP2(11:0) | PP1(11:0) from OPPB |

TABLE 23

OPREDICT Token Descriptor Registers

| Register | Descr Bits | Contents |
| --- | --- | --- |
| OTD0(11:0) | 95:84 | concatenation of descriptor bits 95:85 with quant(4) |
| OTD1(11:0) | 83:72 | concatenation of quant(3:0) and vpos |
| OTD2(11:0) | 71:60 | concatenation of hpos with cntrl(7:4) |
| OTD3(11:0) | 59:48 | concatenation of cntrl(3:0) with cntr2 |
| OBITS(3.0) | 47:44 | usrbits |
| OFMVX(10:0) | 43:33 | horizontal component of forward motion vector |
| OFMVY(10:0) | 32:22 | vertical component of forward motion vector |
| OBMVX(10:0) | 21:11 | horizontal component of backward motion vector |
| OBMVY(10:0) | 10:0 | vertical component of backward motion vector |

What is claimed is:

1. In a video system having a video memory physically arranged in P rows and Q columns, a motion estimation processor comprising:

means for receiving a data token describing a current frame;

means, coupled to the video memory, for retrieving from the video memory, a plurality of image data tiles logically configured to have p rows and q columns;

a first storage device, coupled to said means for retrieving, for storing image data retrieved from an even numbered one of said P rows and an even numbered one of said Q columns;

a second storage device, coupled to said means for retrieving for storing image data retrieved from an odd numbered one of said P rows and an odd numbered one of said Q columns;

a search memory, coupled to said first and to said second storage devices, for storing a search window;

a block matching processor, coupled to said means for retrieving, for comparing said current frame to said search window and for identifying a best matched block and for computing a vector describing a difference between said best matched block and said current frame; and means coupled to said block matching processor, for outputting an output token including said vector and said best matched search window.

2. The motion estimation processor of claim 1 wherein said search memory is configurable to store n multiple search windows for $0 < n \geq 4$.

3. The motion estimation processor of claim 1 further comprising an interpolator disposed between said search memory and said block matching processor.

4. The motion estimation processor of claim 1 further comprising:

a decimation filter coupled to at least one of said means for receiving a data token or to said means for retrieving from video memory for decimation filtering one of said current frame or said image data respectively to form a reduced scale image; and wherein said block matching processor computes said vector and said output token using said reduced scale image.

5. The motion estimation processor of claim 1 further comprising:

means, coupled said block matching processor, and adapted to receive control signals input to said motion estimation processor by a CPU external to said motion estimation processor, for directing operations of said block matching processor in response to said control signals.

6. The motion estimation coprocessor of claim 1 wherein said block matching processor simultaneously performs n block matches beginning at a given column position of n rows of said search window and wherein $n \geq 2$ and wherein said rows are one of a plurality of successive or alternating rows.

7. The motion estimation processor of claim 6 further comprising:

means, coupled said block matching processor, and adapted to receive control signals input to said motion estimation processor by a CPU external to said motion estimation processor, for directing said block matching processor to perform k×n block matches within said search window, in response to said control signals.

8. The motion estimation processor of claim 6 wherein said block matching processor further comprises:

n modules each having an adder tree for computing one of said n block matches.

9. The motion estimation processor of claim 8 wherein an output sum from each of said n modules is sequentially compared to a value stored in a register and wherein said value is overwritten when said output sum is less than said stored value.

10. The motion estimation processor of claim 9 wherein said output sum and a displacement vector are written to said register when said output sum is less than said stored value.

* * * * *